US008708560B2

(12) United States Patent
Kraemer

(10) Patent No.: US 8,708,560 B2
(45) Date of Patent: Apr. 29, 2014

(54) METHOD AND APPARATUS FOR ADJUSTING THE COLOR PROPERTIES OR THE PHOTOMETRIC PROPERTIES OF AN LED ILLUMINATION DEVICE

(75) Inventor: Regine Kraemer, Munich (DE)

(73) Assignee: Arnold & Richter Cine Technik, GmbH & Co. Betriebs KG, Munich (DE)

( * ) Notice: Subject to any disclaimer, the term of this patent is extended or adjusted under 35 U.S.C. 154(b) by 909 days.

(21) Appl. No.: 12/676,890

(22) PCT Filed: Sep. 8, 2008

(86) PCT No.: PCT/EP2008/061887
§ 371 (c)(1),
(2), (4) Date: Mar. 5, 2010

(87) PCT Pub. No.: WO2009/034060
PCT Pub. Date: Mar. 19, 2009

(65) Prior Publication Data
US 2010/0301777 A1 Dec. 2, 2010

(30) Foreign Application Priority Data
Sep. 7, 2007 (DE) ......................... 10 2007 044 556

(51) Int. Cl.
*G01K 11/12* (2006.01)
*G01K 7/01* (2006.01)

(52) U.S. Cl.
USPC ........ 374/162; 374/178; 374/120; 250/494.1; 362/612; 345/84

(58) Field of Classification Search
USPC ..................... 374/120, 130, 161, 162, 178, 1; 362/800, 612, 555, 345, 84; 252/586
See application file for complete search history.

(56) References Cited

U.S. PATENT DOCUMENTS

| | | | | |
|---|---|---|---|---|
| 6,411,046 | B1 | 6/2002 | Muthu | |
| 6,441,558 | B1 | 8/2002 | Muthu et al. | |
| 7,319,298 | B2 * | 1/2008 | Jungwirth et al. | 315/307 |
| 8,111,371 | B2 * | 2/2012 | Suminoe et al. | 349/161 |
| 2004/0105261 | A1 | 6/2004 | Ducharme et al. | |
| 2006/0193133 | A1 | 8/2006 | Von Der Brelie | |

(Continued)

FOREIGN PATENT DOCUMENTS

| | | | |
|---|---|---|---|
| DE | 202005001540 | U1 | 6/2005 |
| JP | 2004-517444 | A | 6/2004 |

(Continued)

OTHER PUBLICATIONS

English translation of International Preliminary Report on Patentability dated Apr. 7, 2010 for corresponding International Application No. PCT/EP2008/061887, 11 sheets.

(Continued)

*Primary Examiner* — Gail Verbitsky
(74) *Attorney, Agent, or Firm* — Christie, Parker & Hale, LLP

(57) ABSTRACT

The invention relates to a method for the temperature-dependent adjustment of the color properties or the photometric properties of an LED illuminating device having LEDs emitting light of different colors or wavelengths or LED color groups emitting light of the same color or wavelength within a color group, the luminous flux portions thereof determine the color of light, color temperature and/or the chromaticity coordinates of the light mixture emitted by the LED illuminating device.

5 Claims, 33 Drawing Sheets

(56) References Cited

U.S. PATENT DOCUMENTS

| | | | | |
|---|---|---|---|---|
| 2007/0120496 | A1 | 5/2007 | Shimizu et al. | |
| 2008/0203945 | A1 | 8/2008 | Deurenberg et al. | |
| 2012/0274544 | A1 * | 11/2012 | Nakajima | 345/101 |

FOREIGN PATENT DOCUMENTS

| | | | |
|---|---|---|---|
| WO | WO02/47438 | A2 | 6/2002 |
| WO | WO 02/052901 | A2 | 7/2002 |
| WO | WO 2005/011006 | A1 | 2/2005 |
| WO | WO2006/126124 | A2 | 11/2006 |
| WO | WO2007/019663 | A1 | 2/2007 |
| WO | WO2007/090283 | A1 | 8/2007 |

OTHER PUBLICATIONS

International Search Report, dated Jan. 15, 2009, corresponding to PCT/EP2008/061887.

* cited by examiner

METHOD AND APPARATUS FOR ADJUSTING THE COLOR PROPERTIES OR THE PHOTOMETRIC PROPERTIES OF AN LED ILLUMINATION DEVICE

CROSS-REFERENCE TO A RELATED APPLICATION

This application is a National Phase Patent Application of International Patent Application Number PCT/EP2008/061887, filed on Sep. 8, 2008, which claims priority of German Patent Application Number 10 2007 044 556.5, filed on Sep. 7, 2007.

BACKGROUND

The invention relates to a method for adjusting the color properties or photometric properties of an LED spotlight as well as an apparatus.

Illuminating spotlights having light emitting diodes (LEDs) are known which are used, e.g., as camera attachment light for film and video cameras. Since the LEDs used therefore have either the color temperature "daylight white" or "warm white", a continuous or exact activation or switch from a warm white to a daylight white color temperature having defined standard color value portions close to or on the Planckian locus is not possible and the color reproduction at film and video recordings is unsatisfactory.

Typical film materials for film recordings like "cinema color negative film" are optimized towards daylight having a color temperature of 5600 K or for incandescent light having a color temperature of 3200 K and achieve extraordinary color reproduction properties for illuminating a set with those light sources. If other artificial light sources are used during film recordings for illuminating a set, they have to be adjusted on the one hand to the optimum color temperature of 3200 K or 5600 K and on the other hand have to have very good color reproduction quality. Regularly, for this purpose the best color reproduction grade having a color rendering index of CRI ≥90 . . . 100 is required.

For an LED spotlight consisting of more than three LED colors, there are unlimited possibilities or possibilities only limited by the resolution of the controlling to adjust a desired chromaticity coordinate color like e.g., x/y=0.423/0.399, CCT=3200 K by mixing the used primary colors. Depending on the mixing ratio, it can be optimized towards different parameters like luminous efficacy or color reproduction. In case of a spotlight primarily used for film and TV recordings, the mixture can additionally be optimized towards the color reproductions properties of the film material or of the sensor of a digital camera. If this optimization is not done, in the most unlikely event the correct chromaticity coordinates x/y are adjusted, but having very unfavorable color reproduction properties. In particular, due to the narrow band spectra of the LED colors like blue, green, red, spectra easily result having an inacceptable color reproduction. Or, however, spectra having good to very good color rendering indices (CRI≥90) which generate at recordings with film or digital cameras significant color deviations as compared to usual light sources like tungsten incandescent or daylight.

It can be deduced from the colorimetry that for such total spectra generated from narrowband LED spectra, optionally also in combination with luminescent material LEDs, never all colorimetric values (chromaticity coordinates, color rendering index as well as mixed-light capability) being relevant for the film and video illumination can adopt ideal values at the same time. Nonetheless, very good results can be achieved if it is guaranteed that none of the optimization parameters deviates too far from the ideal value. However, in the colorimetry no general algorithm is known as to in which ratio more than three spectra have to be mixed to achieve values being as good as possible for the desired chromaticity coordinate, color rendering index as well as mixed-light capability with film at the same time.

However, as in the case of using fluorescent tubes for the illumination of film or video recordings, it can occur in case of artificial light sources having a none-continuous spectral power distribution that these light sources achieve the required values for the color temperature and color rendering index, but nonetheless have a significant color deviation in case of using them for film recordings as compared to tungsten incandescent or HMI lamps or daylight. In this case, one speaks about an insufficient mixed-light capability. This effect can also occur in case of using variously colored LEDs in an LED spotlight. During a test with an LED combination optimized towards a color temperature of 5600K and a color rendering index of CRI=96 at film recordings, a massive red cast as compared to HMI lamps was observed. Also tries with daylight white LEDs did not result in satisfactory results with respect to the mixed-light capability.

US 2004/0105261 A1 discloses a method and an apparatus for emitting and modulating light having a specified light spectrum. The known photometric device has several groups of light emitting apparatuses, each group of which emits a specified light spectrum, and a control device controls the energy supply to the single light emitting apparatuses in such a way that the overall resulting radiation has the specified light spectrum. Thereby, by combination of daylight white and warm white LEDs and modifications of the intensities any color temperatures between the warm white and the daylight white LEDs can be adjusted.

A disadvantage of this method is the also not optimal color reproduction in case of film or video recordings and the lacking possibility to adjust a specified color temperature and an exact chromaticity coordinate. Dependent on the choice of the individual LEDs or the groups of LEDs and the respectively adjusted color temperature, one faces thereby partially significant color deviations from the Planckian locus which can only be corrected by using corrections filters. Additionally, the luminous efficacy is not optimal in case of a warm white setting of the combination of daylight white and warm white LEDs, since hereby relatively high converting losses occur due to the secondary emission of the luminescent material. A further disadvantage of this method is that for adjusting a warm white or daylight white color temperature a main part of the LEDs of the respective other color temperature cannot be used or can only be used highly dimmed so that the utilization factor for the color temperatures around 3200 K or 5600 K typically required in case of film recordings is only approximately 50%.

From DE 20 2005 001 540 U1 a light source for daylight is known which can be adjusted in its color temperature and by which at least one LED emitting white light of a certain color temperature is combined with variously colored light emitting LEDs, in particular in the primary colors red, green and blue. By a modification of the power of single LED colors, a certain color temperature or certain standard light quality can be adjusted by tuning or correcting a specified color temperature or standard light quality automatically by the use of suited sensors, logic and software which can detect the actual spectral power distribution of the light source.

By the use of variously colored LEDs in illuminating spotlights, in particular for photographic or cinematographic recordings, the light of which has a specified color temperature and color rendering index and owns a sufficient mixed-light capability, the following problems occur.

Since LEDs do not emit the emitted light in a monochromatic way with a sharp spectral line but with a band spectrum having certain width so that the emission spectrum of an LED can be assumed as Gaussian bell-shaped curve or as sum of several Gaussian bell-shaped curves and the emission spectra of LEDs can be simulated via the Gaussian distribution. In FIG. 4 some emission spectra of LEDs are exemplarily depicted as function of the relative illumination density over the wavelength, from which can be seen that the wavelength of variously colored light emitting LEDs increases from blue light by green light, amber-colored light towards red light and the form of the emission spectrum of white light emitting LEDs strongly differs from the emission spectra of LEDs emitting differently colored light. This deviation results from the technology of white light generation which is based on the basis of a semiconductor element emitting blue light an being provided with a phosphor covering converting the blue light partially into yellow light resulting in a second, peak in the yellow area of the spectrum besides the first peak in the wavelength area of blue light, a mixed result of which are the portions of white light. Thereby, via the thickness of the phosphor covering, the color temperature can be varied so that in this manner yellowish, warm white as well as daylight white LEDs can be produced.

Additionally, LEDs as illuminant have a strong temperature dependency. With increasing junction temperature, the properties and characteristics of LEDs vary significantly, wherein with increasing temperature the luminance decreases strongly. This is based on the fact that at higher temperature the portion of the radiation-free recombination increases and with increasing temperature a shift of the emission spectra towards higher wavelengths, i.e., towards the red spectrum, is effected. FIG. 5 shows in a schematic depiction the relative luminance over the junction temperature of LEDs which emit blue, green and red light and consist of different material combinations. As a result, the temperature dependency of LEDs is differently strong pronounced in dependence on the used materials what results in the fact that also the colorimetric properties of a light mixture being additively put together from variously colored LEDs vary to achieve a certain color of light or color temperature.

To achieve the color tint or the color temperature of an originally, e.g. at an initial temperature of 20° C., adjusted basic mixture of the light emitted from variously colored LEDs also at a temperature differing from the initial temperature, a spectrometer can be provided and, e.g., be used in the area of the front lens of an illuminating spotlight, which spectrometer measures the spectrum of the light emitted from the illuminating spotlight, or a color sensor is used in the area of the light emitting plane, which color sensor registers deviations of the actual color of the spotlight and then detects the intensity as well as the chromaticity coordinates of the LEDs participating in the light generation in a pulse/measuring mode. Thus, shifts of the peak wavelength as well as variations of the height of the peak wavelength can be detected and, as actual values term, can be fed to a regulation device, the set value of which is the basic setting or basic mixture of the light emitted from the illuminating spotlight. By an according comparison between the set value and the actual value, the light mixture can be corrected to maintain the original spectrum of the basic mixture.

Such a regulation of the color temperature of the light being emitted from an LED spotlight is very complex and time-consuming due to the necessary use of an expensive color sensor and its arrangement in the optical path of the LED spotlight as well as due to the necessary use of a suited computer in connection to a regulation device since in case of such a regulation a temperature-dependent variation of the peak wave length of all LED colors used in the LED spotlight has to be detected and has to be considered during the regulation. The time necessary for this is, e.g., in case of film recordings under different ambient conditions not always available.

SUMMARY

It is an object of the instant invention to adjust and keep constant the color of light, color temperature or the chromaticity coordinates of a light mixture emitted from an LED spotlight with minimal cost and time effort independently from the ambient temperature of the LED spotlight.

The solutions according to the invention guarantee an adjustment of and a compliance with the color of light, color temperature or the chromaticity coordinates of a light mixture being emitted from an LED spotlight and being composed of luminous flux portions of variously colored LEDs independently on the temperature, in particular on the board temperature of the LEDs, under a minimum production and time effort.

The method according to the invention starts from different approaches and enables different adjustment accuracies with the different production and time effort for achieving an adjustment of the color of light, color temperature or the chromaticity coordinate of the light mixture independently on the ambient temperature of the LED spotlight. The production effort and the control or regulation time for the compliance of the desired color of light, color temperature or the chromaticity coordinate of the light mixture being emitted from the LED spotlight is overall significantly smaller than the production and regulation time effort when using a plurality of color sensors since in case of the method according to the invention only one temperature sensor is necessary as actual value indicator for a compliance of the color of light, the color temperature or the chromaticity coordinates of the light mixture being emitted from the LED spotlight and the regulation time is only minimal dependent on the used method in each case.

A first alternative method for the color stabilization of an LED spotlight at different ambient temperature is characterized by

- a basic setting of the light mixture onto a specified color of light by an adjustment of the luminous flux portions of the variously colored LEDs at an initial temperature of the LED spotlight,
- determining the initial emission spectra $E_A(\lambda)$ of the variously colored LEDs at the basic setting, the initial emission spectra being dependent on the wavelength of the variously colored LEDs,
- determining the emission spectra $E(\lambda)$ depending on the wavelength of the variously colored LEDs at a measured temperature of the LED spotlight differing from the initial temperature,
- determining the luminous flux portions of the variously colored LEDs for a light mixture having the specified color of light at the measured temperature,
- adjusting the determined luminous flux portions of the variously colored LEDs at the LED spotlight.

In case of this first method according to the invention firstly a calibration of the spotlight is effected with an optimum adjustment of the luminous flux portions of variously colored LED color groups for a desired color of light of the light mixture emitted from the LED spotlight in a basic setting of the LED spotlight. During a variation of the ambient temperature, a temperature-dependent new calibration for correcting the luminous flux portions of the variously colored LEDs of the light mixture is carried out by a new calculation of the luminous flux portions with the temperature-dependent emission spectra of the variously colored LEDs and an according adjustment of the luminous flux portions at the spotlight. For this method, the emission spectra of the single color groups of the variously colored LEDs at the measured, actual temperature are necessary for each correction procedure, which emission spectra have to be measured with the spectrometer—this being, however, comparatively time consuming—so that this method is, e.g., only limitedly applicable for film recordings, the more so as the installation of the spectrometer in an LED spotlight is connected to a significant production and cost effort.

Accordingly, in further developments of this solution according to the invention, the emission spectra of the variously colored LEDs are approximated for the measured temperature in each case by the Gaussian distribution or by a temperature-dependent normalization of the emission spectra determined by the calibration, this being done in the context of a calibration as well as the thereupon-based new calculation of the luminous flux portions dependent on the temperature. The result, namely the luminous flux portions of the LED colors depending on the temperature, is preferably stored in table or function form in the spotlight since then in the spotlight no spectra are necessary for measuring, approximation and calculation.

Both further-developed solutions are based on the finding that the luminance and peak wavelength as well as the half-width, i.e., the width of the emission spectrum at 50% of the relative luminance of the peak wavelength of the emission spectra are dependent on the measured temperature in a linear or quadratic (luminance of yellow, amber, red) way. By those methods, the spectra for all color groups of the variously colored LEDs can be newly calculated from the temperature measured in each case.

The approximation of the emission spectra of the variously colored LEDs by the Gaussian distribution is based on the fact that the emission spectra of LEDs can be simulated with the aid of the Gaussian bell-shaped curve $$E(\lambda) = f_L * e^{-2.7725\cdot\left(\frac{\lambda-\lambda_p}{w_{50}}\right)^2}$$

sufficiently precise by determining the peak wavelength $\lambda_p$ of the LED emission spectrum and the half-width $w_{50}$ of the LED emission spectrum, the peak wavelength and the half-width being linearly dependent on the temperature for each group of same-color LEDs. The temperature-dependent intensity factor fL serves for adjusting the intensity of the simulated spectrum onto the intensity of the spectrum at a determined ambient temperature. The function of the intensity of the spectrum depending on the temperature is for each LED color a linear or quadratic function. Thus, if the parameters $\lambda_p$ and $w_{50}$ being linearly dependent on the temperature are known from the basic setting of the light mixture of the LED spotlight during its calibration as well as the temperature-dependent factor fL or the linear or quadratic function of the intensity depending on the temperature, then the respective relative emission spectrum of the single color groups of the variously colored LEDs can be suggested at temperatures differing from the initial temperature so that deviations of the emission spectra from the basic setting can be determined and compensated.

Based on the Gaussian distribution, the emission spectrum of the variously colored LEDs and therewith of the light mixture of the light emitted from the LED spotlight can be approximated even more precise if the emission spectra E(λ) depending on the wavelength of the variously colored LEDs are simulated according to the formula $$E(\lambda) = f_L \cdot \frac{1}{\frac{w_{50}}{2} \cdot \sqrt{2\pi}} \cdot e^{-\frac{1}{2}\left(\frac{\lambda-\lambda_p}{w_{50}/2}\right)^2}$$

by determining the peak wavelength $\lambda_p$ of the LED emission spectrum, the half-width $w_{50}$ of the LED emission spectrum and a temperature-dependent intensity factor $f_L$, the peak wavelength and the half-width being linearly dependent on the temperature for each group of same-color LEDs.

The parameters peak wavelength $\lambda_p$ and half-width $w_{50}$ used in this approximation formula are for all color groups of the variously colored LEDs linearly or quadratically dependent on the temperature. The temperature-dependent conversion factor $f_L(T)$ thereby represents a normalization factor which refers the approximated spectrum to the measured relative luminance dependent on the temperature. The measured dependency of a maximum spectral radiant power on the temperature can also be used as substitute for the factor fL(T). Thus, all necessary parameters can be determined and the emission spectra can be calculated from a measured temperature value. In this manner, e.g., an approximation of the emission spectra for the color groups amber, blue, green and red is possible.

The determination of the emission spectrum for white LEDs thereby represents a special case since in case of an LED emitting white light a blue LED having a phosphor covering is concerned so that the emission spectrum shows two peaks, namely one peak in the blue and one peak in the yellow spectral area. Thereby, a simple approximation by a Gaussian distribution is not possible, however, both peaks can be approximated by a Gaussian distribution in each case.

In an embodiment of the method according to the invention, the emission spectrum for white LEDs is accordingly approximated by several Gaussian distributions, preferably by three or four Gaussian distributions. Thereby, a third Gaussian distribution is subtracted from the two Gaussian distributions determining the two peaks in the emission spectrum in order to approximate the calculated spectrum within the "valley" at about 495 nm lying between the two peaks towards the measured emission distribution. An even more precise approximation of the calculated emission spectrum towards a measured emission distribution can be achieved by adding a fourth Gaussian distribution, however, an approximation by three Gaussian functions turns out as sufficient compromise between maximum accuracy and minimum calculation effort.

The methods according to the invention for the approximation of the emission spectra of the variously colored LEDs for a generation of the desired light mixture of the LED spotlight have the advantage of a sufficiently precise approximation of the calculated emission spectra to actually measured emission spectra, wherein the shift of the peak wavelength and modifications of the half-width are accounted for so that the light mixture being composed of the light of variously colored LEDs can be corrected very precisely. Comparative measurements have shown that the color temperature after this correction amounts to 28 K for artificial light or tungsten and 125 K for daylight at visibility thresholds of 50 K for tungsten or 200 K for daylight, whereas without color correction the shift amounts to 326 K for tungsten and 780 K for daylight and lies therewith in the clearly visible area.

A disadvantage of this approximation of the emission spectra dependent on the ambient temperature of the LED spotlight exists in the fact that for the calculation of the single color groups of the variously colored LEDs three temperature-dependent parameters in each case and for the special case of the white color nine temperature-dependent parameters and therewith altogether 21 temperature-parameters have to be calculated for the calculation of the actual emission spectrum for a correction of the system for a compliance with the desired color of light or color temperature of the light mixture adjusted at an initial temperature. This means a significant effort as compared to the subsequently described alternative method for the approximation of the emission spectra of an actual temperature by a temperature-dependent shift+normalization of the calibration of the emission spectra determined at an initial temperature.

In case of this alternative method ("shift of peak wavelength") the emission spectra $E(\lambda)$ being dependent on the wavelength of the variously colored LEDs are approximated at a measured temperature of the LED spotlight differing from the initial temperature by a temperature-dependent shift and normalization of the initial emission spectra $E_A$ according to $$E_T(\lambda)=f_L(T)\cdot f_{VL}(T)\cdot E_A(\lambda-\Delta\lambda_p(T))$$

wherein $f_L$ (T) represents a temperature-dependent conversion factor (measured luminance of the spectrum relative to the luminance of the initial spectrum) representing a relative luminance decrease over the whole temperature range, $\Delta\lambda_p$ (T) denotes a shift of the peak wavelength as compared to the initial spectrum depending on the temperature and $f_{VL}$(T) represents a normalization factor which normalizes the spectrum shifted by $\Delta\lambda_p$ (T) onto the same luminance like that of the original spectrum (necessary due to the other position with respect to the $V(\lambda)$ curve).

In case of this alternative method, the emission spectra are shifted by the modification of the peak wavelength in the basic setting of the LED spotlight which is recorded during the calibration of the LED spotlight, afterwards they are normalized with the factor $f_{VL}$ (T) again onto the initial luminance of the spectra and are finally considered with a temperature-dependent factor. The factor $f_L$ (T) represents the measured relative luminance decrease over the whole temperature range so that the emission spectra multiplied with factors $f_L$ (T)·$f_{VL}$ (T) of the shifted initial mixtures are adjusted with respect to the luminance onto the actual emission spectra at the actual temperature in each case. To account for shifts of the peak wave length of the single color groups of the variously colored LEDs, the emission spectra are shifted along the abscissa indicating the wavelength in case of a depiction of the relative luminance over the wavelength.

The advantage of this method for the approximation of the emission spectra at various ambient temperatures of the LED spotlight exists in the fact but in opposite to the approximation of the emission spectra by the Gaussian distribution that only 10 simple to be determined instead of 21 temperature-dependent parameters have to be calculated which results in a significantly reduced calculation effort and a smaller susceptibility to errors. Disadvantageous as compared to the approximation of the emission spectra by the Gaussian distribution is, however, that the shift of peak wavelength is less precise since the modification of the half-width as well as the shoulder distribution of the emission spectra is not considered.

In case of both precedingly described methods for the approximation of the emission spectra of the variously colored LEDs for the color stabilization of an LED spotlight, the emission spectra at an ambient temperature of the LED spotlight different from the initial temperature in the basic setting, these emission spectra differing from the emission spectra of the variously colored LEDs in the basic setting during the calibration of the LED spotlight, are converted into a modification of the luminous flux portions of the respective color groups of the variously colored LEDs for the correction of the light mixture. Therefore and for the use of a further, subsequently described method for the determination of the emission spectra of variously colored LEDs at an ambient temperature of the LED spotlight differing from the initial temperature, a program-controlled processing unit is used into which the determined emission spectra of the used LED colors or the emission spectra of desired LED colors are put in, several optimization parameters are adjusted and from which luminous flux portions optimized towards different target parameters for the variously colored LEDs are determined or are provided to an electronics controlling the variously colored LEDs.

The program-controlled processing unit serves for calculation of light mixtures on the basis of variously colored LEDs by making it possible with the aid of the emission spectra of the variously colored LEDs both to determine the color properties of light mixtures of the light sources having various luminous flux portions and to calculate optimized light mixtures for certain kinds of light. Thereby, up to five emission spectra can be chosen, imported and the best possible mixture for specified color properties can be calculated via an optimization function. Further, different kinds of light used in the film production, as, e.g., tungsten incandescent light 3200 K for artificial light or tungsten and daylight or HMI light 5600 K for daylight can be chosen, wherein via further options by the input of optimization and target parameters the pre-settings can be fine-tuned to achieve an optimum light mixture. Additionally, the program-controlled processing unit offers the possibility to determine the colorimetric properties of a manually adjusted mixture so that it is, e.g., possible to examine the modifications of mixtures having the same portions but different emission spectra.

The desired color temperature of the light mixture produced by the variously colored LEDs, the mixed-light capability and the reference illuminant as well as the film material or the camera sensor for which a good mixed-light capability is to be achieved are adjustable as optimization parameters, whereas the target parameters for the optimization of the luminous flux portions consist of one or several of the parameters color temperature, minimum distance from the Planckian locus, color rendering index and mixed-light capability with film or digital camera and set values and/or tolerance values can be entered for the target parameters.

The LED spotlight can be adjusted with the luminous flux portions determined by the program-controlled processing unit for the temperature-dependent color correction onto the newly calculated light mixture in each case. The calculation can also be effected online within the spotlight or in advance in the context of the calibration and the determined results (luminous flux portions of the LED colors depending on the temperature) can be stored in table form or as a function in the internal memory of the spotlight. To correct possible deviations of the luminance which can occur after the correction, a luminance measurement with a $V(\lambda)$ sensor is additionally effected according to a further feature of the solution according to the invention so that the LED spotlight is adapted to the luminance set value from the difference between the actual luminance and the set value of the luminance via a corresponding increase or decrease of the electric power fed to the variously colored LEDs.

Since the spectral distribution of the emission of the variously colored LEDs very strongly depends on the current intensity, and in case of LED types in the blue and green area the dominant wavelength decreases with increasing current intensity, whereas in case of the LED types amber and red the dominant wavelength increases with increasing current intensity, a shift of the dominant wavelength of several nanometers would occur in a light mixture, i.e., an additive composition of the light emitted from an illuminating spotlight and made of the light emitted from the color groups of variously colored LEDs in case of a partial control by the current intensity of the variously colored LEDs to achieve a desired light mixture so that the color temperature of the light mixture emitted from the illuminating spotlight would significantly change.

Due to the strong dependency on the current of the LEDs, a partial control of the LEDs and therewith of the light mixture is not a effected via a regulation of the current intensity but via a pulse-width modulation having essentially rectangular-shaped current impulses of adjustable pulse-width and impulse pauses lying there between which form together a periodic time of the pulse-width modulation. A partial control or dimming is thereby effected by a variation of the pulse-width of the rectangular signal at a fixed basic frequency so that the rectangular impulse has the half width of the whole period in case of a 50% dimming.

Generally, one could of course also carry out an analogous dimming despite the above-described effect of the shift of the dominant wavelength dependent on the current if this shift is accordingly accounted or compensated for during the determination of the luminous flux portions. Only for the sake of simplicity, an operation with pulse-width modulation (PWM) is preferred. The operation frequency is preferably >20 kHz to avoid beats at high speed film recordings.

Accordingly, a further feature of the solution according to the invention exists in the fact that the luminous flux portions of the variously colored LEDs are controlled by controlling the variously colored LEDs by pulse-width modulation. This control is effected in connection to the previously explained emission of the luminous flux portions for the variously colored LEDs from the program-controlled processing unit by providing pulse-width modulated signal portions corresponding to the luminous flux portions to an electronics controlling the variously colored LEDs.

Thereby, a color stabilization of an LED spotlight is ensured by which—independently on a varying ambient temperature of the LED spotlight—the color of light or color temperature or the chromaticity coordinates of a desired light mixture as well as optionally further parameters which influence the light emitted from the LED spotlight like the color rendering index or the mixed-light capability, the luminous flux portions of the color groups of the variously colored LEDs are tracked or corrected. Since for tracking the luminous flux portions at different ambient temperatures only one temperature sensor is necessary and all parameters being necessary for the determination of the respective emission spectra of the variously colored LEDs can be pre-entered, the precedingly described methods for the determination of the emission spectra enable in connection to the program-controlled processing unit and a control electronics providing pulse-width modulated signals the immediate control of the single color groups of the variously colored LEDs without the necessity of an additional input of the user, after he or she has fixed the optimization and target parameters in the basic setting or calibration of the LED spotlight.

Hence, during the application of the method for the approximation of the emission spectra of the variously colored LEDs with the aid of the Gaussian distribution for the correction of the color properties or photometric properties of the LED spotlight depending on the ambient temperature the following method steps result:

- measuring the temperature values at an LED of each color group of the variously colored LEDs,
- determining the parameters $\lambda_p$, $w_{50}$ and $f_L$ for each color group via a linear or quadratic dependency on the temperature,
- calculating the new, temperature-dependent emission spectra by the Gaussian distribution with the aid of the temperature-dependent parameters,
- importing the emission spectra into the program-controlled processing unit and calculating the pulse-width modulated signal portions corresponding to the luminous flux portions for the light mixture,
- adjusting the pulse-width modulated signal portions for the variously colored LEDs at the LED spotlight and
- optionally measuring the luminance and adapting the light intensity emitted from the LED spotlight to the luminance set value by a corresponding increase or decrease of the electric power fed to the variously colored LEDs.

If the preceding method steps 1 to 4 are carried out in the context of the calibration, then the temperature-dependent luminous flux portions can be stored in the spotlight, this being generally faster and making more sense.

Thus, for the application of a method for the approximation of the emission spectra of the variously colored LEDs via a temperature-dependent shift plus normalization of the initial spectra determined during the calibration during the basic setting of the LED spotlight for the correction of the color properties or photometric properties of the LED spotlight depending on the ambient temperature, preferably the following method steps serve:

- measuring the temperature values at an LED of each color group of the variously colored LEDs,
- determining the parameters $f_L$ and $\Delta\lambda_p$ for each color group via a linear or quadratic dependency on the temperature,
- calculating the new, temperature-dependent emission spectra $E_T(\lambda)$,
- importing the temperature-dependent emission spectra $E_T(\lambda)$ into the program-controlled processing unit and calculating the pulse-width modulated signal portions corresponding to the luminous flux portions for the light mixture,
- adjusting the pulse-width modulated signal portions for the variously colored LEDs at the LED spotlight,
- optionally measuring the luminance and adapting the light intensity emitted from the LED spotlight to the luminance set value by a corresponding increase or decrease of the electric power fed to the variously colored LEDs.

Also in case of this method, the preceding method steps 1 to 4 can be carried out in the context of the calibration and the temperature-dependent luminous flux portions can be stored in the spotlight.

In both precedingly described methods, the integration of the program-controlled processing unit for the calculation of the luminous flux portions of the light mixture of the LED spotlight at different ambient temperatures is necessary and offers the advantage of a very precise calculation of the luminous flux portions of the single color groups. In particular, in case of a precise adjustment of the different options offered from the program of the program-controlled processing unit for a precise calculation of the luminous flux portions of the light mixture non-negligible calculation times have to be considered what is not acceptable for some application cases, e.g. at a film set since the LED spotlight has to be available without interruptions.

As a further alternative method, there exists the possibility that the spectra are not approximated dependent on the temperature but are measured in the context of the calibration with very precise data. In the context of the calibration, a new calculation of the mixing portions depending on the temperature can be performed and the temperature-dependent mixing portions can be stored in the spotlight in table or in function form.

Accordingly, an alternative method for the adjustment of the color properties or photometric properties of an LED spotlight being composed of variously colored LEDs the luminous flux portions of which determine the color of light, color temperature and/or the chromaticity coordinates of the light mixture emitted from the LED spotlight and are adjusted by controlling the variously colored LEDs by pulse-width modulated signals, depending on the ambient temperature of the LED spotlight exists in that the pulse-width modulating signals controlling the variously colored LEDs corresponding to the luminous flux portions of the single color groups for the basic setting of the light mixture are temperature-dependently modified to a specified color of light.

This alternative method represents a very simple solution for a color correction at different ambient temperatures and is based on the temperature dependency of the pulse-width modulating signals controlling the variously colored LEDs, having the target to keep the relative luminous flux portions of the colors participating in the color mixture constant over the whole ambient temperature range. By an increase or decrease of the pulse-width modulated signal portions, the spectra emitted by an actually detected ambient temperature are adapted to the luminous flux portions of the initial spectra detected in the basic setting during the calibration of the LED spotlight so that the specified light mixture can be further used.

Thereby, the temperature dependency of the pulse-width modulated signal portions can be determined from the modification of the luminance. Examinations have shown that the variously colored LEDs are indeed very differently strong temperature-dependent (LEDs which emit in the long wave range of the visible spectrum decrease in the luminance with increasing temperature significantly stronger than LEDs of the short wave range), this temperature dependency of the luminance over a big temperature range, which is important for the practical application, can, however, be determined and described for each color via a linear or quadratic function.

If one determines accordingly the relative luminance modification with respect to the light mixture adjusted in the basic setting, then one obtains a factor $f_{PWM}$ for each color group of the variously colored LEDs. If the corresponding portion of the pulse-width modulated signal for the respective LED color of the basic setting of the light mixture is multiplied with the reciprocal of the factor $f_{PWM}$, then the new portion of the pulse-width modulated signal for the respective LED color at the actual measured ambient temperature is achieved out of it.

A further development of this simplified alternative method for the color stabilization of an LED spotlight therewith exists in that a factor $f_{PWM}$ corresponding to the relative luminance modification of each color group of the variously colored LEDs with respect to the basic setting is determined and in that the multiplication of the value corresponding to the basic setting of the pulse-width modulated signals $PWM_A$ of each color group results with the reciprocal $1/f_{PWM}$ of this factor being dependent on the measured temperature results in the value of the pulse-width modulated signals PWM (T) of each color group corresponding to the measured temperature T according to the formula:

$$PWM(T)=PWM_A/f_{PWM}(T)$$

Also in this simplified method, possible deviations in the luminance which can occur after determining the luminous flux portions of the variously colored LEDs at the actual measured temperature can be corrected in that a luminance measurement is performed with an V(λ) sensor, the difference between the measured luminance actual value and a luminance set value is determined and the luminance emitted from the LED spotlight is adapted by a corresponding increase or decrease of the electric power fed to the variously colored LEDs to the luminance set value.

An essential advantage of this correction with respect to the normalization of the pulse-width modulated signal portions for controlling the variously colored LEDs exists in the simplicity of the determination of the correction factors since for a new adjustment of the light mixture only five parameters have to be calculated by a simple function and subsequently the original portions have to be evaluated with these parameters. Thereby, a calculation via a program-controlled processing unit is not necessary so that the big portion of the calculation and programming effort of both previously described methods for the approximation of the emission spectra of the variously colored LEDs and the correction of the luminous flux portions of the variously colored LEDs is omitted.

Due to the very short calculation time, the correction for the color stabilization of the LED spotlight can continuously take place so that during operation of the LED spotlight stable color properties like color temperature, color reproduction, distance from the Planckian locus and mixed-light capability are guaranteed. Despite the simplicity of this correction method the differences occurring in the color values after the correction are comparably to the precedingly mentioned color deviations by Gaussian approximation such small that they can be neglected.

Although during the application of the different methods according to the invention for the color stabilization of an LED spotlight at different ambient temperatures to guarantee a low production and time effort no color sensors are necessary, but only a temperature sensor is needed, for, e.g., considering aging processes the output signals of a color sensor or a spectrometer additionally installed at the LED spotlight can be accounted for during the determination of the luminous flux portions of the color groups of the variously colored LEDs of the light mixture in the basic setting, wherein the output signals of the color sensor or the spectrometer are provided to the program-controlled processing unit for the determination of the luminous flux portions or the pulse-width modulated signals corresponding to the luminous flux portions of the color groups of the variously colored LEDs of the light mixture in the basic setting.

If the color sensor is calibrated, on the one hand the chromaticity coordinates x, y and the dominant wavelength of the color calculated out of it and on the other hand the brightness of the single LEDs can be extracted from the RGB or XYZ signals of the color sensor. Simultaneously to the color values, the actual temperature is read from the temperature sensor to correlate the new measured values with the temperature-dependent characteristic lines (λp, w50 and brightnesses) stored in the memory. From this, the parameters intensity as well as peak wavelength being necessary for the Gaussian approximation can be determined, the half-width is considered as approximately constant with respect to the original spectrum.

In the context of the color control of the LED illuminating device a temperature-dependent power limiting is performed since the total power of the LED illuminating device or the total current fed to all LEDs of the LED colors must not exceed a specified, preferably temperature-dependent threshold; because it makes less sense to feed more current with increasing temperature and consequently decreasing brightness of the LED illuminating device in the expectation to therewith compensate the decrease in brightness of single or several colors. With an increase of the current feed and therewith of the total power of the LED illuminating device the temperature further increases so that the luminous efficacy further decreases, until single or several LEDs are overloaded and are therewith destroyed or a hardware-based current limitation intervenes.

Accordingly, a limitation of the power consumption of the LED spotlight and/or of the total current fed to the LED is provided, wherein the power consumption of the LED spotlight and/or of the total current fed to the LEDs can be temperature-dependently limited.

A further method for the temperature-dependent adjustment of the color properties or photometric properties of an LED illuminating device having LEDs emitting light of different color or wavelength, the luminous flux portions of which determine the color of light, color temperature and/or a chromaticity coordinates of the light mixture emitted from the LED illuminating device and are adjusted by controlling the variously colored LEDs being grouped together to LED color groups having the same color in each case and consisting of colored and white LEDs by pulse-width modulated control signals is characterized by a color control of the LED illuminating device by a temperature characteristic line (Y=f (Tb)) of the LED illuminating device, the temperature characteristic line reflecting the brightness (Y) depending on the board temperature (Tb) of the LEDs arranged on a board and/or of the junction temperature of at least one LED for each LED color or LED color group at a specified current in the steady state.

In this method, the determination of temperature characteristic lines of the LED illuminating device is carried out by a determination of the function of the brightness (Y) depending on the board temperature Tb for each LED color at a specified current in the steady state (Y=f (Tb)), a normalization of the characteristic lines onto (Y (Tb1)=1), wherein (Tb1) is an arbitrarily chosen temperature value close to the later working point, a determination of the parameters (a, b, c, d) for a linear function of the form $$Y(Tb)=a+b*Tb$$

a second-degree polynomial of the form $$Y(Tb)=a+b*Tb+c*Tb^2$$

or a third-degree polynomial of the form $$Y(Tb)=a+b*Tb+c*Tb^2+d*Tb^3$$

and storing the parameters a, b, c, d in illuminating modules of the LED illuminating device, in the LED illuminating device or in an external controller.

For a preferably random determination of calibration correction factors for the LED illuminating device a measurement of the brightness (Y) and the board temperature (Tb) for each LED color is effected immediately after turning on the LED illuminating device, having the results Y(Tbcal, t0), measurement of the brightness (Y) and board temperature (Tb) for each LED color in the steady state and conversion of the brightness (Y(Tb), t1) to a board temperature (Tb1) via the characteristic line (Y=f(Tb)), having the result Y(Tb1, t1) as well as the formation of correction factors $$kYcal=Y(Tb1,t1)/Y(Tbcal,t0)$$

which are valid for the board temperature (Tbcal) measured during the calibration.

For the brightness calibration for an illuminating module of the LED illuminating device a measurement of the brightness (Y) and the board temperature ($T_b$) for LED color immediately after turning on, having the result Y(Tbcal, t0), a conversion to the brightness in the static state at an assumed board temperature (Tb1) for each LED color according to $$Y(T_{b1})=Y(Tbcal,t0)*kYcal$$

is carried out and the brightnesses (Y) of the LED colors in the LED illuminating device converted to the assumed board temperature (Tb1) are stored. For color calibration of the LED illuminating device, a measurement of the spectrum is effected and brightness (Y) derived out of it as well as chromaticity coordinates (x, y) for each LED color of the LED illuminating device, a conversion of the brightness of the spotlight to a board temperature (Tb1) by the characteristic line (Y=f(Tb)) and scaling spectra to ($Y=Y(T_{b1})$), storing the calibration data (x, y) and ($Y(T_{b1})$) for each LED color in the LED illuminating device, a calculation of the optimum luminous flux portions of the LED colors from the measured spectra for N color temperature interpolation points using the program-controlled processing unit, storing the luminous flux portions of the LED colors for N color temperature interpolation points in the memory of the LED illuminating device and/or storing the luminous flux portions of the LED colors in table form dependent on the target chromaticity coordinates (x, y).

Finally, a color control of the LED illuminating device under using the stored calibration data for N color temperature interpolation points and/or as chromaticity coordinates table for the luminous flux portions of the LED colors, the temperature characteristic lines for each color and the brightness (Y) and the chromaticity coordinates (x, y) for each LED color can be effected by determining the PWM control signals for the LED colors ($PWM_A$) for the desired chromaticity coordinates (x, y) and the desired brightness (Y), measuring the board temperature (Tb), determining the temperature-dependent PWM correction factors for each LED color from the approximation characteristic lines (fPWM=1/Y) stored in the memory, detecting the total power of the LED illuminating device or the electrical current fed to the single LEDs of the LED illuminating device and controlling the LEDs of the LED illuminating device with the PWM correction factors at a total power of the LED illuminating device or a electrical current fed to the LEDs of the LED illuminating device smaller than the specified maximum value (Pmax, Imax) or determining a cut-off factor (kCutoff) for limiting the current or power for all LED colors from $$kCutoff=Pmax/Pneu$$

or $$kCutoff=Imax/Ineu$$

and controlling the LEDs of the LED illuminating device with new PWM factors according to $PWM_T$=PWMA*fPWM*kCutoff.

The precedingly described calculation steps for the determination of the temperature-dependent spectra and the following new calculations of the mixing ratios can be effected both "online" within the spotlight and in advance in the context of the calibration.

An apparatus for the temperature-dependent adjustment of the color properties or the photometric properties of an LED illuminating device having variously colored LED color groups, the luminous flux portions of which determine the color of light, color temperature and/or the chromaticity coordinates of the light mixture emitted from the LED illuminating device is characterized by an input device for adjusting the color of light, color temperature and/or the chromaticity coordinates of the light mixture to be emitted from the LED illuminating device and for specifying application-specific target parameters and their admissible deviations from an ideal value, a temperature measuring device arranged within the housing of the LED illumination device and/or in the area of at least one LED of the variously colored LED color groups and emitting a temperature signal corresponding to the measured temperature, a control device for controlling the LEDs of the variously colored LED color groups with pulse-width modulated current pulses, a memory having stored calibration data for each LED color group for at least one value determining the emission spectrum depending on the temperature and a microprocessor connected to the control device and to the memory for determining pulse-width modulated control signals corresponding to the luminous flux portions for each LED color group for controlling the LEDs of the LED color groups depending on the temperature signal provided by the temperature measuring device.

The input device for adjusting the color of light, color temperature and/or the chromaticity coordinates of the light mixture to be emitted from the LED illuminating device and for pre-setting application-specific target parameters and their admissible deviations from an ideal value consists preferably of a mixing device or DMX console.

The control device for controlling the LED color groups with pulse-width modulated current impulses has a program-controlled input connected to the microprocessor, a light mixing input connected to the input device and a sensor and/or calibration input connected to a sensor and/or a calibration handheld unit and is connected to a feeding voltage source.

BRIEF DESCRIPTION OF THE DRAWINGS

The methods according to the invention and their respective advantages are subsequently further explained by means of exemplary embodiments. In the Figures.

DETAILED DESCRIPTION

Figure 1:
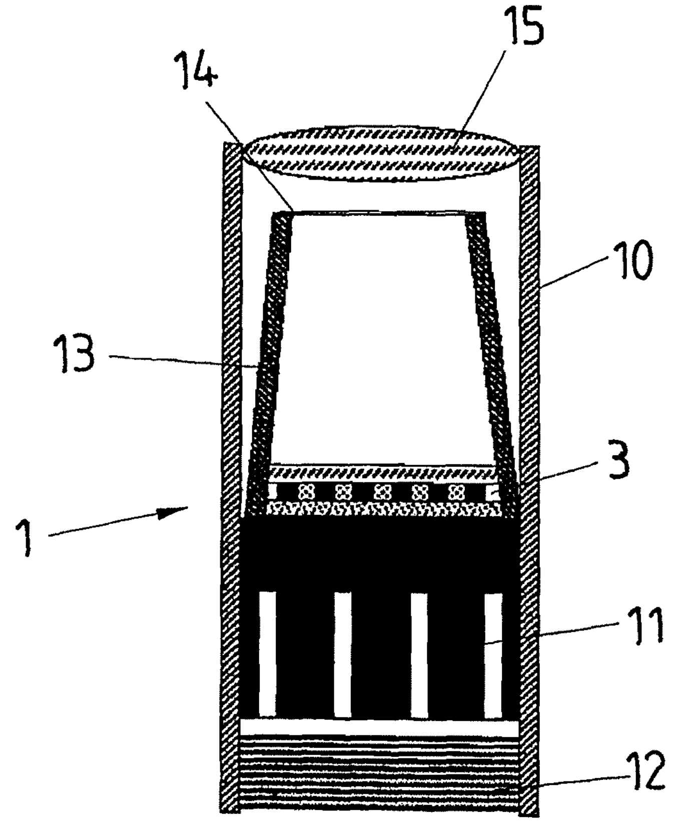
FIG. 1 shows a schematic depiction of an LED illuminating device designed as LED spotlight or LED panel of different size.

FIG. 1 shows a section through the schematic construction of an LED illuminating device designed as LED spotlight 1 having cylinder-shaped housing 10, in which an LED light source 3 is arranged which is composed of a ceramic board, variously colored LEDs arranged on the ceramic board in chip-on-board technology and a pottant applied over the LEDs. The LED light source 3 is applied directly onto a cooling body 11 made of well heat conducting material like copper or aluminum by means of a heat conducting adhesive, the heat sink 11 dissipating the heat emitted from the LEDs of the LED light source 3. A fan 12 arranged on the backside of the LED spotlight 1 provides for an additional cooling of the LEDs.

The light mixing is effected by a cone-shaped or alternatively cylinder-shaped light mixing rod 13 at the end of which a diffusion disc 14 designed as POC foil is arranged. The LED spotlight 1 can be adjusted continuously between a spot and flood position by a Fresnel lens 15 which can be adjusted in the longitudinal direction of the LED spotlight 1.

Figure 2:
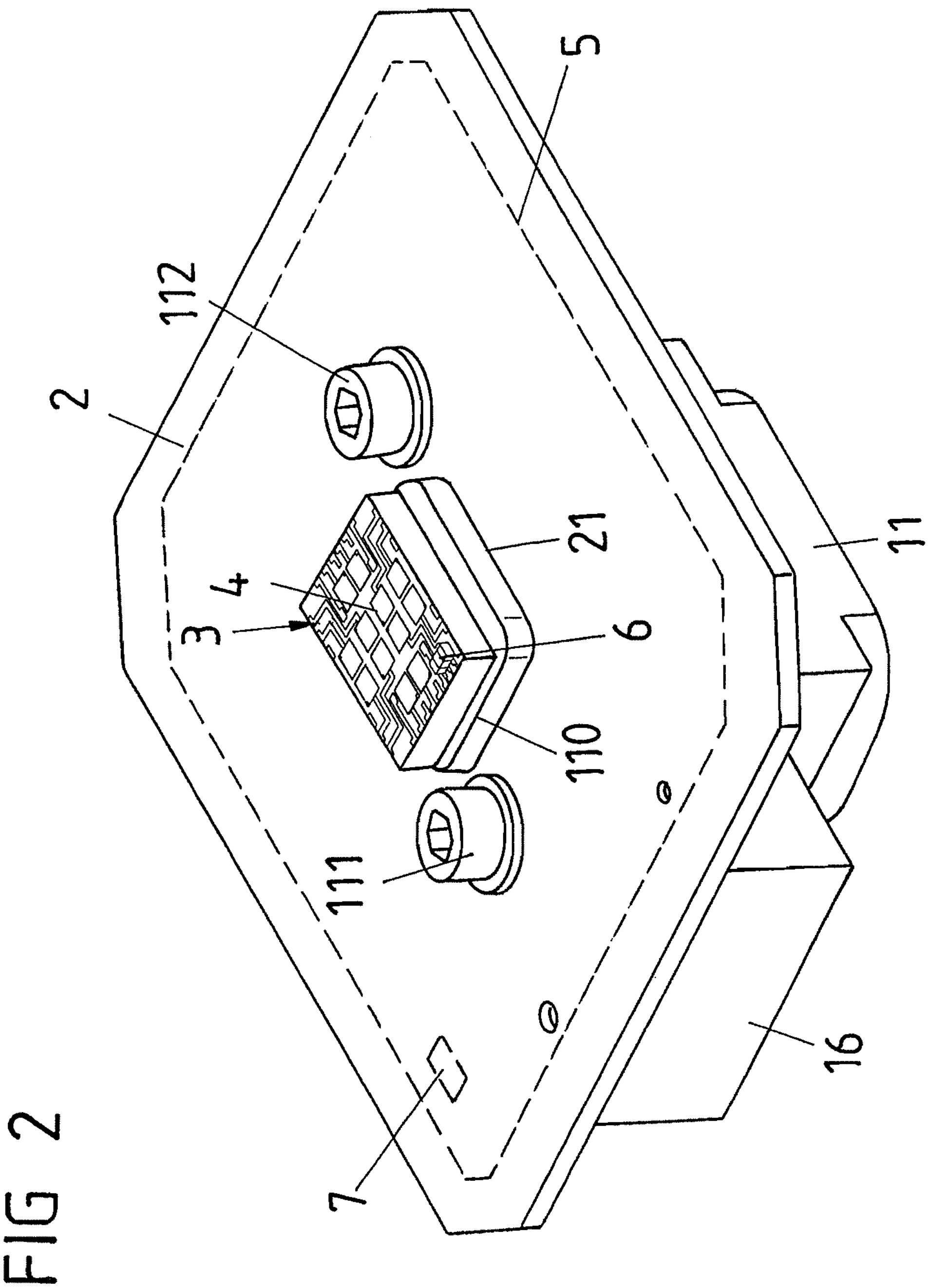
FIG. 2 shows a perspective depiction of an illuminating module having a module carrier and a light source connected to the socket of a module heat sink.

FIG. 2 shows a perspective depiction of an illuminating module which consists of a quadrangular module carrier 2 designed as conductor board on which a module electronics 5 is arranged and which has a recess 21 through which a socket 110 of a module heat sink 11 is plugged, the socket 110 projecting over the surface of the module carrier 2, the module carrier 2 being connected to the lower side of a connection plug board 16 via which the module electronics is connected to a power controlling unit. A light source 3 is arranged on the socket 110 of the module cooling body 16, the light source 3 having several LEDs 4 arranged on a cubic-shaped metal core board, the LEDs 4 emitting light of different wavelength and therewith color, the light source 3 also having a temperature sensor 6 and conductor paths for connecting the LEDs 4 and the temperature sensor 6 to the edges of the metal core board, from where they are connected to the module electronics via a direct wire or a bond connection.

The LEDs 4 are composed of several LEDs emitting light of different wavelength, i.e. different color. By a close arrangement of the LEDs 22 on the metal core board a light mixture of the different colors is already generated, the light mixture being adjustable by the choice of the LEDs and being able to be optimized by additionally procedures like optical light focusing and light mixing and to be kept constantly by further control and regulation procedures independently on, e.g., the temperature to be able to adjust a desired color temperature, brightness and the like.

Figure 3:
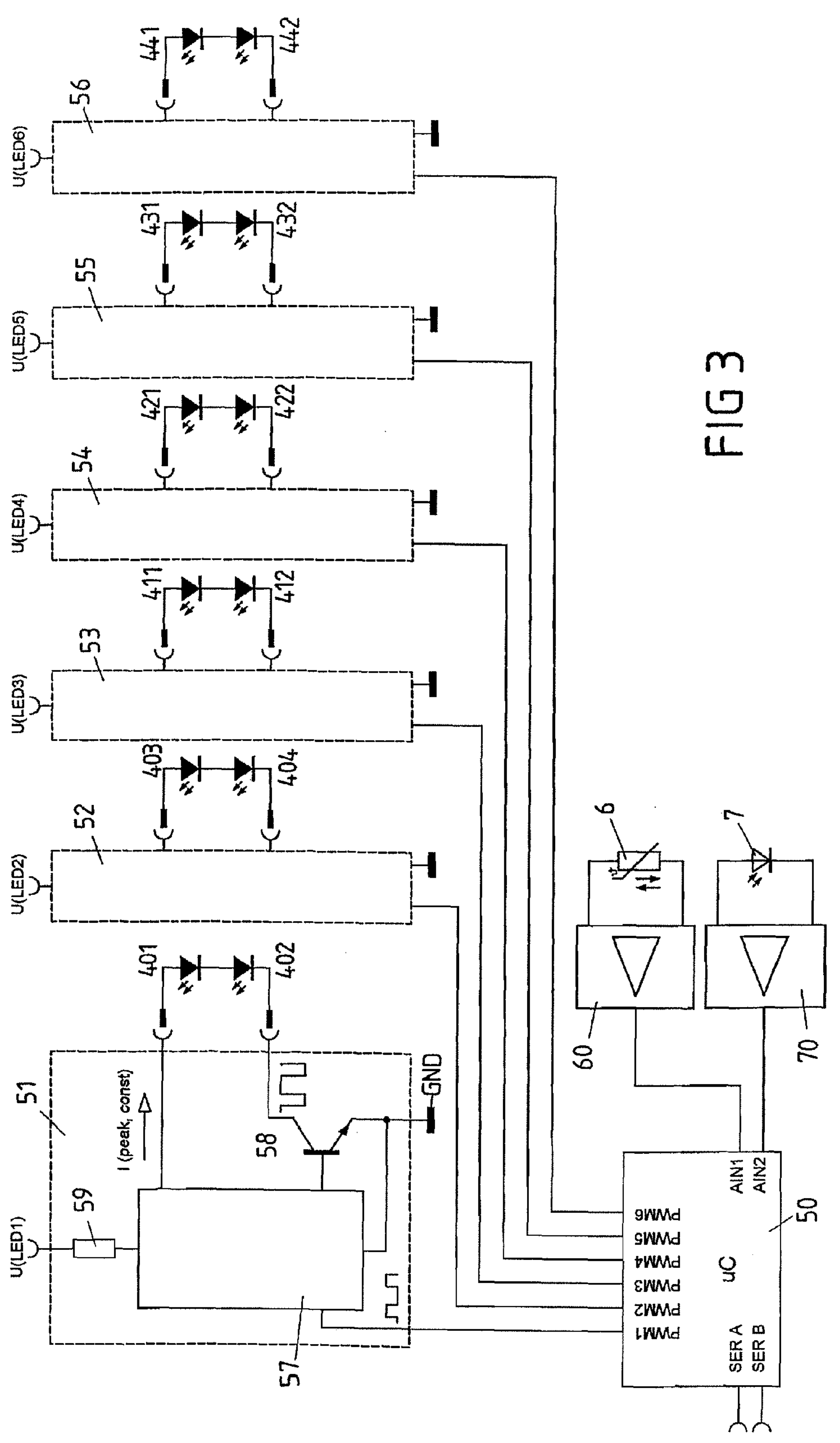
FIG. 3 shows a block diagram of a module electronics having similarly constructed driver circuits.

FIG. 3 shows a functional diagram of the module electronics 5 for controlling six LED groups having two LEDs 401, 402; 403, 404; 411, 412; 421, 422; 431, 432; 441, 442 in each case connected in series and emitting light of the same wavelength for the regulation of the light mixture to be emitted from the LEDs by a brightness control of the single LED groups by a pulse-width modulated control voltage and controlling a temperature-stabilized current source for feeding the LED groups.

The module electronics 5 contains a microcontroller 50 which provides six pulse-width modulated control voltages $PWM_1$ to $PWM_6$ to six constant current sources 51 to 56 being constructed identically. The microcontroller 50 is connected to an external controller via a serial interface SER A and SER B and has inputs AIN1 and AIN2 which are connected to a temperature sensor 6 and a brightness or color sensor 7 of the illuminating module via amplifiers 60, 70.

The identically constructed current sources 51 to 56 are very well temperature-stabilized and contain a temperature-stabilized constant current source 57 which is connected to an output PWM1 to PWM6 in each case of the outputs PWM1 to PWM6 providing the pulse-width modulated control voltages of the microcontroller 50 and is connected to a feeding voltage $U_{LED1}$ to $U_{LED6}$ via a resistor 59. The temperature-stabilized constant current source 57 is on the output side connected to the anode of the LEDs connected in series of an LED group which emit light of the same wavelength in each case and to the control connector of an electronic switch 58 which on the one hand is connected to the cathode of the LEDs connected series and on the other hand to the ground potential GND.

The temperature-stabilized constant current source 57 is characterized by a fast and neat switching at a switching frequency of 20 to 40 kHz. To keep the power losses of the illuminating module as small as possible, the LED chips being differently in the production technology are fed with up to six different feeding voltages $U_{LED1}$ $U_{LED6}$.

By arranging the temperature-stabilized current sources 51 to 56 on the module carrier of the illuminating module the modularity of the system is ameliorated and the voltage supply is simplified. By a reduction of the different feeding voltages $U_{LED1}$ to $U_{LED6}$ by an application of only two different voltages for a group-wise grouped together voltage supply of the current sources 51 to 56 for, e.g., the red and yellow LEDs on the one hand and the blue, green and white LEDs on the other hand, the illuminating module needs only five interfaces, i.e. a connection of the illuminating module via five conductors, namely two supply voltages $V_{LED1}$ and $V_{LED2}$, ground potential GND and the serial interfaces SER A and SER B with an external controller for the higher ranking control and regulation of a plurality of likewise constructed illuminating modules.

To clarify the different methods according to the invention for the adjustment of the color properties or photometric properties of an LED illuminating device and of the problem underlying the invention, subsequently the different parameters which determine the color emission of LEDs are explained in summary by means of FIGS. 4 to 11.

Figure 4:
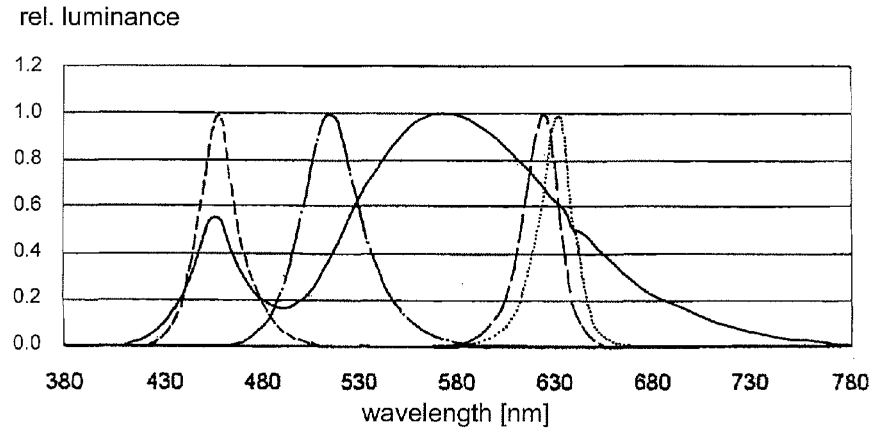
FIG. 4 shows emission spectra of five variously colored LEDs of an LED illuminating device.

FIG. 4 shows the spectra of variously colored LEDs in an LED illuminating device as depiction of the relative luminance over the wavelength of the light emitted by an LED illuminating device. Since LEDs do not emit light monochromatically with a sharp spectral line but in a spectrum having a certain bandwidth which spectrum can be approximately assumed as Gaussian bell-shaped curve, the emission spectra of LEDs can be simulated as a Gaussian distribution. FIG. 4 shows in continuous line the emission spectrum of a white LED, in short dashed line the emission spectrum of a blue LED, in long dashed line the emission spectrum of a yellow or amber colored LED, in dotted line the spectrum of a red LED and in a dotted and dashed line the emission spectrum of a green LED.

It can be learnt from this spectral depiction that the shape of the spectrum of the LED emitting white light differs strongly from the spectra of the LEDs emitting colored light. This results from the technology of generating white light in which as basis for the light generation a blue chip is used, the spectrum of which is the reason for the first small peak of the spectrum of the white LED. The phosphor covering of the blue LED chip converts the blue light partially into yellow light from which the second, higher peak in the yellow area of the spectrum results. In mixed form, the portions result in white light. By the thickness of the phosphor covering, the color temperature of the white light can be varied so that in this manner both warm white and daylight white LEDs can be produced.

Figure 5:
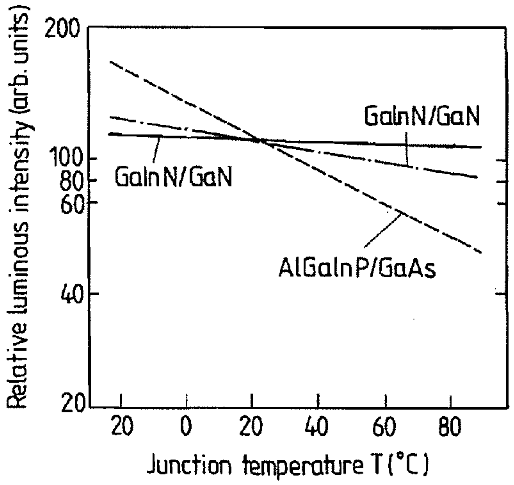
FIG. 5 shows a graphic depiction of the temperature dependency of LEDs of different color and material composition.

FIG. 5 shows the temperature dependency of LEDs in a depiction of relative luminance over the junction temperature T in ° C. at different material combinations. The temperature dependency of the LEDs is making up big problem when using LEDs as illuminant. With increasing junction temperature T the properties and characteristics of LEDs vary significantly. Thus, the luminance strongly decreases with increasing temperature T and a shift of the spectra to higher wavelengths, i.e. towards red light, occurs. These temperature dependencies are differently strong pronounced dependent on the used materials, resulting in the fact that also the colorimetric properties of a light composition mixed from LEDs additively emitting white light and colored light vary.

Subsequently the luminances, peak wavelengths and half-widths of single LED color groups being composed of several LEDs emitting light of the same color shall be regarded dependent on a temperature present at an LED of the respective color group by means of FIGS. 6 to 11 and an analysis of the spectra and the luminances as well as the color temperature and the chromaticity coordinates of the light mixtures for tungsten and daylight, also dependent on the present temperatures, shall be carried out.

As can been seen from the depiction according to FIG. 5 the variously colored LEDs have a differently strong temperature dependency. Those LEDs which emit in the long-wave range of the visible spectrum decrease in the luminance with increasing temperature T in ° C. significantly stronger than those LEDs which emit in the short-wave range of the visible spectrum. Thus, the LED colors amber and red show a luminance decrease of 128% or 116% at 20° C. to 65% or 75% of the initial value at 60° C. The color groups blue and green are significantly less temperature-dependent with respect to their luminance. Since the white LEDs are based on the technology of blue LEDs, also a significantly smaller temperature dependency of the luminance decrease of white LED results.

Like in case of the luminance, the temperature dependency also differs for the peak wavelength for different LED types.

Figure 6:
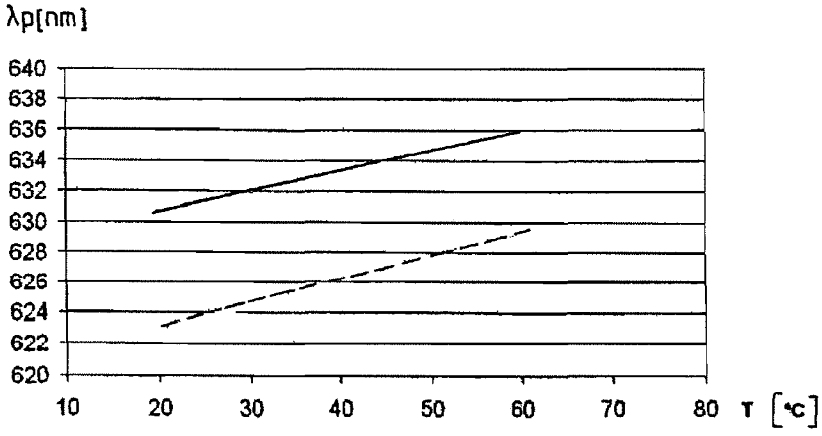
FIG. 6 shows a graphic depiction of the temperature dependency of the peak wavelength of the LED color groups amber and red.

FIG. 6 exemplarily shows the temperature dependency of the peak wavelength $\lambda_P$ for the LED groups amber and red and clarifies a shift of the peak wavelength $\lambda_P$ with increasing ambient or junction temperature T in ° C. of the LEDs. Also with respect to the peak wavelength $\lambda_P$ the LEDs in the higher-wave visible range like amber and red are stronger temperature-dependent than LEDs of the LED groups blue and green which are much less temperature-dependent.

Figure 7:
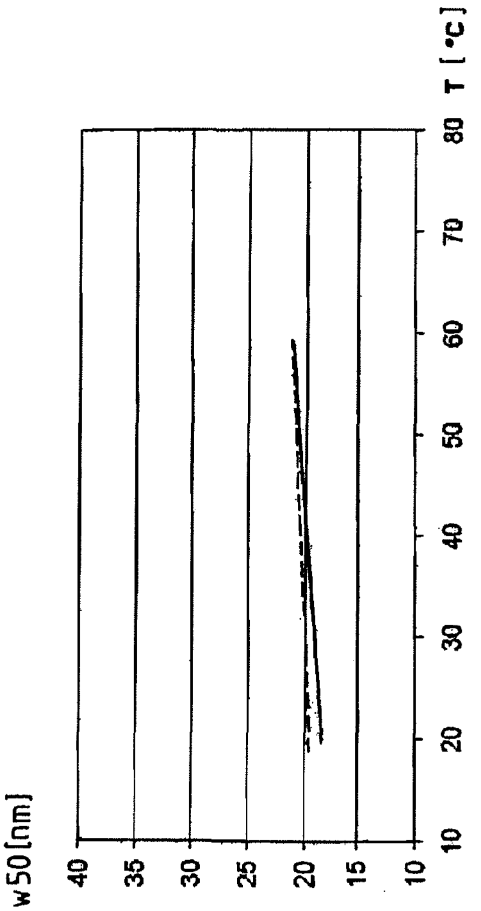
FIG. 7 shows a graphic depiction of the temperature dependency of the half-width for the LED color groups amber and red.

Also the half-width $w_{50}$ of the emitted spectra is linearly dependent on the temperature T in ° C. as are the luminance and the peak wavelength $\lambda_P$ of the single LED color groups. In contrast to those two latter-mentioned parameters, the differences between the various LED color groups are here not so serious. FIG. 7 exemplarily depicts the devolutions of the half-width $w_{50}$ of the LED colors amber and red over the temperature T in ° C. In contrast to the luminance and peak wavelength $\lambda_P$, the half-width $w_{50}$ is for the LEDs of the groups blue and green comparably temperature-dependent like for the groups amber and red.

Figure 8:
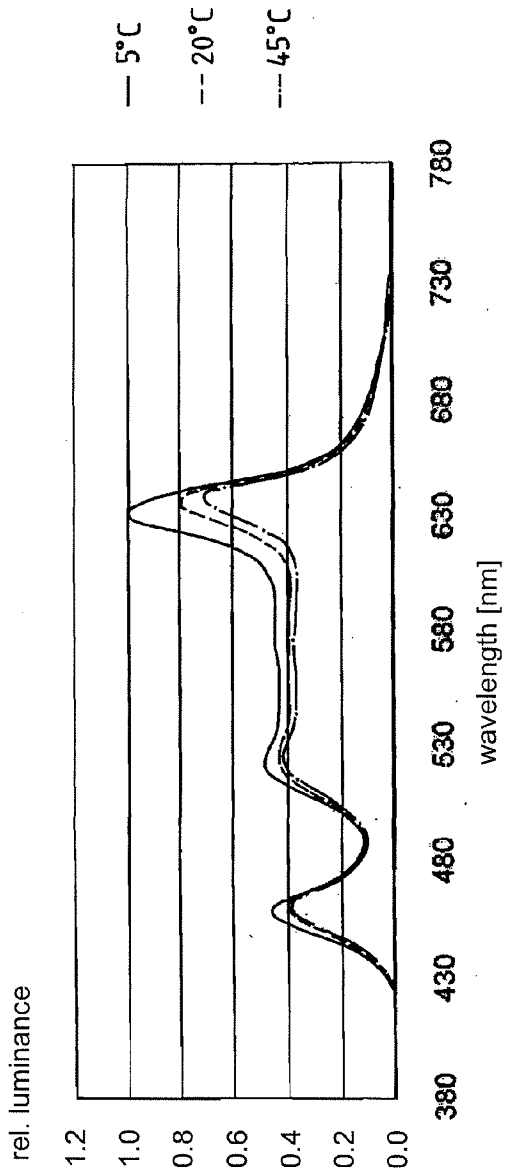
FIG. 8 shows a graphic depiction of the temperature dependency of the spectra for tungsten.
Figure 9:
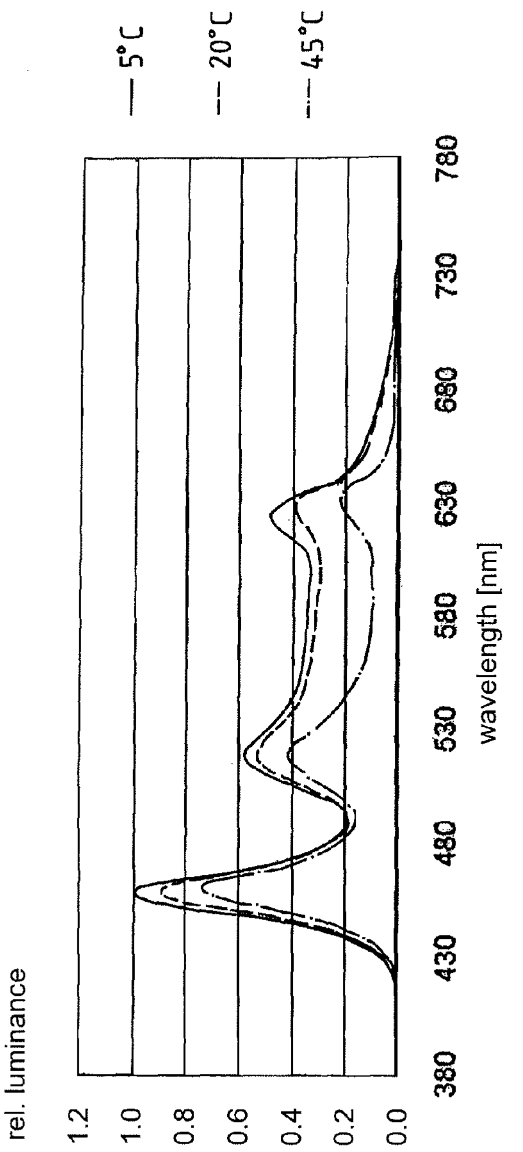
FIG. 9 shows a graphic depiction of the temperature dependency of the spectra for daylight.

For an explanation of the temperature dependency of the spectra for the light mixtures "tungsten" and "daylight", FIG. 8 depicts the relative luminance over the wavelength in nm for the light mixture "tungsten" and FIG. 9 depicts it for the light mixture "daylight" at different junction temperatures.

A significant decrease of the luminance with the temperature can be seen for both light mixtures, wherein the spectrum of the light mixture shifts towards longer wavelengths due to the shift of the peak wavelength of the single LED color groups. The strong luminance decrease of the LED color groups amber and red is particularly obvious in FIGS. 8 and 9.

Figure 10:
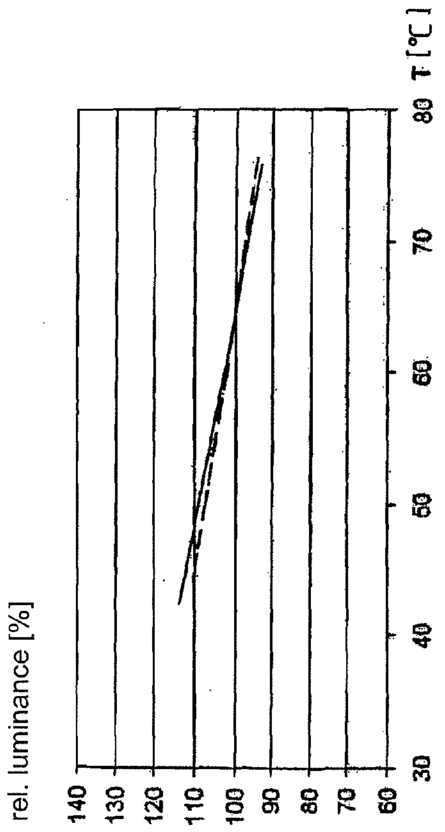
FIG. 10 shows a graphic depiction of the relative luminance for tungsten and daylight dependent on the temperature.

FIG. 10 shows the relative luminance in percent over the temperature T in ° C. of the light mixtures "tungsten" and "daylight" relating to an ambient temperature of 20° C. and clarifies that the temperature influence onto the single LED color groups causes a decrease of the luminance in the light mixture which is non-negligible. Thereby, the light mixture "tungsten" shows a bigger relative luminance decrease than the light mixture "daylight".

Figure 11:
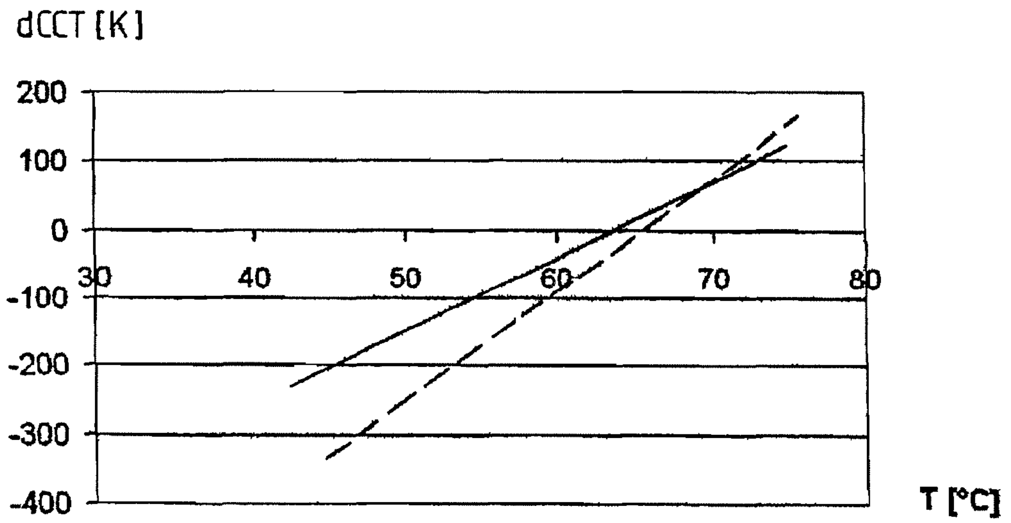
FIG. 11 shows a graphic depiction of the color temperature shift for tungsten and daylight dependent on the temperature.

FIG. 11 shows the color temperature shift dCCT in K for "tungsten" and "daylight" dependent on the ambient temperature T and clarifies that the significantly stronger temperature sensitivity of the LEDs in the ranges red and amber with respect to the luminance leads to a blue shift of the color of light with increasing temperature.

To correct for the precedingly described temperature-dependent modifications of the chromaticity coordinates, different methods can be applied according to the invention. Firstly, the spotlight has to be calibrated by determining a basic mixture for the settings "tungsten" with 3200 K and "daylight" with 5600 K. To adjust the correct color of light at the spotlight, the portions, i.e. the pulse-width of the pulse-width modulation (PWM) have to be determined for the control of the LED color groups. These portions are calculated with the aid of a program-controlled processing unit schematically depicted in FIG. 12.

Figure 13:
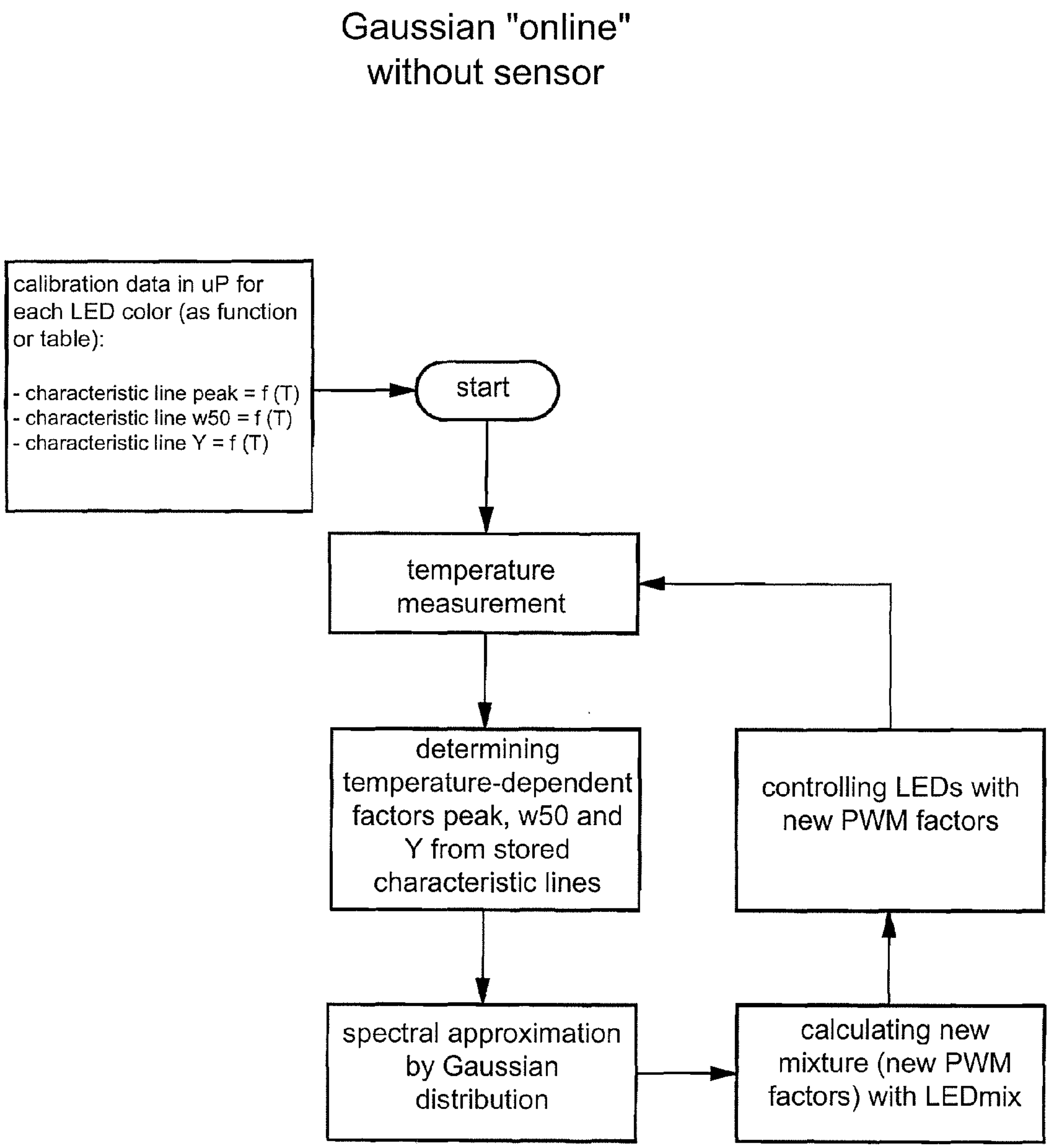
FIG. 13 shows a schematic block diagram of the algorithm for the color correction by a spectral approximation via the Gaussian distribution without light sensor.

To be able to adjust the correct color of light at the spotlight, the portions (pulse widths $\tau$) of a pulse-width modulation (PWM) have to be determined for all LED color groups. This is calculated with the aid of the program-controlled processing unit, the principle construction of which is depicted in FIG. 13.

Description Block Diagram LED Mix

Figure 12:
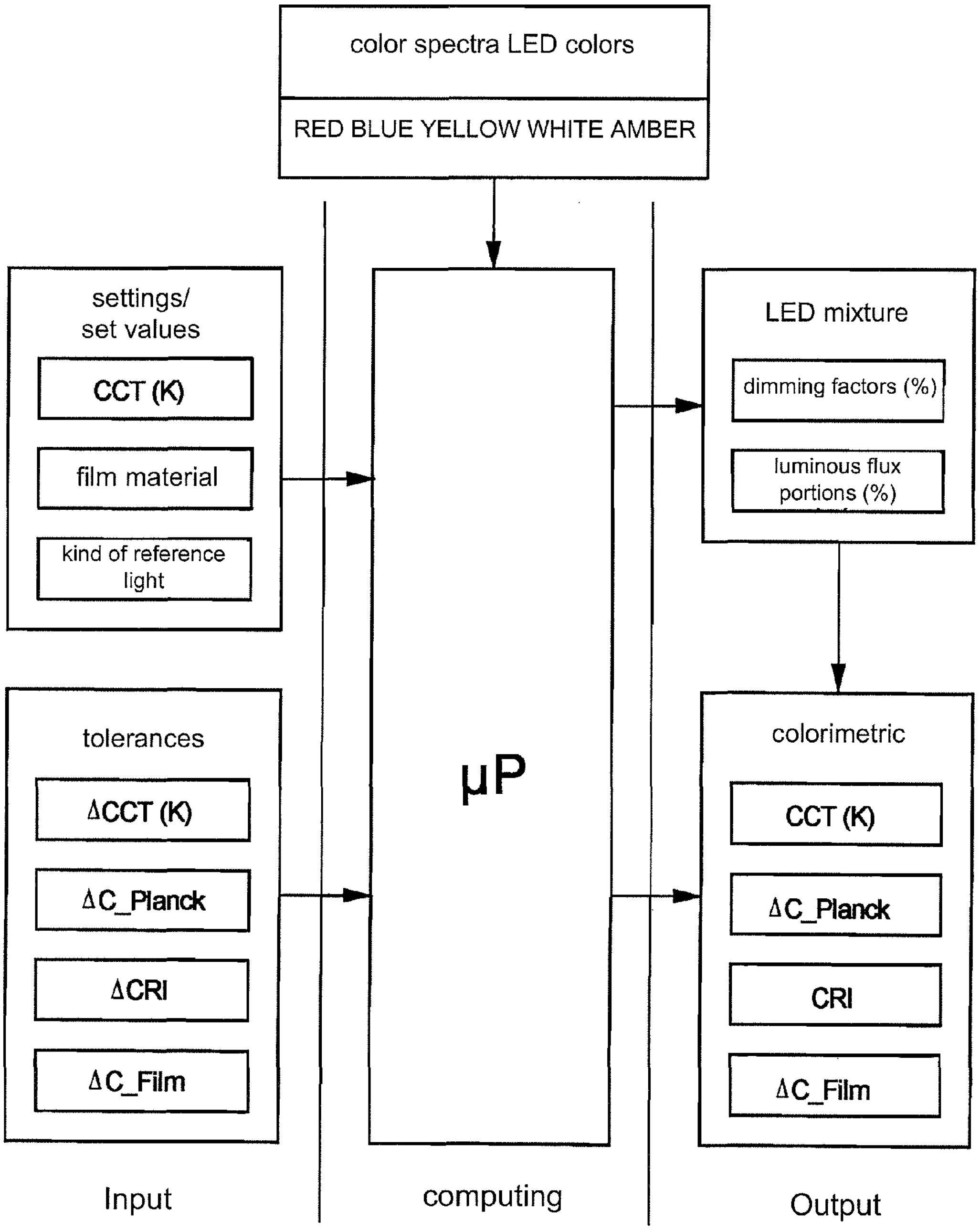
FIG. 12 shows a schematic block diagram of a program-controlled processing unit for determining the luminous flux portions or pulse-width modulated signals of color groups of variously colored LEDs.

Different spectra of LED colors can be read into the program-controlled processing unit provided within the solution of the preceding problem, e.g. the LED colors red, blue, yellow, white and amber indicated in FIG. 12. The user can adjust the following optimization parameters as set values on the input side:

- the target color temperature of the LED mixture (e.g. 3200 K, 5600 K)

the film material or the camera sensor with which no color deviation shall be produced as compared to the reference illuminant (good mixed-light capability),
(e.g. Kodak 5246D, Kodak 5274T)
the reference illuminant for the camera (e.g. incandescent lamps 3200 K, daylight
5600 K, HMI etc.) for which a good mixed-light capability shall be achieved.

The program-controlled processing unit optimizes the mixture portions of the imported color spectra of the LED colors onto the following parameters via genetic algorithms:

color temperature minimum distance from the Planckian locus (i.e. as possible, no color deviation in the direction green or magenta is visible for the eye)

color rendering index (as close to 100 as possible)

mixed-light capability with film or digital camera. The color distance between the determined mixture and the reference illuminant has to be minimal for the recording medium film or camera.

Besides the set values, the user can enter admissible deviations or tolerances Δ CCT (K), Δ C_Planck (color distance to the Planckian locus), Δ CRI, ΔC_film (color distance mixed-light capability) for the precedingly indicated target values CCT (K), film material/type of sensor and reference illuminant for mixed-light capability.

The portions of the LED spectra of the LED colors for adjusting an optimum mixture having being entered into the program are then the result of the optimization by the program-controlled processing unit. The output of the LED mixture, i.e. the dimming factors and the luminous flux portions for each of the LED colors as well as the colorimetric values achieved with this mixture for the chromaticity coordinate, the color temperature, the color distance to the Planckian locus, the color rendering index as well as the mixed-light capability with a film camera or a digital camera are also calculated and output.

For tracking the spectra of the single LED colors or LED color groups of a light mixture dependent on the housing-internal ambient temperature, the board or the junction temperature of the LED chips, different methods can be applied according to the invention which are subsequently explained by means of FIGS. 13 to 20.

FIG. 13 shows a first variant in which the control of the LEDs of the single LED colors is effected online with a pulse-width modulation (PWM), i.e. by immediate input of the temperature-dependently determined dimming factors for the single LED colors at the control electronics of the LEDs or in which the luminous flux portions being necessary for the light mixture for each of the LED colors are output. In this first method no light sensor is used for the luminance measurement.

The calibration data, i.e. the characteristic lines for the peak wavelength peak=f(T), the half-width $w_{50}$=f(T) and the luminance $Y_0$=f(T) as function of the temperature are stored in the microprocessor of the program-controlled processing unit as function or table in the memory of the microprocessor for each LED color. After the start of the program, the following is effected:

1. Measuring the temperature at an LED or an LED color group,
2. Determining the temperature-dependent parameters for the peak wavelength peak=f(T), the half-width $w_{50}$=f(T) and the luminance $Y_0$=f(T) from the stored characteristic lines, calculation of the new spectra via the Gaussian distribution according to the Gaussian bell-shaped curve $$E(\lambda) = e^{-2.7725\cdot\left(\frac{\lambda-\lambda_p}{w_{50}}\right)^2}$$

or for an even more precise approximation of the spectrum via the formula $$E(\lambda) = f_L \cdot \frac{1}{\frac{w_{50}}{2}\cdot\sqrt{2\pi}} \cdot e^{-\frac{1}{2}\left(\frac{\lambda-\lambda_p}{w_{50}/2}\right)^2}$$

being based on the Gaussian distribution, with
$\lambda_p$ the peak wavelength of the LED emission spectrum,
$w_{50}$ the half-width of the LED emission spectrum and
$f_L$ a temperature-dependent conversion factor 3. Importing the spectra into the program-controlled processing unit and calculating the new dimming factors adapted to the temperature being modified with respect to the initial temperature for the new light mixture from the spectral approximation via the Gaussian distribution,
4. Setting dimming factors corresponding to the new light mixtures at the LEDs of the single LED color groups of the spotlight via the control electronics for controlling the LEDs of each LED color group.

The program loop is being closed after controlling the LEDs by a new temperature measurement.

Figure 14:
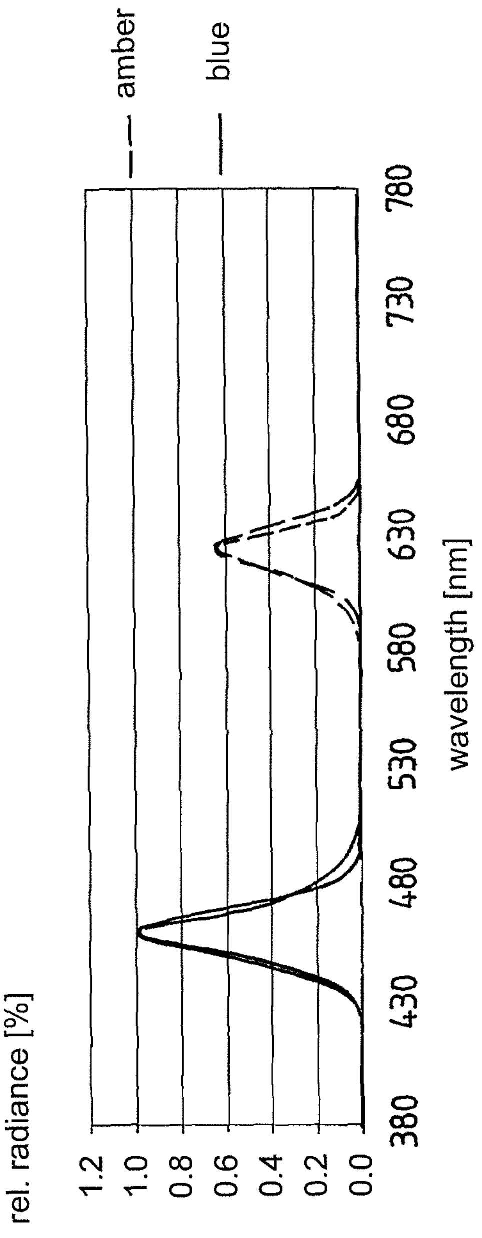
FIG. 14 shows a graphic depiction of the relative luminance over the wavelength for the approximation of the emission spectra by the Gaussian distribution for the color groups amber and blue.

FIG. 14 shows a graphic depiction of the relative luminance over the wavelength during the approximation of the emission spectra by the Gaussian distribution for the color groups amber and blue and shows a very good approximation to the measured values in each case.

Figure 15:
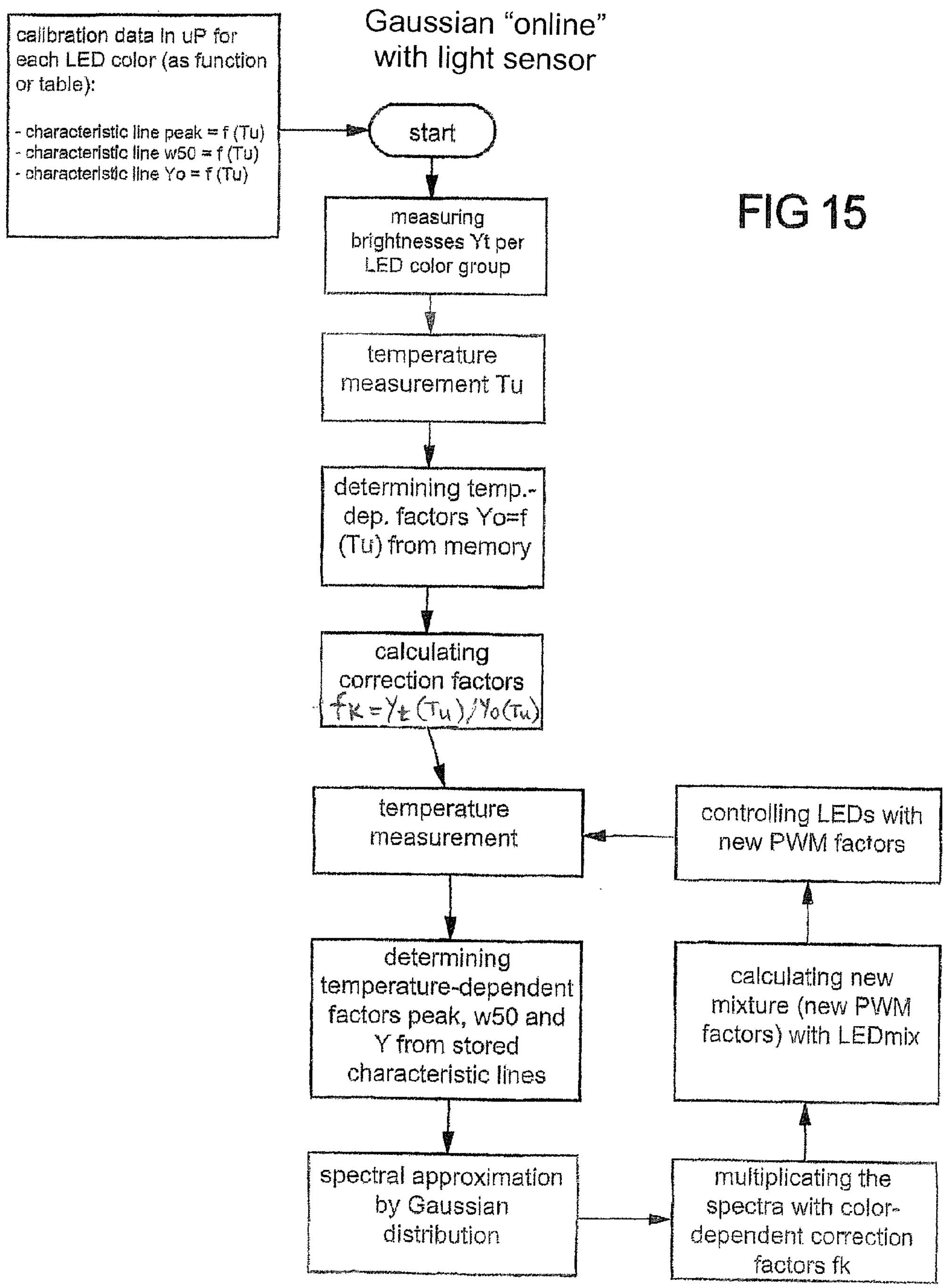
FIG. 15 shows a schematic block diagram of the algorithm for the color correction by spectral approximation via the Gaussian distribution with a light sensor.

In case of an additional use of a light sensor for the luminance measurement, the program depicted as flow-chart in FIG. 15 is used in which the program step 5. Luminance measurement with light sensor and dimming the spotlight onto the set value.

is added to the precedingly described program steps 1 to 4.

The calibration data, i.e. the characteristic lines for the peak wavelength peak=f(T), the half-width $w_{50}$=f(T) and the luminance $Y_0$=f(T), are stored as function of the temperature in the memory of the microprocessor for each LED color as function or table also in case of the program depicted as flow-chart in FIG. 15. After the start of the program, a measurement of the brightnesses or luminance $Y_0$=f(T) is effected for each LED color group of the single LED colors of the spotlight. In the next program step, a temperature measurement of the housing-internal ambient temperature of the LEDs follows, i.e. of the board or junction temperature of the LEDs of the spotlight. From these measurement values the temperature-dependent factors $Y_0$=f(Tu) are determined from the memory connected to the microprocessor and subsequently the correction factors are calculated by the quotient $$fK = Y_0(T_u)/Y_t(T_u)$$

with the initial brightness $Y_0$ and the brightness $Y_t$ at the temperature T, which correction factors represent the relative luminance decrease over the whole temperature range and indicate a temperature-dependent conversion factor of the luminance of the spectrum relatively to the luminance of the initial spectrum. This is followed by an anew temperature measurement as next program step, and the temperature-dependent factors for the peak wavelength peak=f(T), the half-width $w_{50}$=f(T) and luminance $Y_0$=f(T) are determined from the stored characteristic lines. Analogously to the flow chart depicted in FIG. 13 subsequently a spectral approximation is effected by the Gaussian distribution.

In the subsequent program step, the spectra for each color group being approximated by the Gaussian distribution are multiplied by the color-dependent correction factors fk determined according to the preceding formula. Subsequently, the dimming factors for the pulse-width modulation of the single LEDs of the LED color groups of the spotlight are determined for the light mixture at the measured temperature with the aid of the program-controlled processing unit depicted in FIG. 12 and the single LEDs of each LED color group of the spotlight are controlled by the control electronics with the calculated dimming factors. Also in case of this program procedure, the program loop is closed by a following anew temperature measurement.

The illuminating device can be adjusted to the new calculated light mixture with the aid of this program procedure and the color correction is effected as a result of the modified housing-internal ambient temperature, board or junction temperature. To correct possible deviations in the luminance which can occur after the correction, a luminance measurement is effected with a light or a V(λ) sensor with the aid of which the difference between the actual value and the set value of the luminance is determined and the illuminating device is adapted by evenly dimming all color groups to the set value.

The advantage of the control program depicted in FIG. 15 is that a compensation of aging effects is possible since a temporal brightness decrease is detectable by the light sensor provided within this control program. If an RGB sensor or color sensor or a spectrometer is used as sensor element instead of a light sensor or a V(λ) sensor, also color modifications of the single LED colors of the spotlight can be detected additionally to the brightness modifications.

A further variation exists in additionally detecting modifications of the peak wavelength peak=f(T) and the half-width $w_{50}$=f(T) in case of arranging an RGB sensor or color sensor or a spectrometer.

Figure 16:
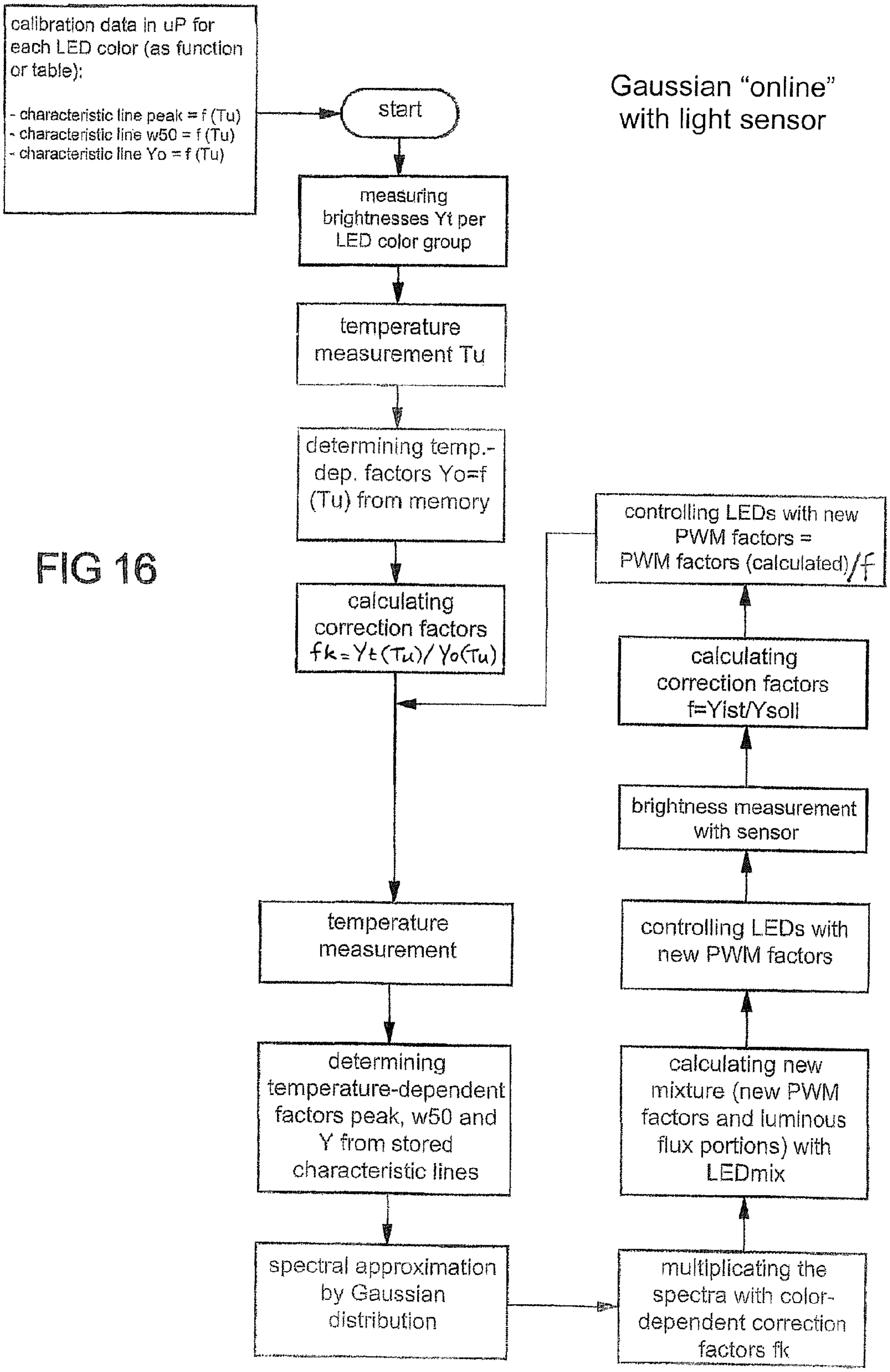
FIG. 16 shows a schematic block diagram of the algorithm for the color correction by a spectral approximation via the Gaussian distribution with light sensor and brightness compensation.

The flow-chart depicted in FIG. 16 serves for explaining a control program for controlling the LEDs of different LED color groups of a spotlight with a brightness correction of the temperature-dependent light mixture using a light sensor.

Also in case of this control program, the storage of calibration data in the microprocessor for each LED color as a function or table for the temperature-dependent parameters peak wavelength peak=f(T), half-width $w_{50}$=f(T) and luminance $Y_0$=f(T) is necessary. After the program start, the actual brightnesses Yt is measured for each LED color group. This is followed by a measurement of the housing-internal ambient temperature or the board or junction temperature Tu. Subsequently, the temperature-dependent factors $Y_0$=f(Tu) are determined from the memory connected to the microprocessor and the correction factors fk are calculated out of it according to the quotient $$fk=Y_0(T_u)Y_t(T_u)$$

with the initial brightness $Y_0$ and the brightness $Y_t$ at the temperature T.

After the calculation of the correction factors fk, an anew temperature measurement is effected which forms the basis for the determination of the temperature depending factors for the peak wavelength peak=f(T), the half-width $w_{50}$=f(T) and luminance $Y_0$=f(T) from the stored characteristic lines. Like in case of the precedingly described control programs, subsequently a spectral approximation is effected by the Gaussian distribution. This is followed by a multiplication of the spectra with the color-dependent correction factors fk for which the new light mixture i.e. new set values for the dimming factors and luminous flux portions for the LEDs of the LED color groups of the spotlight are calculated in the subsequent program step with the aid of the program-control processing unit depicted in FIG. 12. The LEDs of the LED spotlight are controlled by the new dimming factors for the new light mixture in an online operation.

After controlling the LEDs with the new dimming factors, an anew brightness measurement is effected for detecting the actual value $Y_{Ist}$ individually for each LED color group with the aid of the light sensor or V(λ) sensor. A correction factor $f=Y_{Ist}/Y_{Soll}$ is calculated from the measurement of the actual value $Y_{Ist}$ of the brightness measurement and the specified set value for the brightness $Y_{Soll}$, and subsequently the LEDs are controlled with new dimming factors which result from the quotient of the calculated dimming factors and a correction factor $f=Y_{ist}/Y_{soll}$ according to the relation $$PWM\ \text{factors(new)}=PWM\ \text{factors(calculated)}/f.$$

Also in case of this control program, the program loop is closed with an anew temperature measurement. Additionally, a compensation of aging effects can be provided by detecting a temporal brightness decrease by a light sensor or a V(λ) sensor. When using an RGB sensor or color sensor or spectrometer as sensor element, additionally color modifications of the single LED colors of the spotlight can be detected besides brightness modifications, and additionally modifications of the peak wavelength peak=f(T) and the half-width $w_{50}$=f(T) can be detected.

Figure 17:
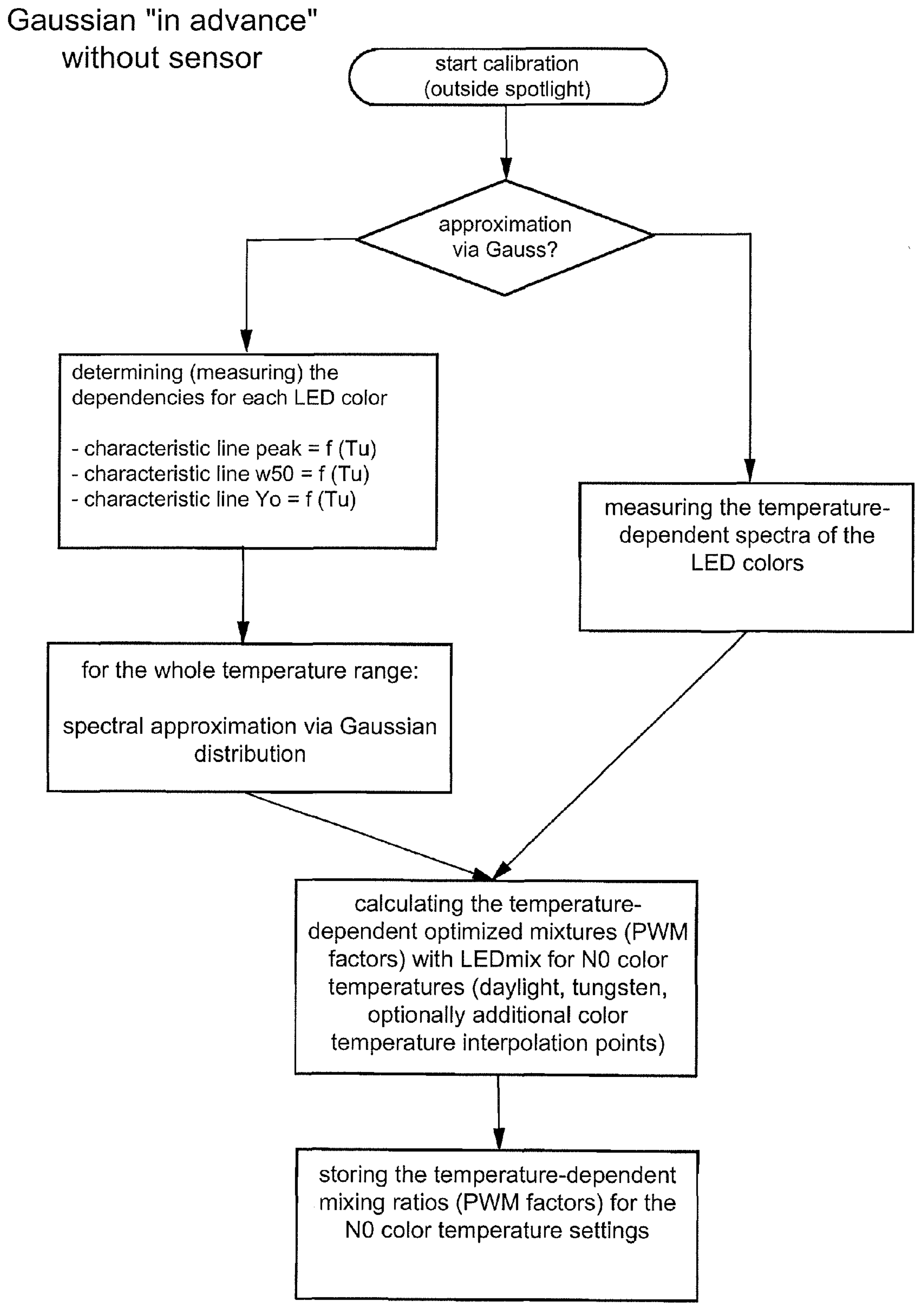
FIG. 17 shows a schematic block diagram of the algorithm for the color correction by calculating temperature-dependent, optimized mixing ratios for the color temperature settings.

FIG. 17 shows a flow-chart for the calibration of an LED spotlight which results in a multi-dimensional table for the pre-calculation of the mixing ratios of the light mixtures of several LED colors at different temperatures, wherein this calculation is effected in advance outside the spotlight.

After the start of the calibration program, one has to decide if an approximation via a Gaussian distribution is desired. If the approximation is to be effected via the Gaussian distribution, the temperature-dependent parameters of the peak wavelength peak=f(T), the half-width $w_{50}$=f(T) and the brightness or luminance $Y_0$=f(T) for each LED color is determined or measured. Out of it, a spectral approximation by the Gaussian distribution is effected over the whole temperature range of the spotlight application.

Alternatively, a measurement of the temperature-dependent spectra of the LED colors is performed instead of an approximation by the Gaussian distribution.

The temperature-dependently optimized light mixtures of the single used LED colors are calculated from the results of both alternatives with the aid of the program-controlled processing unit depicted in FIG. 12, i.e., the dimming factors for the single LEDs of the LED color groups for N0 color temperatures, e.g. for daylight, tungsten and optionally for additional color temperature interpolation points. This calculation in followed by storing the temperature-dependent mixtures ratios, i.e. the dimming factors for the single LEDs of the LED color groups of the spotlight for the N0 color temperature settings. These N0 color temperature settings can then form the basis for a control program for the regulation of the color temperature of the spotlight according to the flow-chart depicted in FIG. 18.

Figure 18:
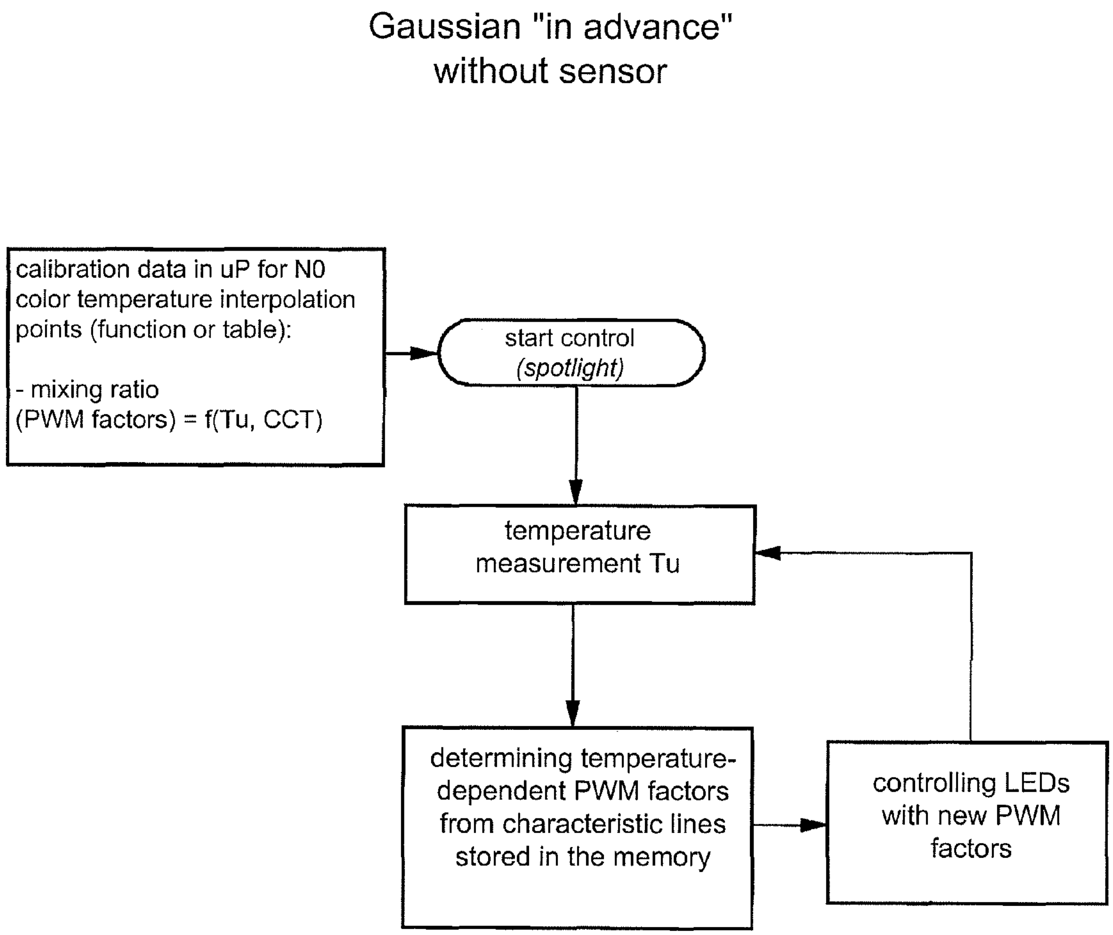
FIG. 18 shows a schematic block diagram of the algorithm for determining temperature-dependent dimming factors from stored characteristic lines of the temperature-dependent mixing ratios of the color temperature settings.

FIG. 18 requires the determination and storage of calibration data in the microprocessor of the control electronics for the LEDs of the single LED color groups of the spotlight for N0 color temperature interpolation points in form of a function or in form of a function or table stored in the memory of the microprocessor, from which the mixing ratio results, i.e.

the dimming factors as function of the ambient temperature Tu and the color temperature CCT.

After the start of the control program, a measurement of the housing-internal ambient temperature or the board or junction temperature of the LEDs, the LED color groups or single LEDs of each color group is effected. The temperature-dependent dimming factors are determined from the actual value of the temperature measurement from the characteristic lines stored in the memory of the control electronics, and the LEDs of the single LED color groups are controlled with the temperature-dependent new dimming factors. Also in case of this control program, the program loop is closed with an anew temperature measurement.

Figure 19:
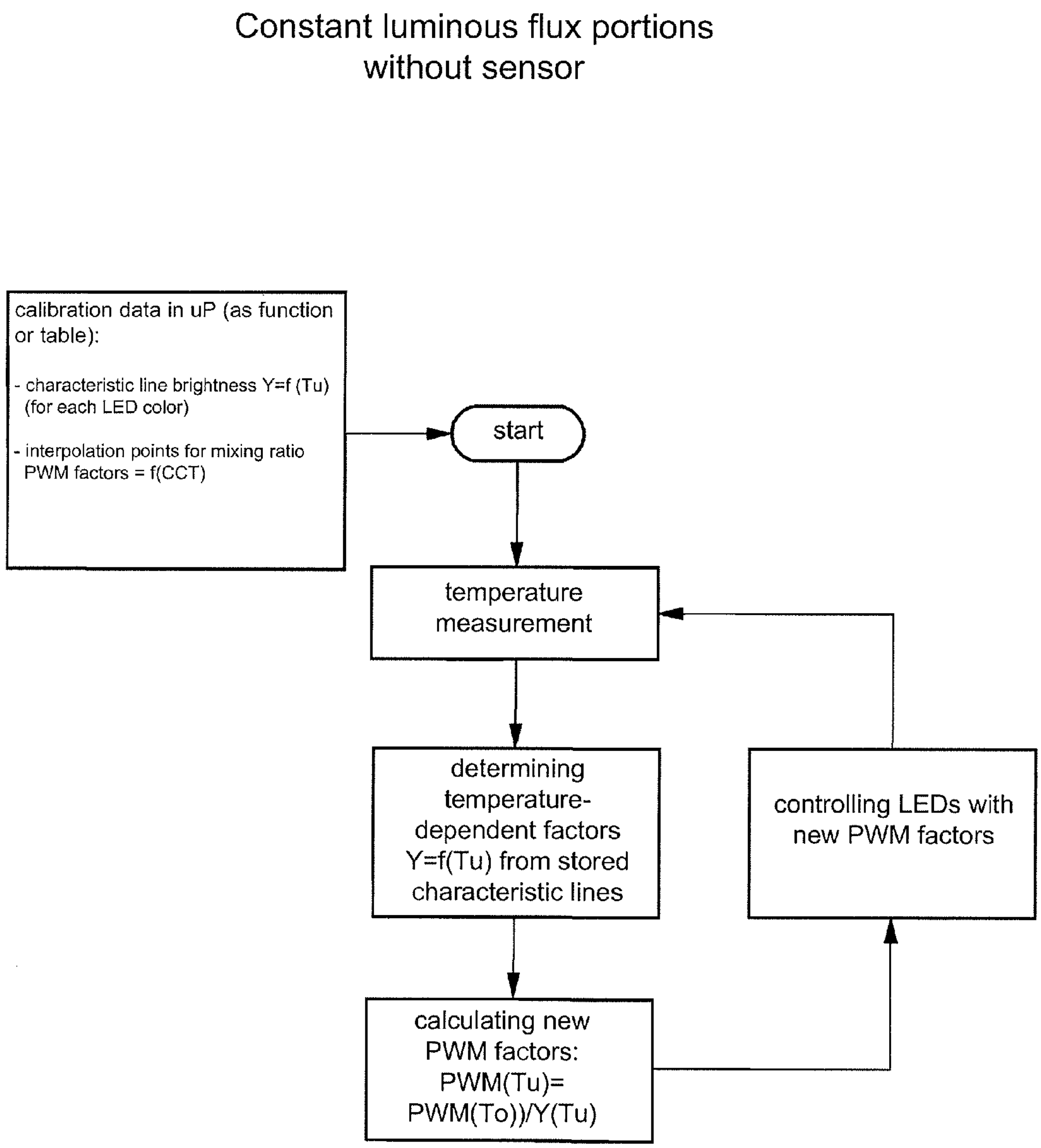
FIG. 19 shows a schematic block diagram of the algorithm for the color correction by determining temperature-dependent dimming factors from stored characteristic lines under consideration of constant luminous flux portions without brightness sensor.
Figure 20:
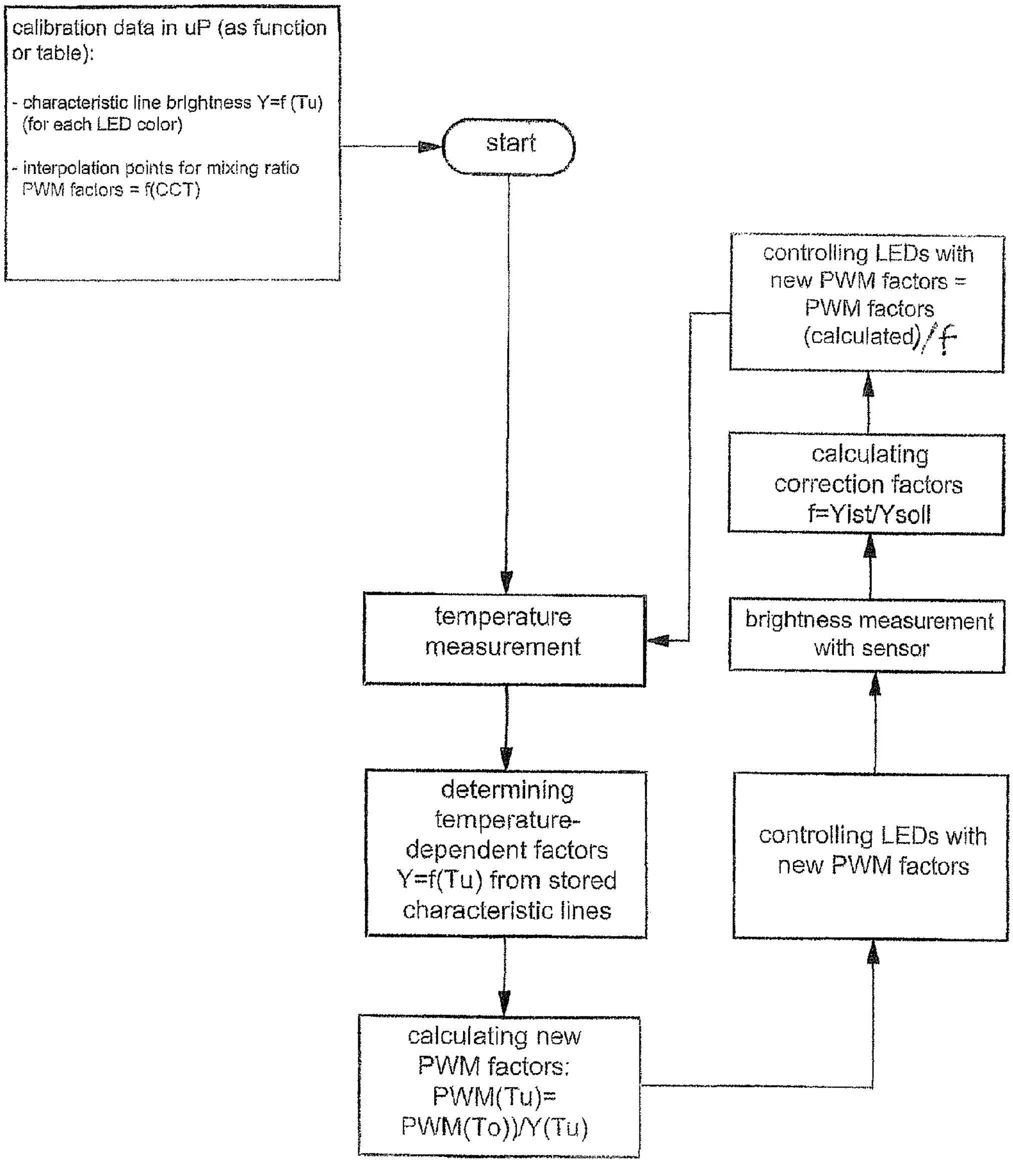
FIG. 20 shows a schematic block diagram of the algorithm for the color correction by determining temperature-dependent dimming factors from stored characteristic lines under consideration of constant luminous flux portions with brightness sensor.

FIGS. 19 and 20 depict flow-charts for two further control methods for the determination of dimming factors for the temperature-dependent light mixtures of the LED color groups of an illuminating device without and with the application of a luminance measurement with a light sensor or a V(λ) sensor.

FIG. 19 shows the procedure of a control program which is based on the adjustment of constant luminous flux portions of the single LED color groups of the illumination device without effecting a luminance measurement with a light sensor or a V(λ) sensor. Calibration data are stored in the memory of the control electronics as function or table, namely the characteristic line for the brightness Y=f(Tu) for each LED color of the LED color groups of the illuminating device and the interpolation points for the respective mixing ratio in form of dimming factors as function of the color temperature CCT.

After the start of the program, a temperature measurement is effected which forms the basis for determining the temperature-dependent factors Y=f(Tu) for the single LED color groups from the stored characteristic lines. The respective dimming factors are calculated by an according normalization from the determined temperature-dependent factors Y according to the equation $$PWM(T_u)=PWM(T_0)/Y(T_u)$$

with $T_0$ being the initial or basis temperature and $T_u$ being the actual measured temperature. The single LEDs of each LED color group of the spotlight are controlled by the dimming factors PWM($T_u$) calculated in this way dependently on the actual temperature, and the program loop is closed by an anew temperature measurement.

The determination of temperature-dependent light mixtures of the single LEDs of the LED color groups of the spotlight taking constant luminous flux portions as a basis can additionally be linked with a luminance measurement by a light sensor or a V(λ) sensor.

FIG. 20 shows a flow-chart of a control program for determining the dimming factors for the single LEDs of several LED color groups of a spotlight with a temperature measurement and additionally a luminance measurement by a light sensor or a V(λ) sensor.

Also in case of this embodiment, the calibration data of the brightness Y and the interpolation points for the mixing ratio stored as function or table in the memory of the microprocessor of a control electronics are imported in the form of dimming factors as function of the ambient temperature Tu and of the color temperature CCT of the LEDs of the single LED color groups of the illuminating device. After the start of the program, a measurement of the housing-internal ambient temperature or the board or junction temperature $T_u$ of the LEDs, the LED color groups or single LEDs of each LED color group is effected. The temperature-dependent factors Y=f(Tu) are determined from the actual values of the temperature measurement from the stored characteristic lines and the LEDs of the single LED color groups are controlled by the calculated temperature-dependent new dimming factors $$PWM(T_u)=PWM(T_0)/Y(T_u)$$

In contrast to the control method precedingly described by means of the flow-chart depicted in FIG. 19, no anew temperature measurement is effected after controlling the LEDs of each LED color group with the new dimming factors, but firstly a luminance measurement is effected with the aid of the light sensor or the V(λ) sensor, which measurement is followed by a calculation of the correction factors $f=Y_{Ist}/Y_{Soll}$. Taking these correction factors f as basis, the control of the LEDs of each LED color group of the spotlight is effected with new dimming factors according to the equation $$PWM\text{ factors(new)}=PWM\text{ factors(calculated)}*f$$

In case of this control method, the control of the LEDs with new dimming factors inserted after the calculation of the new dimming factors taking the temperature-dependent factors Y=f(Tu) as a basis from the stored characteristic lines can be omitted and instead the luminance measurement with the light sensor or the V(λ) sensor can be performed after calculating the dimming factors according to the equation PWM (Tu)=PWM($T_0$)/Y(Tu).

Additionally, further data can be stored in the memory like, e.g., calibration data, data for warm and cold, luminous efficacies for the set and the like which will be described in the following in more detail.

In FIGS. 21 to 23 and 25 to 29 flow-charts and characteristic lines for the relative brightness of an LED color or an LED color group depending on the board temperature $T_b$ are depicted for a further method for the color stabilization of an LED illuminating device in which method the color control is effected by temperature characteristic lines.

In case of this method, it is assumed that the brightness of the LEDs of the single LED colors depends on the junction temperature of the LEDs or on the measured board temperature Tb which is measured instead of the difficultly measureable junction temperature on a board on which LEDs emitting light of different wavelength or color are arranged to a light source emitting mixed light being controlled by a module electronics which is arranged together with a board on a module carrier and forms together with the board an illuminating module which can be grouped together with a plurality of further illumination modules to an LED panel.

A) the Brightness of LEDs as Function of the Board Temperature Tb

The dependence of the brightness Y of the LEDs of the LED illuminating device on the junction temperature or on the measured board temperature Tb is approximated by an approximation function which is designed according to the desired degree of accuracy as linear function having the form $$Y(Tb)=a+b*Tb$$

as second-degree polynomial having the form $$Y(Tb)=a+b*Tb+c*Tb^2 \quad \text{(formula 1)}$$

or as third-degree polynomial having the form $$Y(Tb)=a+b*Tb+c*Tb^2+d*Tb^3$$

Figure 21:
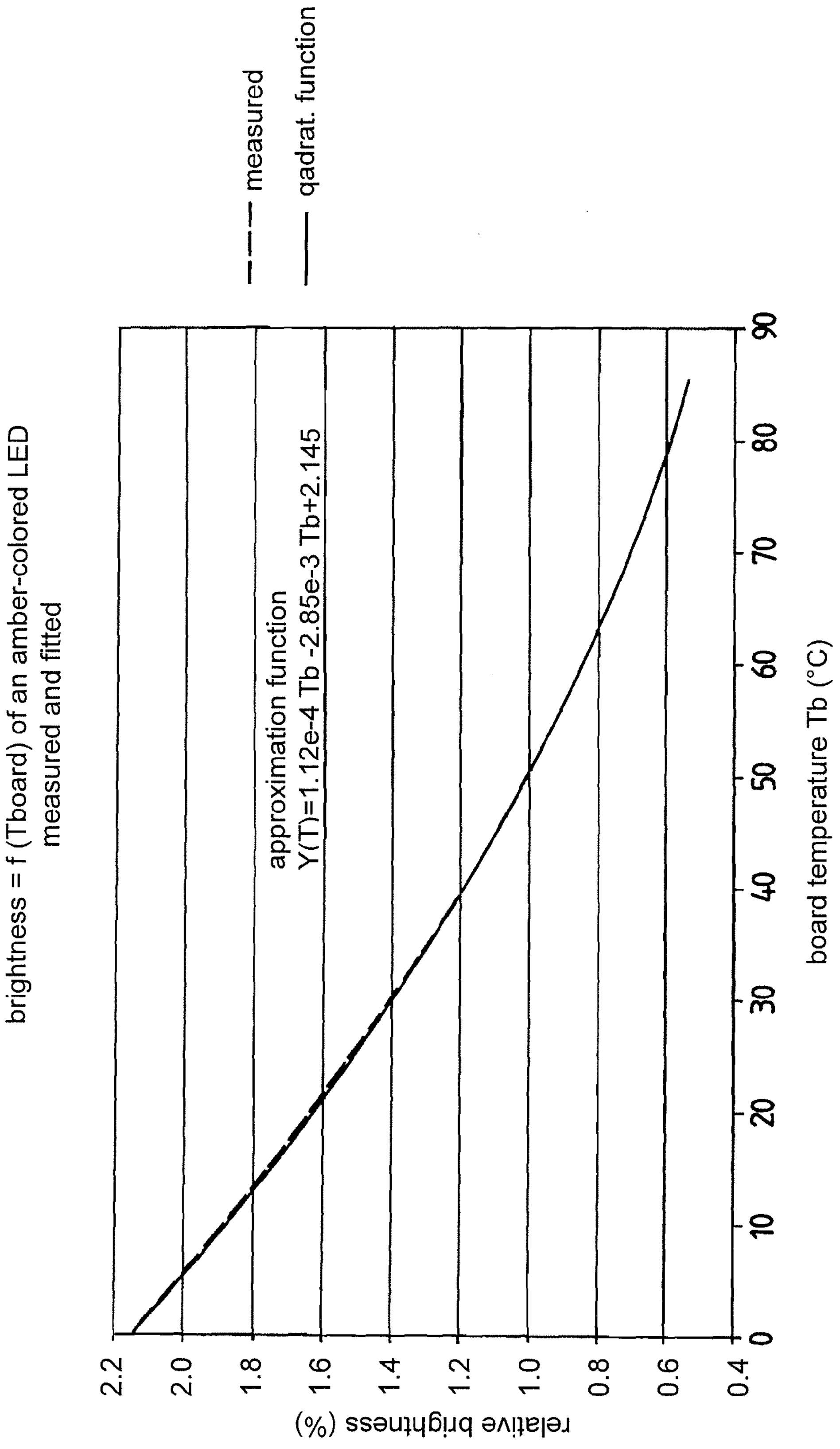
FIG. 21 shows a characteristic line for the relative brightness of an LED color or LED color group dependent on the board temperature $T_b$ for a color control by temperature characteristic lines.

The quality of approximation is already very good in case of a quadratic approximation function with a second-degree polynomial as is proven by the diagram depicted in FIG. 21 for the LED color amber which has the strongest temperature dependency together with the LED color red.

The measured characteristic lines of the relative brightness Y(Tb) as function of the board temperature $T_b$ in ° C. show a curve shape depending on the current or power. In all cases, the curve shape is this steepest for higher LED powers. This effect can be detected both in case of a direct-current and a pulse-width modulated PWM control of the LEDs as can be seen from the diagram depicted in FIG. 22 from which the relative brightness in percent over the board temperature Tb in ° C. can be extracted at different dimming factors and therewith different currents.

This effect can be traced back to the fact that the temperature sensor detecting the board temperature in praxis is located near to the LED chip on the LED board of the light source of an illuminating module as close as possible at the light-emitting LED chips. Despite this proximity of the temperature sensor to the light-emitting LED chips, there is a thermal resistance between the site of temperature measurement and the junction of the LED chips so that the measured temperature value is always lower than the junction temperature. Thereby, the temperature difference depends for each LED chip on the thermal power to be dissipated from the respective LED chip and therewith on the LED power taken up. Since thus the brightness of the LEDs emitting light of different wavelength depends on the junction temperature, but the characteristic lines are only recorded dependently on the board temperature, the measured characteristic lines of the brightness as function of the board temperature show a current-dependent or power-depended curve shape.

From this the problem arises that the characteristic lines of the brightness Y as function of the board temperature Tb depend on the current of or on the power taken up by the single LEDs or LED color groups so that a brightness correction with the precedingly indicated formula 1 in which the dependency of the brightness of the LEDs on the board temperature is approximated by a quadratic approximation function is afflicted with systematic errors for differing LED currents or thermal powers and would not work optimally. This effect would occur, e.g., during dimming, i.e. during the pulse-width modulated control of the LED illuminating device.

An amelioration of the method to perform the brightness correction on the basis of temperature characteristic lines $Y=f(T_b)$ can be achieved in that the preceding formula 1 is amended as follows:

$$Y(Tb)=a+b(Tb+\Delta T)+c(Tb+\Delta T)^2 \quad \text{(formula 2)}$$

A temperature correction value ΔT is inserted into the quadratic approximation function $Y=f(T_b)$ which temperature correction value considers the modifications of the temperature difference between the temperature sensor and the junction of the LED due to modified thermal powers. This form can especially have advantages as compared to a second-degree polynomial (formula 1) if also the electronics has an (unwanted) temperature-dependent behavior and the LED current additionally depends on the temperature.

The correction value ΔT thereby depends on the thermal resistance between the temperature sensor and the junction of the LEDs as well as on the thermal power or electric power of the LEDs to be momentarily dissipated. It can either be calculated from these parameters, if known, or be determined from series of measurements with different electric powers.

In case of a known thermal resistance between the board and the junction of the LED, the current-dependent correction value ΔT can be calculated from the LED currents as follows:

$$Rw=\Delta T/Pw$$

with Rw being the thermal resistance between the board and the junction, Pw being the amount of heat to be dissipated which approximately corresponds to the LED power and ΔT being the temperature difference between board and junction. From this follows $$\Delta T=Rw*Pw$$

with the thermal power Pw which approximately corresponds to the LED power $U_{LED}*I_{LED}$.

The temperature correction value ΔT has to be individually considered for each LED color like the parameters a, b and c. The current-dependent thermal power of the LEDs is determined by the microprocessor form the values $U_{LED}*I_{LED}$. Since in case of LEDs a part of the total power is converted into light, the thermal power of the LEDs is always smaller than the product U*I. This can be considered by an additional factor fw $$Pw=fw*U_{LED}*I_{LED}$$

The color-dependent correction value ΔT can be calculated accordingly as follows:

$$\Delta T=Rw*fw*I_{LED}*U_{LED}$$

Figure 23:
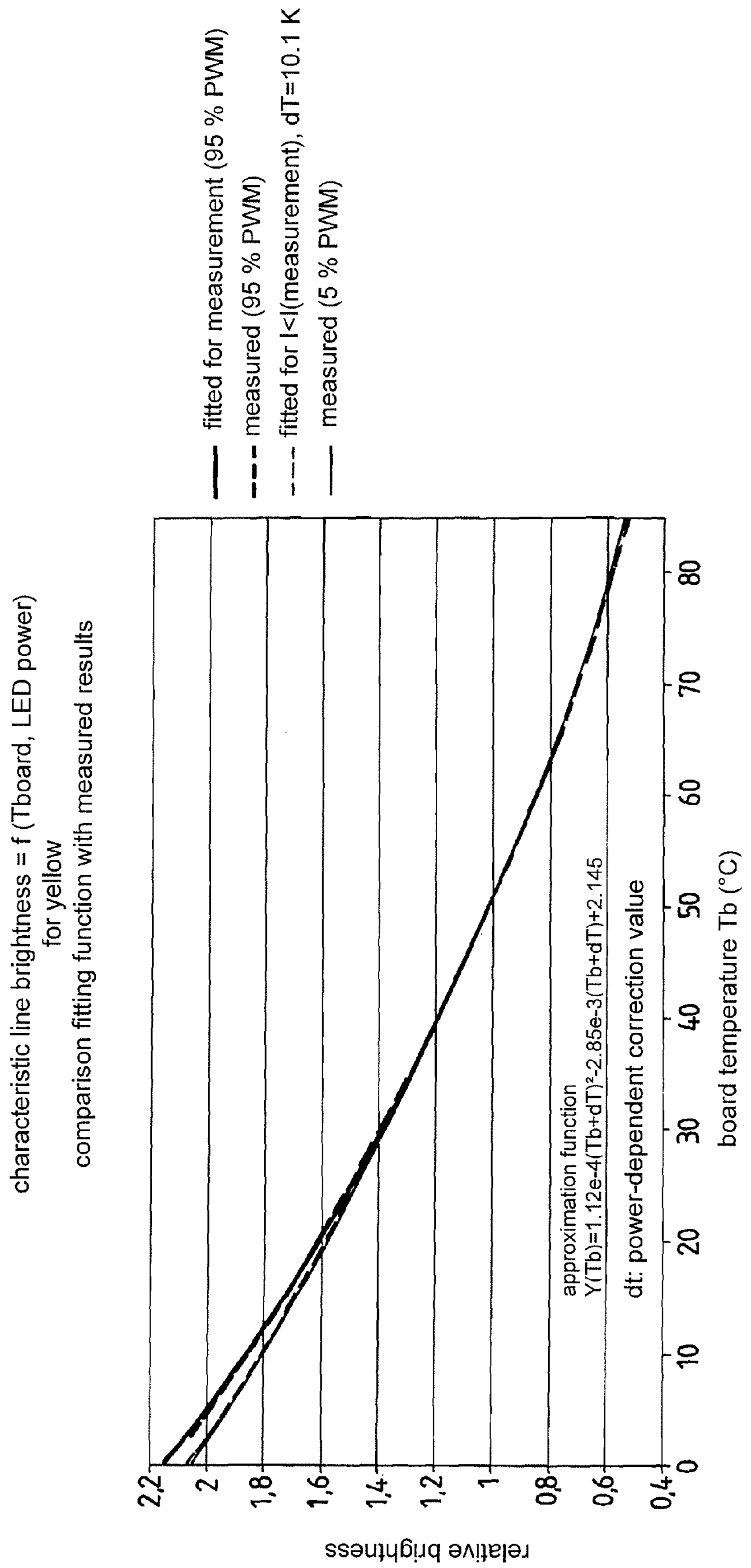
FIG. 23 shows a characteristic line for the relative brightness of an LED color or LED color group dependent on the board temperature $T_b$ for a color control by temperature characteristic lines.

In this manner, the behavior of the brightness Y measured in each case dependent on the board temperature $T_b$ can be reconstructed very well as is shown by the diagram depicted in FIG. 23 for the example of a yellow LED.

B) the Current Dependency of the Characteristic Lines

Figure 22:
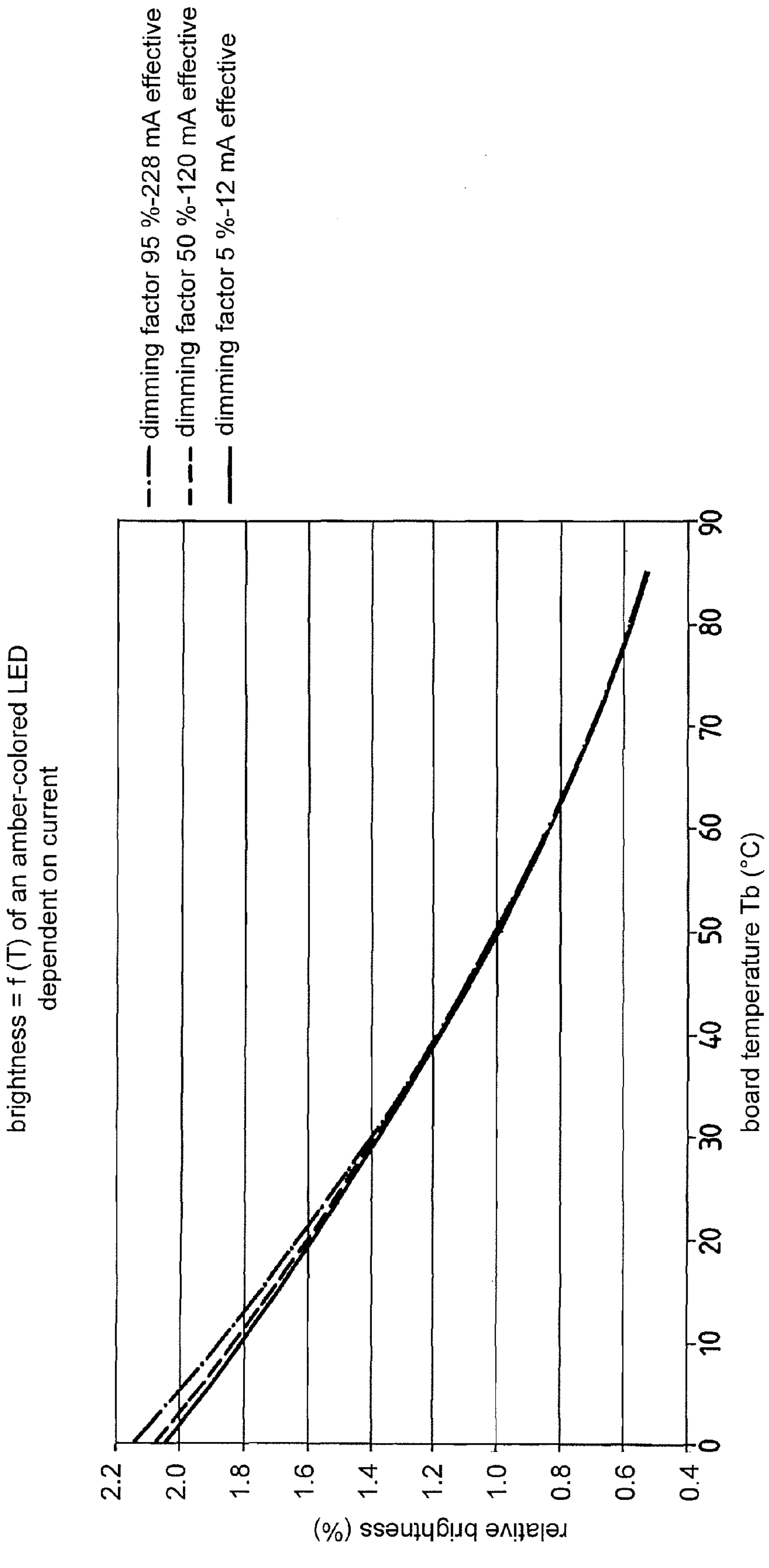
FIG. 22 shows a characteristic line for the relative brightness of an LED color or LED color group dependent on the board temperature $T_b$ for a color control by temperature characteristic lines.

The measured characteristic lines of the brightness Y(Tb) as function of the board temperature Tb shows according to FIG. 22 a current-dependent or power-dependent curve shape. In all cases, the curve shape is the steepest for higher LED powers. This effect can be observed both for a direct-current control and for a PWM control of the LEDs and both for AlInGaP materials and to a lower extent for InGaN materials.

Figure 24:
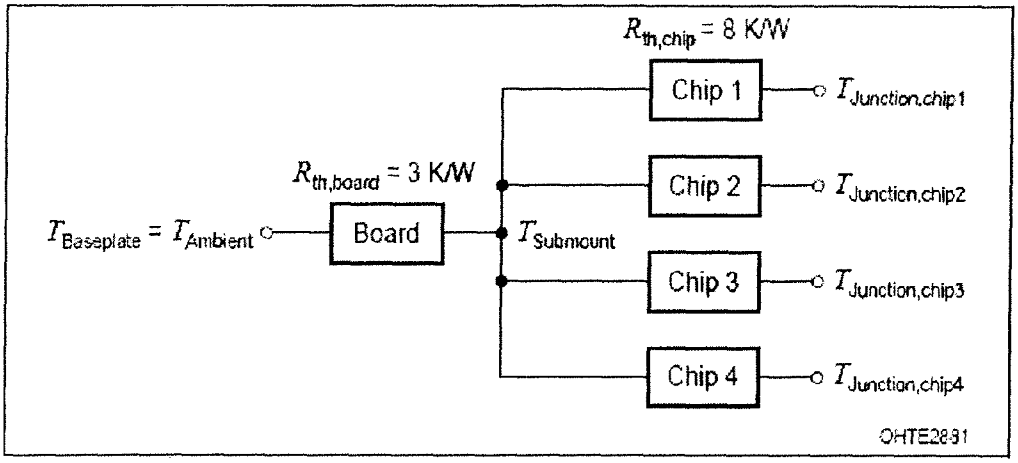
FIG. 24 shows an equivalent circuit diagram of the thermal resistance between LED board and junction of the LED chips.

This effect can be traced back to the fact that the temperature sensor is located for practical reasons close to the LEDs on the LED board, as close as possible at the light-emitting chips. However, there is a thermal resistance between the temperature measurement point and the junction of the chips. The measured temperature value is therefore always smaller than the junction temperature. The temperature difference thereby depends for each chip on the thermal power to be dissipated from each chip and therewith on the LED power taken up, as can be seen from the equivalent circuit diagram of the thermal resistance between LED board and junction of the chips according to FIG. 24.

Since the brightness of the LEDs depends on the junction temperature, the characteristic lines, however, have only been recorded dependently on the board temperature, the measured characteristic lines of the brightness as function of board temperature show a current-dependent or power-dependent curve shape.

From the preceding conclusion that the characteristic lines of the brightness as function of the board temperature depend on the current or on the total power taken up, it results that a brightness correction according to formula 2 for deviating LED currents or thermal powers is afflicted with systematic errors and would not work optimally. This effect would, e.g., occur in case of dimming the LED spotlight.

An amelioration of the method of the brightness correction on the basis of temperature characteristic lines Y=f (Tboard) can be achieved by amending formula 2 as follows:

$$Y(Tb)=A+B*(Tb+\Delta T)+C*(Tb+\Delta T)^2+D*(Tb+\Delta T)^3 \quad \text{formula 3}$$

A temperature correction value ΔT is inserted into the quadratic or cubic approximation function Y=f(Tb) which temperature correction value considers the modifications of the temperature difference between the temperature sensor and the junction on the basis of modified thermal powers.

The correction value ΔT thereby depends on the thermal resistance between sensor and junction as well as on the thermal power to be momentarily dissipated or electric power of the LED module. It can be either calculated from these parameters, if known, or determined by series of measurements with different electric powers.

In case of a known thermal resistance (board-junction) of the LED, the current-dependent correction value ΔT can be calculated from the LED currents as follows:

Rw=ΔT/Pw Rw: thermal resistance between board and junction

Pw: amount of heat to be dissipated, approximately LED power

ΔT: temperature difference between board and junction

ΔT=Rw*Pw Pw: thermal power, approximately corresponding to LED power $U_{LED}*I_{LED}$ The temperature correction value ΔT has to be individually considered for each LED color like the parameters A, B, C and D.

The current-dependent thermal power of the LEDs is determined by the microprocessor from the values $U_{LED}*I_{LED}$. Since a part of the total power of LEDs is converted into light, the thermal power of the LEDs is always smaller than the product U*I. This can be considered by additional factor fw:

$$Pw=fw*U_{LED}*I_{LED}$$

The color-dependent correction value ΔT can thus be calculated as follows:

$$\Delta T=Rw*fw*I_{LED}*U_{LED} \quad \text{formula 4}$$

In this manner, the measured behavior can be reconstructed very well as is shown in the graphic depicted in FIG. 23 for the example of a yellow LED.

The brightness-temperature characteristic lines are normalized to a "working temperature" Tn which, e.g., represents the typical operation temperature in the warm state.

$$Y(Tb)=A+B*(Tb+\Delta T-Tn)+C*(Tb+\Delta T-Tn)^2+D*(Tb+\Delta T-Tn)^3 \quad \text{formula 5}$$

If the curves are normalized such that Y(Tb) becomes "1" for the working temperature Tn then the parameter A results always in "1". Therewith, the storage of this parameter in the memory can be omitted.

The polynomial parameters A to D are determined with usual methods of mathematics by means of curves recorded for different dimming degrees of brightness as function of the board temperature for the virtual characteristic line extrapolated to PWM=0.

To practically determine the correction value ΔT without considering the forward voltage, the thermal resistance Rw as well as the correction factor fw are necessary to determine the thermal power according to formula 4. Often, these values are not known. Since the thermal power of the LEDs is directly proportional to the electric power of the LEDs and therewith directly proportional to the dimming factor of the LEDs, formula 4 can be rewritten as follows:

$$\Delta T\sim PWM$$

$$\Delta T=E*PWM \quad \text{formula 6}$$

with PWM being the dimming factor between (0 . . . 1) and the power parameter E.

If the polynomial parameters A to D as well as the power parameter E are known, the relative brightness of the LED colors can be calculated during the operation of the spotlight by formulae 5 and 6 from the actual values of the board temperature Tb as well as from the individual LED dimming factors PWM:

$$Y(Tb)=A+B*(Tb+\Delta T-Tn)+C*(Tb+\Delta T-Tn)^2+D*(Tb+\Delta T-Tn)^3$$

with $\Delta T=E*PWM$

For practically determining the correction value ΔT under considering the forward voltage, the typical forward voltage tolerances of LEDs lead to the fact that different LEDs of the same type and the same color are operated with different LED powers even if they are controlled with the same current and the same PWM. The consideration of the individual forward voltages consequently leads to a further amelioration of the quality of the applied temperature characteristic line. From formula 4 it follows:

$$\Delta T\sim PWM*U_{LED}$$

$$\Delta T=E_1*PWM*U_{LED} \quad \text{formula 7}$$

The parameter E1 can be determined from the value E determined for formula 6 by dividing E by the forward voltage $U_{Fref}$ of the LED module used for its determination.

The relative brightness of the LED colors can then be calculated during the operation of the spotlight with formulae 5 and 7 from the actual values of the board temperature Tb as well as from the individual LED dimming factors and forward voltages:

$$Y(Tb)=A+B*(Tb+\Delta T-Tn)+C*(Tb+\Delta T-Tn)^2+D*(Tb+\Delta T-Tn)^3$$

with $\Delta T=E_1*PWM*U_{LED}$

To keep the brightness of the individual LED colors during the operation of the spotlight constant, the PWM control signals are multiplied with the temperature correction factor kT=1N(Tb) dependent on the board temperature, the PWM as well as optionally the forward voltage:

$$PWM=PWM*kT=PWM/Y(Tb) \quad \text{formula 8}$$

Precedingly:

Y(Tb) denotes the relative brightness depending on the board temperature

Tb denotes the board temperature in ° C.

Tn denotes the working temperature in ° C.

ΔT denotes the power-dependent temperature correction value in ° C.

A . . . D denote polynomial coefficients

E, $E_1$ denote power parameters

PWM denotes a PWM control signal (0 . . . 1)

Rw denotes the thermal resistance in K/W $U_{LED}$ denotes the forward voltage in V $I_{LED}$ denotes the LED current in A Pw denotes the thermal power in W fw denotes a correction factor.

The procedure of the method for the color control of LEDs emitting light of different wavelength or color by temperature characteristic lines can be extracted from the flow-charts depicted in the FIGS. 25 to 29.

Figure 25:
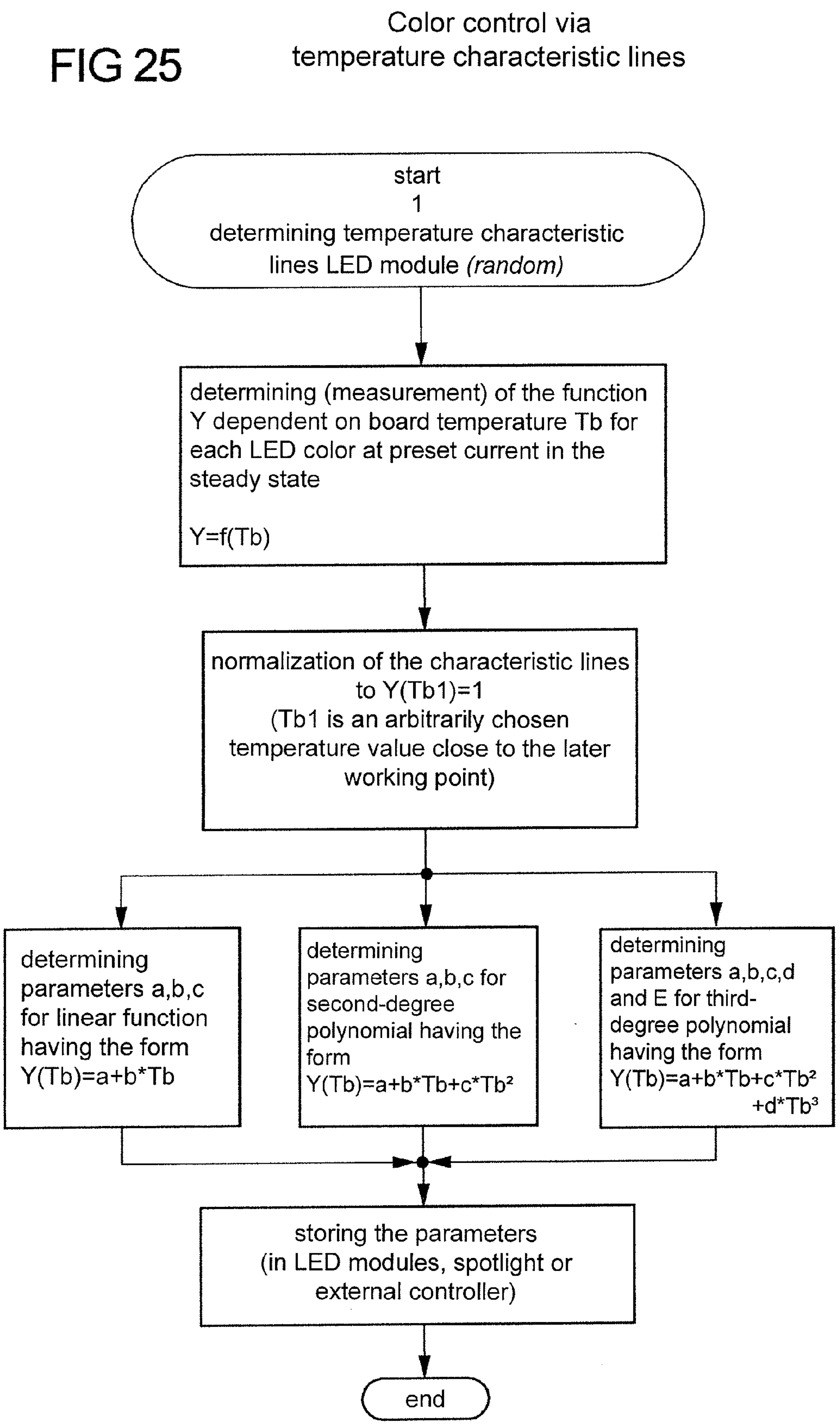
FIG. 25 shows a flow chart.

The flow-chart depicted in FIG. 25 serves for the determination of temperature characteristic lines of an LED module, wherein the determination of temperature characteristic lines is performed randomly. The determined characteristic lines are then transferred onto all LED modules and stored in their memory. A conversion (interpolation/extrapolation) of the characteristic line parameters onto the individual dominant wavelengths can be considered before the storage, said conversion being subsequently explained.

In a first step, the brightness Y is measured dependently on different board temperatures $T_b$ for each LED color at a specified current in the steady state, and the characteristic line $Y=f(T_b)$ is determined. In a second step, the characteristic lines are normalized onto an arbitrarily chosen temperature value close to the later working point $T_{b1}$, i.e. $Y(T_{b1})=1$ is determined.

In a third step, the parameters a and b are determined according to the choice of the approximation function for a linear approximation function having the form $$Y(Tb)=a+b*Tb$$

for a quadratic approximation function, i.e. a second-degree polynomial having the form $$Y(Tb)=a+b*Tb+c*Tb^2$$

or for an approximation function with a third-degree polynomial having the form $$Y(Tb)=a+b*Tb+c*Tb^2+d*Tb^3$$

The parameters a and b or a, b, c or a, b, c, d are stored in the LED modules, in a central control device of the LED illuminating device or in an external controller.

Figure 26:
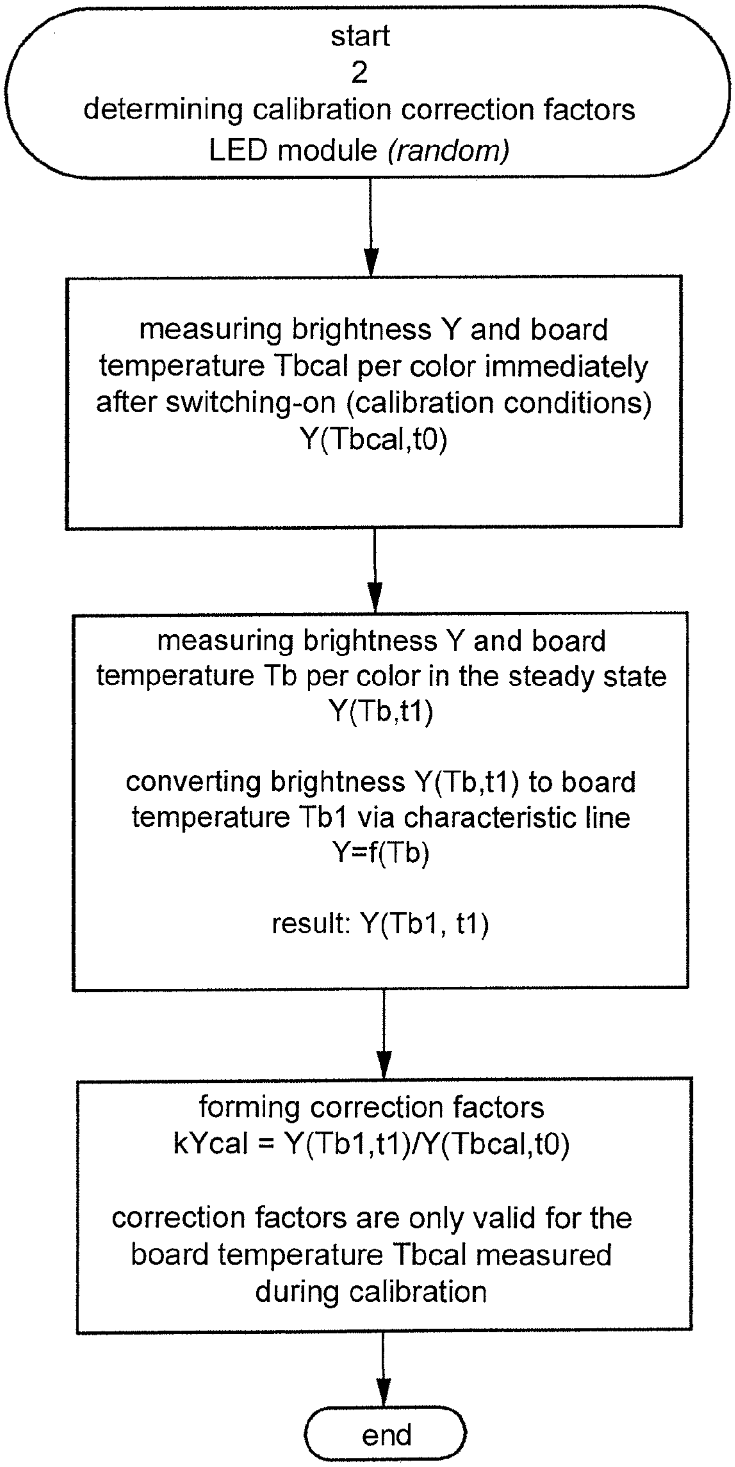
FIG. 26 shows a flow chart.

The flow-chart depicted in FIG. 26 shows the random determination of calibrating correction methods for the LED modules which methods are needed during the operation of the LED illuminating device for a fast individual brightness calibration of the LED modules. The calibrating correction factors describe the factor of the brightness in the steady state with respect to the brightness measuring value shortly after switching-on the LED illuminating device and are determined randomly for each LED color.

In a first step for determining the calibrating correction factors for each LED module, the brightness Y is measured dependently on the board temperature $T_{bcal}$ for each LED color immediately after switching-on and are stored as value $Y(T_{bcal}, t_0)$.

In a second step, the brightness Y and the board temperature $T_b$ are measured for each LED color in the steady state and are stored as value $Y(T_b, t_1)$. Subsequently, the brightness value $Y(T_b, t_1)$ is converted to a board temperature $T_{b1}$ via the characteristic line $Y=f(T_b)$, wherein $T_{b1}$ is the temperature for which the characteristic lines $Y=f(T_b)$ have been normalized onto 1. The value $Y(T_{b1}, t_1)$ is stored as result.

In a third step, the correction factors are formed according to the equation $$kY\text{cal}=Y(Tb1,t1)/Y(Tb\text{cal},t0)$$

which are only valid for the board temperature $T_{bcal}$ measured during the calibration. Optionally, a set of several calibration factors for different board temperatures $T_{bcal}$ has to be generated during the calibration.

Figure 27:
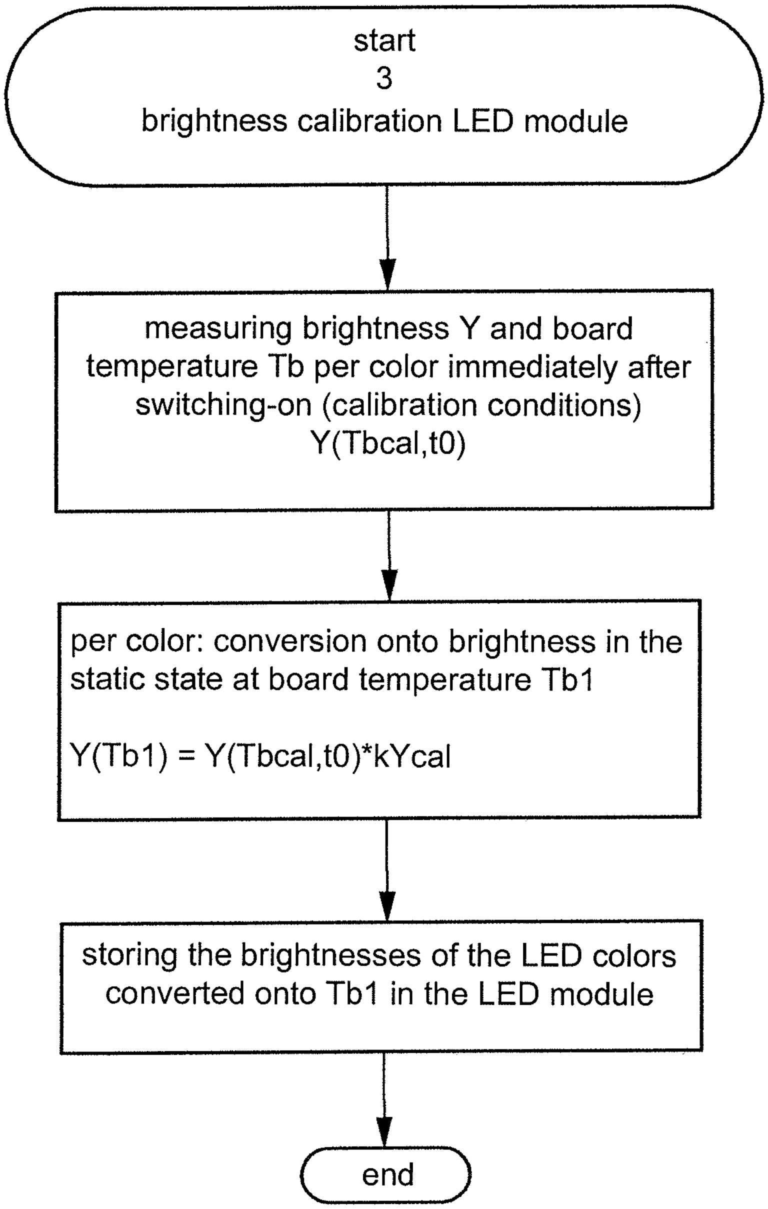
FIG. 27 shows a flow chart.

FIG. 27 depicts a flow-chart for the brightness calibration of an LED module which calibration serves for storing the brightnesses of the LED colors in each individual LED module. The module electronics of the LED module can read them from the memory and compensate them. Thus, the colors of all LED modules of an LED illuminating device (e.g. of a spotlight) illuminate similarly bright if an external controller of the LED illuminating device forces brightness set values for the different LED colors.

In a first step of the brightness calibration of the LED modules, the brightness Y and the board temperature $T_b$ are measured for each LED color immediately after switching-on the LED illuminating device or the LED module and are stored as value $Y(T_{bcal}, t_0)$.

In a second step, a conversion to the brightness in the steady state at a board temperature $T_{b1}$ is converted for each color according to $$Y(T_{b1})=Y(Tb\text{cal},t0)*kY\text{cal}.$$

Thereby, the factor $kY_{cal}$ corresponds to the calibrating correction factors determined according to the flow-chart according to FIG. 26.

In a third step, the brightnesses of the LED colors converted to the board temperature $T_{b1}$ are stored in the respective LED module.

Figure 28:
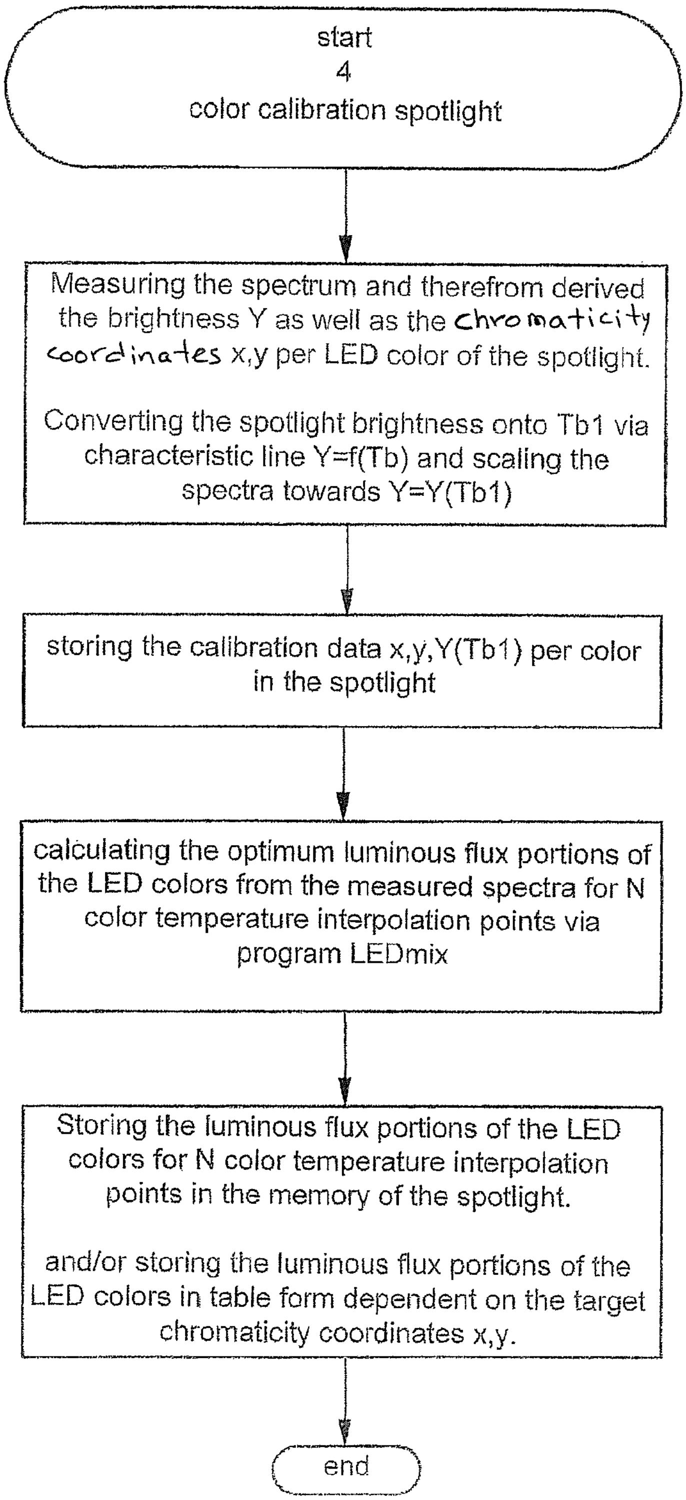
FIG. 28 shows a flow chart.

The flow-chart depicted in FIG. 28 reflects the method for a color calibration of the LED illuminating device or a spotlight. After the start of the program, in a first step the measurement of the spectrum is effected and resultantly derived of the brightness Y as well as of the chromaticity coordinates x, y of each LED color of the spotlight. Subsequently, the brightness of the spotlight is converted to the board temperature $T_{b1}$ by the characteristic line Y=f(Tb) and the spectra are scaled to $Y=Y(T_{b1})$.

In a second step, the calibration data x, y and $Y(T_{b1})$ are stored for each LED color in the spotlight. In a third step, the calculation of the optimum luminous flux portions of the LED colors from the measured spectra for N color temperature interpolation points is effected by the precedingly described program-controlled processing unit.

In a fourth step, the luminous flux portions of the LED colors for N color temperature interpolation points are stored in the memory of the spotlight and/or the luminous flux portions of the LED colors are stored in table form dependent on the target chromaticity coordinate, i.e. the chromaticity coordinates x, y.

Figure 29:
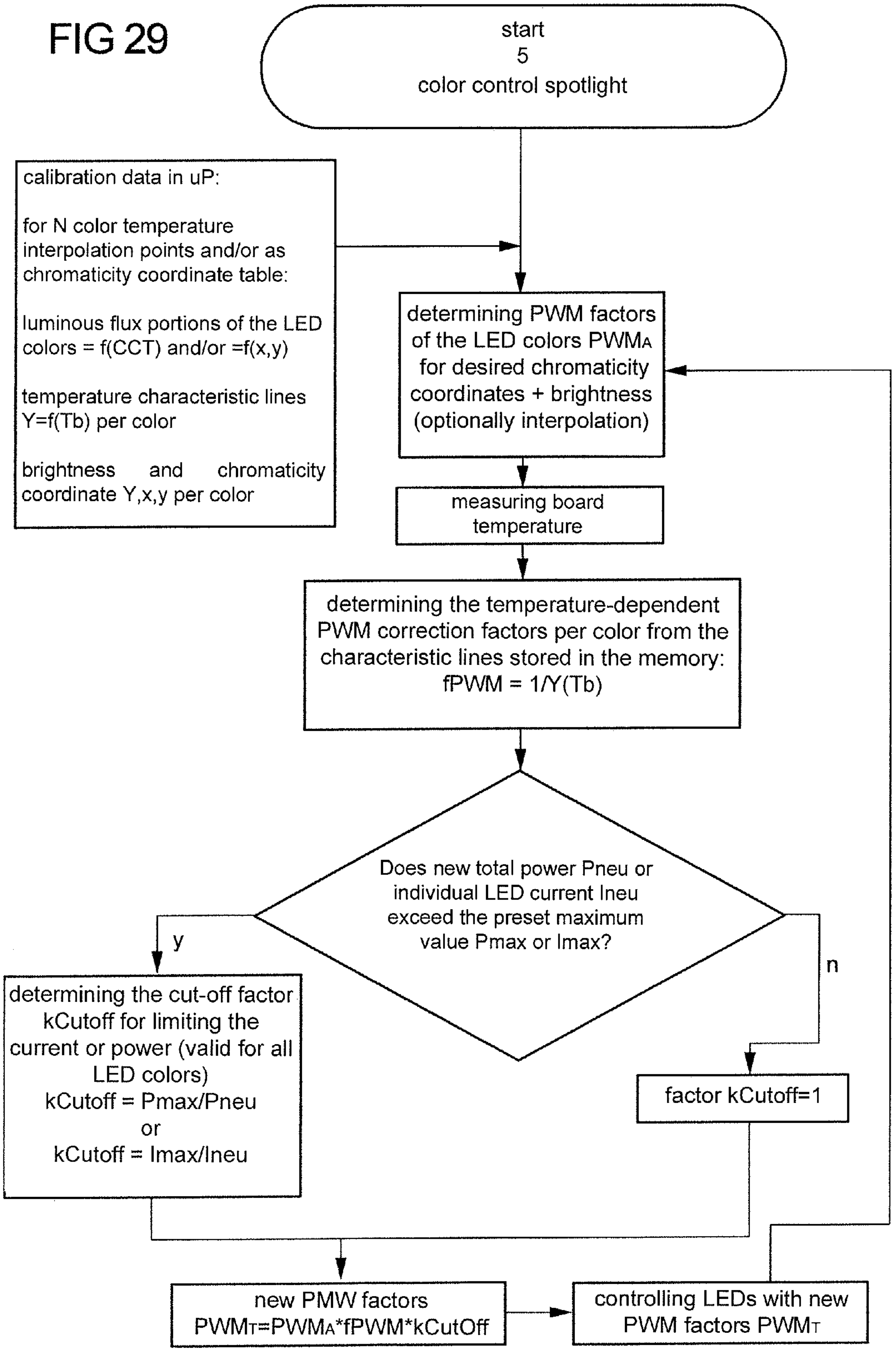
FIG. 29 shows a flow chart.

FIG. 29 shows a flow-chart of the color control of an LED illuminating device designed as spotlight.

In the context of the color control of the LED illuminating device a temperature-dependent power limiting is performed since the total power of the LED illuminating device or the total current fed to all LEDs of the LED colors must not exceed a specified, preferably temperature-dependent threshold; because it does not make sense to feed more current with increasing temperature and consequently decreasing brightness of the LED illuminating device in the expectation to therewith compensate the decrease in brightness of single or several colors. The temperature further increases with an increased feed of current and therewith of the total power of the LED illuminating device so that the luminous efficacy further decreases until single or several LEDs are overloaded and are therewith destroyed or a hardware-based current limitation intervenes.

A prerequisite for the color control of the LED illuminating device depicted as flow-chart in FIG. 29 is the storage of calibration data for N color temperature interpolation points and/or the chromaticity coordinates table in the microprocessor of the LED illuminating device or the LED modules with luminous flux portions of the LED colors as function of the color temperature (CCT) and/or of the chromaticity coordinates (x, y), the temperature characteristic lines $Y=f(T_b)$ for each LED color and the brightness and the chromaticity coordinates Y, x, y for each LED color.

In a first step of the colorcontrol, the PWM factors $PWM_A$ of the LED colors are determined for the desired chromaticity and the brightness is determined optionally via interpolation. In a second step, the board temperature $T_b$ is measured and, in a third step, the temperature-dependent PWM correction factors are determined for each color from the characteristic lines $$fPWM=1/Y_{REL}$$

stored in the memory, wherein as value $Y_{REL}$ the linear approximation function, quadratic approximation function or third-grade approximation function according to the preceding description is applied.

In a fourth step, it is checked if the total power $P_{neu}$ fed to the LED illuminating device or the individual LED current $I_{neu}$ exceeds a specified maximum value $P_{max}$ or $I_{max}$. If this is the case, a cut-off factor kCutoff is determined for limiting the current or the power which factor is valid for all LED colors and is determined according to $$k\text{Cutoff}=P_{max}/P_{neu} \text{ or}$$

$$k\text{Cutoff}=I_{max}/I_{neu}.$$

If the new total power does not exceed the specified maximum value, the factor is set to kCutoff=1.

In a fifth step, new PWM factors $PWM_T$ are determined according to $$PWM_T=PWM_A*fPWM*k\text{Cutoff}$$

and the LEDs are controlled with the new PWM factors $PWM_T$, and subsequently one returns to the first method step of the determination of the PWM factors for the $PWM_A$ of the LED colors.

The basic brightnesses of the color channels measured in the context of the calibration serve for the internal brightness correction of the LED modules. Therewith, both the brightness tolerances of the LED chips and the tolerances in the electronics are calibrated. The color-dependent brightness correction factors kY are then determined from these values in the context of the calibration of the LED illuminating system and are stored. The brightnesses determined during the calibration for each color are converted to the working temperature $T_n$ via the temperature characteristic lines which have been determined as being representative in advance in the laboratory.

The internal basic brightnesses Y are read from all connected LED modules in the context of the spotlight calibration, and the brightness correction factors kY for all LED modules are calculated and stored from the basic brightnesses with respect to the LED module having the lowest brightness. They serve for the internal brightness correction of the LED modules. The PWM commands received from an external controller are multiplied with the brightness correction factor kY internally in the LED modules so that all connected LED modules represent the desired color with the same brightness.

The brightness correction factors kY are calculated during the calibration of the LED illuminating device for each channel as follows:

$$kY=Y_{min}/Y$$

wherein $Y_{min}$ denotes the minimum of the basic brightnesses Y of all connected LED modules.

The parameters for the temperature characteristic lines are chosen under application of a third-grade approximation function such that the relative brightness for each color is normalized to 1 for the working temperature $T_n$ and PWM=1. Thereby, the polynomial coefficient a is 1. Since the temperature characteristic lines depend on the peak current one has to revert to the respective set of parameters in case of a peak current switch. All calibration data related to the brightness is normalized to the working temperature $T_n$.

The maximum junction temperature of the LED chips indicates that value for a cut-off temperature or a maximum board temperature which is stored in the LED illumination and which must be below a threshold for the maximum junction temperature of the LED chips.

If the maximum board temperature $T_{max}$ is exceeded, the total power of the LED module has to be uniformly reduced until the board temperature $T_b$ is smaller or equal to $T_{max}$. The power reduction is effected via the color-independent power factor $k_P$.

The calculation of the dimming factors or PWM signals to be applied module-internal is performed as follows.

a) calculation of the relative brightness Yrel dependent on the measured board temperature Tb and of a curve Y=f(Tb) normalized to the value Y=1 at the board temperature Tn as well as of the PWM signal:

$$Y(Tb,PWM)=1+B*(Tb-Tn+dT)+C*(Tb-Tn+dT)^2+D*(Td-Tn+dT)^3$$

$$Y(Tn)=1+B*dT+C*dT^2+D*dT^3$$

with $dT=E*(1-PWM_{intern})$ being a power-dependent correction which typically is between −10 and −30° C.

Normalization of the power-corrected characteristic line to 1 for the working temperature Tn:

$$Y\text{rel}=Y(Tb,PWM)/Y(Tn)$$

b) Determining the temperature-dependent correction factor kT (for each channel):

$$kT=1/Y\text{rel}$$

c) Determining the power reduction $k_P$ for complying with or falling below the maximum board temperature (for each module):

If the maximum board temperature Tmax is exceeded, the total power of the module has to be uniformly reduced until Tb<=Tmax. The power reduction is effected via the color-independent power factor $k_P$.

The time constant $t_P$ (%/s) thereby describes the velocity of the power regulation and m its slope.

During the module start $k_P$ is 1.

If Tb>Tmax then the set power is reduced by the following temperature-dependent factor:

$$k_P*=1-m(Tb-T_{max})$$

(reduction with the time constant $t_P$)

If Tb falls below $T_{max}$, then the power can be increased again:

$$\text{If } k_P<1, \text{ then } k_p/=(1-m(Tb-T_{max}))$$

(increase with time constant $t_P$).

Alternatively, the spotlight can be turned off instead of being dimmed if the limit temperature or shut-off temperature is exceeded, if no brightness modification during the operation is allowed. In this case $$k_p \text{ is } 0, \text{ if } Tb>T_{max}$$

The power factor $k_P$ is maximum $k_P=1$.

d) Determination of the dimming factors or PWM signals per channel theoretical necessary due to temperature:

$$PWM_{theo}=PWM_{soll}*kT*kY$$

$PWM_{theo,max}$=maximum of PWM portions $PWM_{theo}$ determined for all colors e) Determining the possible relative brightness of the module Yrel per LED module:

$$\text{If } PWM_{theo,max}<=1, \text{ then: } Y\text{rel module}=k_P$$

$$\text{If } PWM_{theo,max}\geq 1, \text{ then: } Y\text{rel module}=k_P/PWM_{theo,max}$$

f) Data for a group matching:

All connected LED modules receive the command SetGroupBrightness from a central power control unit, through which the relative brightness of the temperature-related darkest LED module in the spotlight is communicated to them. All other LED modules adjust their brightness to this brightness to avoid temperature-related brightness gradients.

Each LED module sends its possible relative brightness $Y_{rel,module}$ to the central power control unit for the group matching which central power control unit determines the brightness of the (temperature-related) darkest LED module and sends this as $Y_{rel,Group}$ to all LED modules in order that these can adapt (reduce) their brightness to it:

$Y_{rel,Group}$=minimum of the values $Y_{rel,module}$ received from all LED modules.

g) Group matching LED modules

Each LED module aligns its brightness to the group brightness. The factor $k_{Group}$ for the group matching is calculated as follows; the default value for $k_{Group}$ is 1

$$k_{Group}=Y_{rel,Group}/Y_{rel,module}$$

h) Calculation of the internal dimming factors or PWM signals $$\begin{aligned} PWM(\text{internal}) &= PWM_{soll} * kT * kY * Y_{rel,module} * k_{Group} \\ &= PWM_{theo} * Y_{rel,module} * k_{Group} \end{aligned}$$

Subsequently, all LED modules of the same color illuminate with identical brightness.

It is necessary for the power stabilization within a spotlight to normalize the calculated relative luminous flux portions per primary color. If the spotlight, e.g., is controlled such that the PWM signals are normalized to the maximum value PWMmax=1, then the maximum possible brightness is achieved in each case. However, this does not make sense since on the one hand the brightness of an adjusted color should be constant over the operation temperature what can be compensated very simply with the aid of the temperature-brightness characteristic lines. On the other hand, the LED power generated therewith can, however, be too high depending on the cooling of the spotlight so that the LED spotlight would reach already shortly its uppermost threshold temperature (shut-off temperature) and would turn off. In case of passive cooling, the spotlight generally must be operated with an internal dimming factor to become not too hot. This internal dimming factor depends very strongly on the mixing ratio of the LED colors and therewith on the color temperature or the chromaticity coordinates.

The relative luminous flux ratio calculated for any color or for a color mode is therefore related to a maximum LED power $P_{max}$(W) which is stored in the memory of the spotlight.

To be able to calculate the actual power of an adjusted color mixture and to normalize it onto $P_{max}$, the powers $P_i$(W) @ PWM=1 are stored during the calibration in the spotlight for each color channel.

Compensation of the Temperature-Related Color Shift at LED Modules

A variation of the color temperature dependent on the temperature can be observed in case of spotlights constructed from LED modules. The extent amounts to ca. 300 K for the settings 3200 K and 5600 K. This effect can be traced back to the temperature-related shift of the dominant wavelength, in particular of the red and yellow LEDs. Since a calibration is effected by a measurement of the spectra and calculation of the necessary luminous flux portions in the warm state, the spotlight, however, has a lower temperature during the warming up or in the dimmed state, a spectral shift effects an increase of the color temperature.

Figure 30:
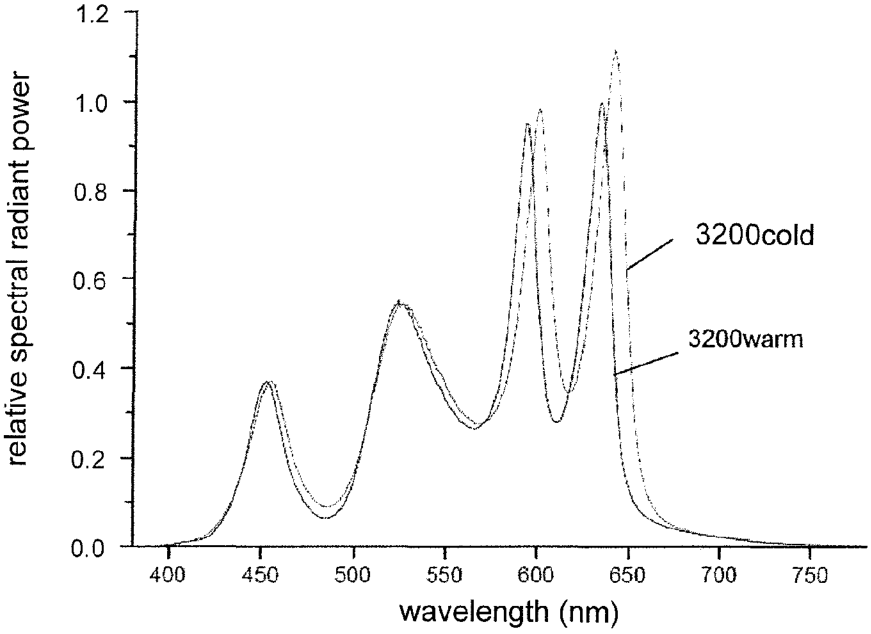
FIG. 30 shows a spectra for the clarification of the differences between cold and warm spectra for the setting 3200 K.
Figure 31:
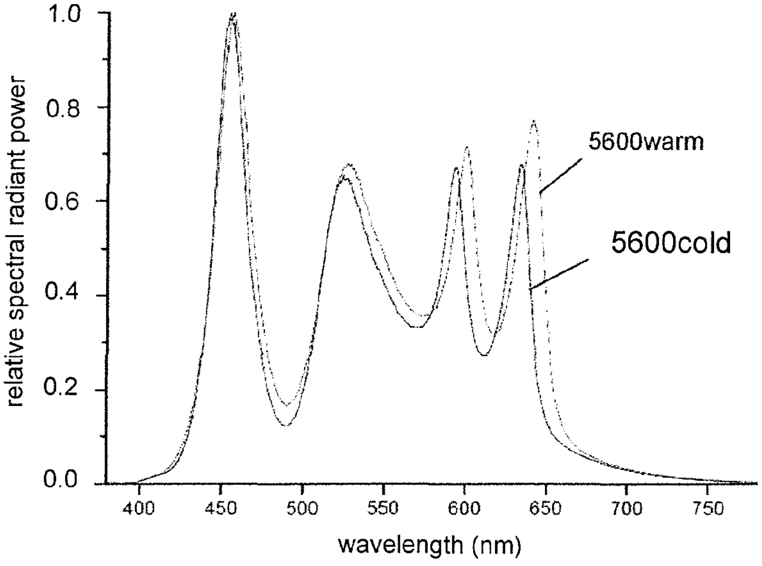
FIG. 31 shows a spectra for the clarification of the differences between cold and warm spectra for the setting 5600 K.

The temperature compensation implemented in the LED modules according to the precedingly described methods compensates only the brightnesses and takes care that the relative luminous flux portions of the color mixture remain constant over the temperature. The spectra depicted in FIGS. 30 and 31 clarify the differences between the cold and warm spectra for the settings 3200 K (FIG. 30) and 5600 K (FIG. 31), which have been measured at NTC (Negative Temperature Coefficient Thermistor) temperatures of 70° C. and 25° C. and which occur with the method of constant luminous flux portions implemented hitherto. The temperature-related color shift does hereby not exactly run along the Planckian locus, in particular at lower color temperatures deviations of up to 5 threshold units from the Planckian locus occur. Due to this fact, not only the CCT deviation but also the deviation of the chromaticity coordinates (dx, dy) is compensated according to the invention.

Figure 32:
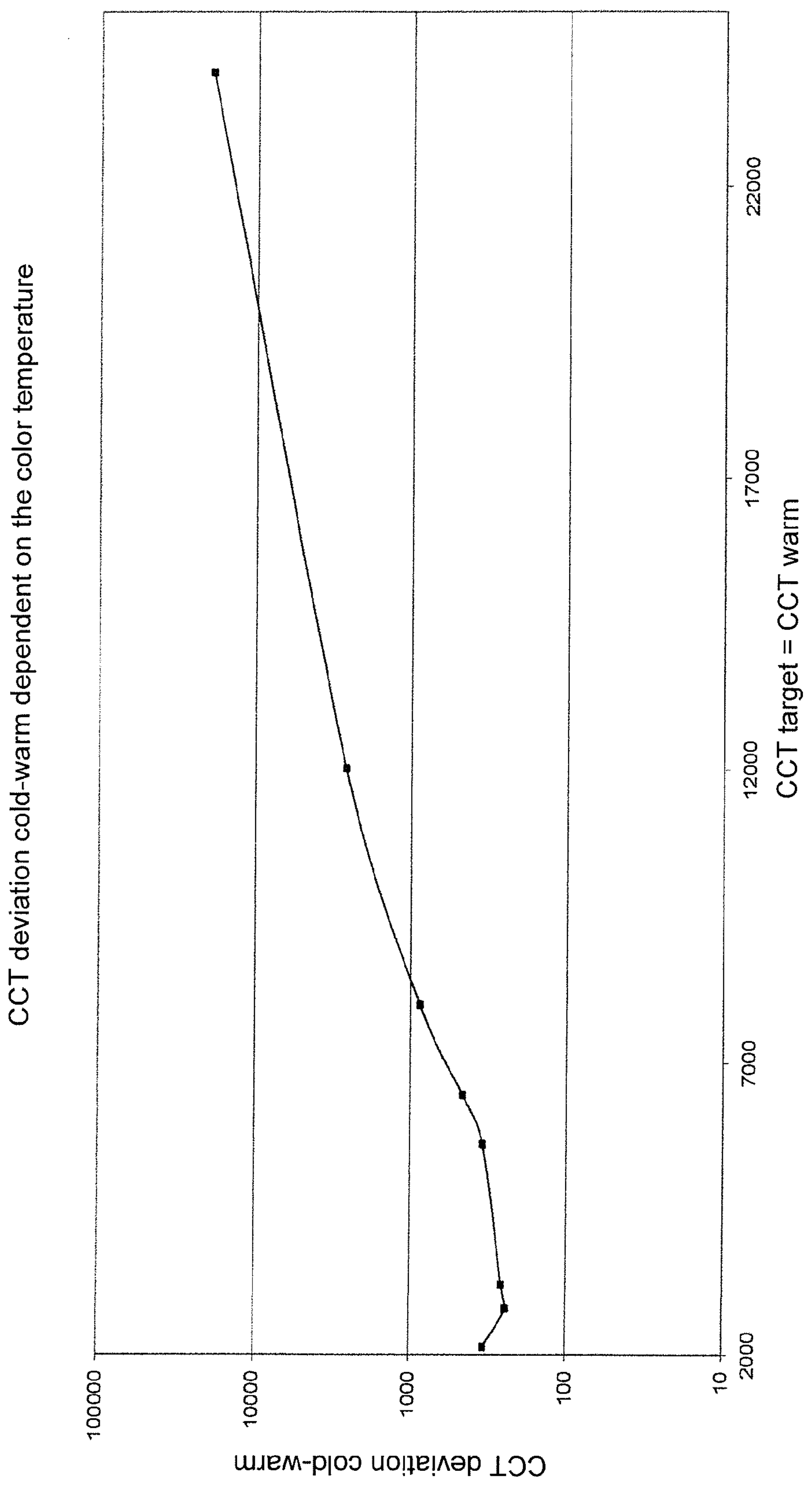
FIG. 32 shows the color temperature (CCT) deviation cold-warm dependent on the color temperature.
Figure 33:
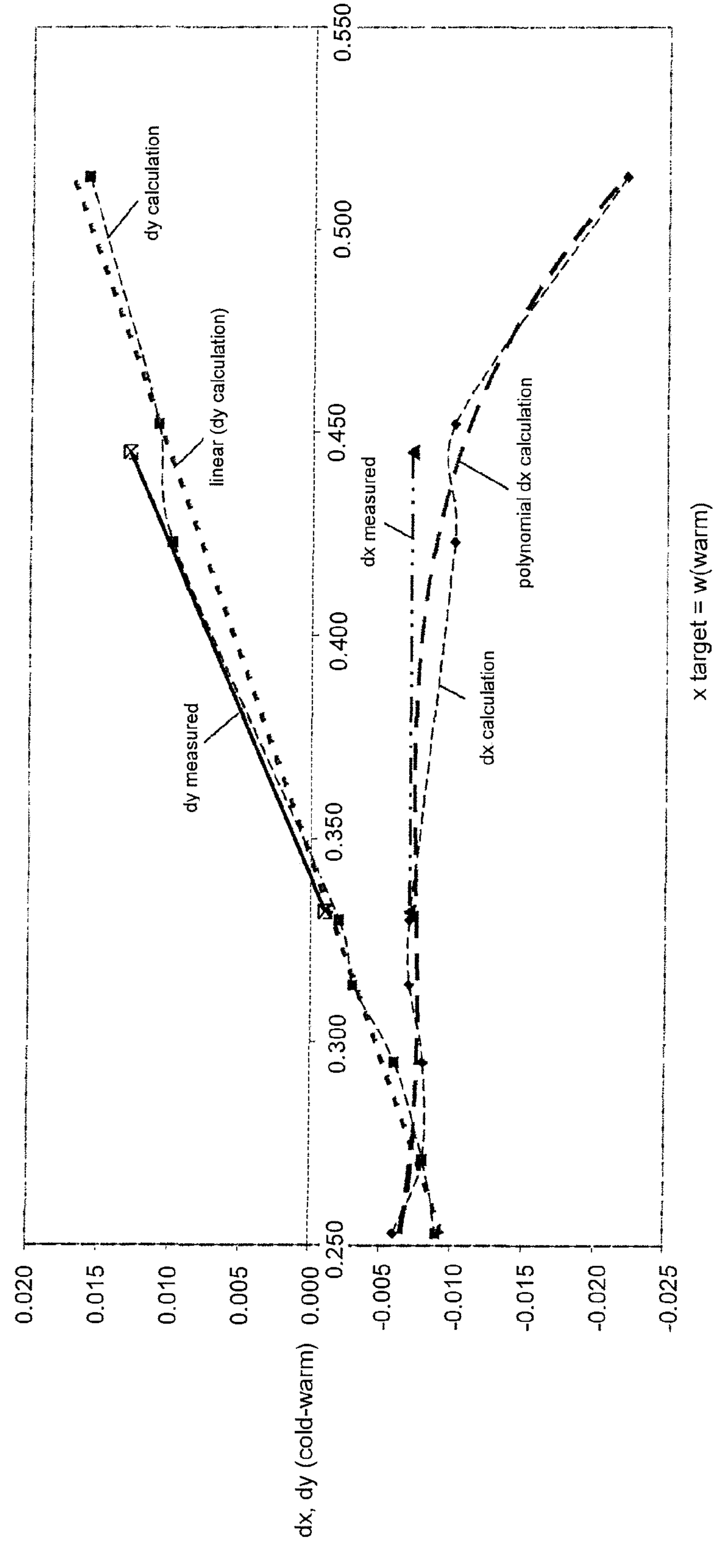
FIG. 33 shows the chromaticity coordinates deviation dx, dy (cold-warm) dependent on the target chromaticity coordinate x for target chromaticity coordinates x, y along the Planckian locus in the color temperature range between 2200 K and 24000 K.
Figure 34:
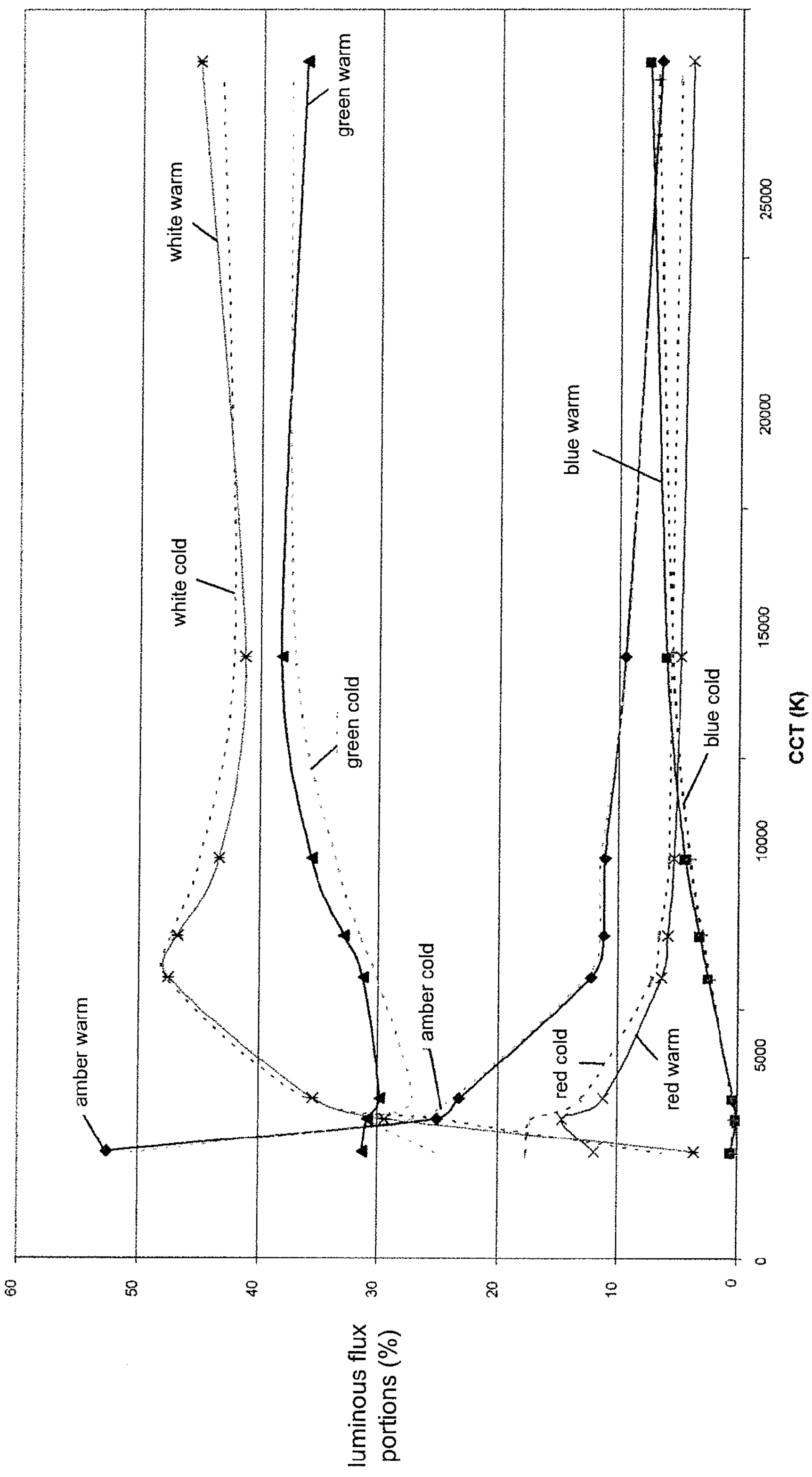
FIG. 34 shows the optimum luminous flux portions warm and cold as function of the color temperature CCT.

FIG. 32 shows the CCT deviation cold-warm dependent on the color temperature, FIG. 33 shows the deviation of the chromaticity coordinates dx, dy (cold-warm) dependent on the target chromaticity coordinate x for target chromaticity coordinates x, y along the Planckian locus in the color temperature range between 2200 K and 24000 K and FIG. 34 shows the optimum luminous flux portions warm and cold as function of the color temperature CCT.

On the spotlight level, the following methods are possible for the compensation of the color shift:

a) Entering a compensation algorithm for the color temperature correction Δ CCT=f(CCT, $T_{NTC}$) in connection with calibration data for an NTC temperature. This compensation method can be easily performed but is comparably imprecise since deviations from the Planckian locus are not compensated and is only applicable for color temperature adjustments but not for any chromaticity coordinates, e.g., not for effect colors.

The compensation algorithm for the color temperature correction can be determined experimentally or mathematically. In case of an experimental determination, the optimum luminous flux portions for different CCT interpolation points in the warm operation state ($T_{NTC\ warm}$) as well as the brightness-temperature characteristic lines are determined for a spotlight, and the spotlight is adjusted in the cold state ($T_{NTC\ cold}$) to different set color temperatures. Subsequently, the color temperature of the emitted light is measured and the difference between the target color temperature and the measured color temperature is plotted dependent on the target color temperature. An approximation function, e.g., a polynomial is determined for these pairs of values.

In case of a mathematical determination of a compensation algorithm for the color temperature correction, it is assumed that the optimum luminous flux portions for different CCT interpolation points in the warm operation state ($T_{NTC\ warm}$) of a spotlight are present. Then, the spectra of the single colors are measured in the cold operation state ($T_{NTC\ cold}$) and these "cold spectra" are mixed for different CCT interpolation points by means of the luminous flux portions determined for the warm operation state $T_{NTC\ warm}$ and the color temperature is calculated from the mixed spectrum obtained in this way. The difference between the target color temperature and the color temperature calculated from the cold spectra is plotted dependent on the target color temperature. An approximation function (e.g. a polynomial) is determined for these pairs of values.

The approximation function obtained in this way represents the color temperature correction $\Delta\,CCT_{cold}$ to be applied dependent on the target color temperature for a cold spotlight. Typically, the NTC temperature lies in operation between $T_{NTC\ warm}$ and $T_{NTC\ cold}$. The color temperature correction $\Delta\ CCT_{cold}\ (CCT_{target})$ determined dependent on the target color temperature is linearly interpolated according to the actual $T_{NTC}$ value:

$$\Delta CCT(CCT_{target}, T_{NTC}) = \Delta CCT_{cold}(CCT_{target}) / (T_{NTC\ warm} - T_{NTC\ cold}) * (T_{NTC} - T_{NTC\ cold})$$

The software then provides the spotlight the color temperature corrected for the value $\Delta\ CCT(CCT_{target}, T_{NTC})$ instead of the desired target color temperature.

The method of the color temperature correction leads to correct highly correlated color temperatures of the emitted light at different NTC temperatures. It does, however, not have the ability to compensate optionally additional occurring color deviations from the Planckian locus since the color deviation to be compensated rarely accidental runs exactly along the Planckian locus due to the temperature-conditional shift of the dominant wavelength.

Alternatively, the optimum luminous flux portions can also be determined for the cold operation state and the correction function can be determined by means of the spectra or the measurement data of the spotlight in the warm operation state.

b) Entering a correction algorithm for the correction of the chromaticity coordinates $\Delta x$ and $\Delta y = f(x_{target}, T_{NTC})$ or $\Delta x$ and $\Delta y = f(CCT_{target}, T_{NTC})$ and the calibration data for an NTC temperature. This compensation method also can be simply performed, however, it works for the correction of the chromaticity coordinates, e.g., for a maximum brightness. However, it does not provide optimum luminous flux portions and holds the danger of a CRI deterioration. Additionally, it is only applicable for a color temperature adjustment, but not for any chromaticity coordinates, e.g., for effect colors.

This compensation method requires two correction functions for the chromaticity coordinates x and y. The correction functions for the correction for the chromaticity coordinates can be determined, analogously to the compensation algorithm for the color temperature, either experimentally or mathematically.

The corrections of the chromaticity coordinates $\Delta x$, $\Delta y_{cold}\ (CCT_{target})$ determined dependently on the target chromaticity coordinates are linearly interpolated according to the actual $T_{NTC}$ value:

$$\Delta x, \Delta y(CCT_{target}, T_{NTC}) = \Delta x, \Delta y_{cold}(CCT_{target}) / (T_{NTC\ warm} - T_{NTC\ cold}) * (T_{NTC} - T_{NTC\ cold})$$

The software then provides the spotlight the chromaticity coordinates corrected for the values $\Delta x(CCT_{target}, T_{NTC})$ and $\Delta x(CCT_{target}, T_{NTC})$ instead of the chromaticity coordinates of the desired target color temperature.

Also here, the optimum luminous flux portions for the cold operation state can be alternatively determined, and the correction functions can be determined by means of the spectra or the measurement data of the spotlight in the warm operation state.

The described method of the correction of the chromaticity coordinates leads to correct chromaticity coordinates along the Planckian locus of the emitted light at different NTC temperatures. Desired color temperatures can therewith be adjusted exactly along the Planckian locus.

Since in case of this compensation of chromaticity coordinates some colors have to be mixed to the stored optimum luminous flux ratio and there are, in case of three channels, partially theoretical unlimited possibilities of combination, the admixing of colors is possibly effected unfavorably with respect to an optimum color reproduction and mixed-light capability with film. This uncertainty is solved with the compensation method described hereinafter under c).

c) Interpolation optimum mixture=$f(CCT, T_{NTC})$ and chromaticity coordinates=$f(T_{NTC})$ and determining the calibration data (optimum mixture and chromaticity coordinates) for two NTC temperatures.

These compensation methods results in the best color rendering index (CRI), represents the most precise (x, y) method for the mixtures optimized towards the color reproduction and the brightness, represents the most precise (x, y) method for mixtures and is applicable for any chromaticity coordinates. However, it requires a higher effort for the software development (calibration, spotlight, colorimetry).

The time effort during the spotlight calibration is increased only marginally. Without application of this compensation method, the spotlight would be only calibrated in the warm and therewith typical operation state, wherein the time effort for the calibration is essentially composed of inserting the spotlight into the measurement apparatus, connecting the spotlight to the supply and control devices as well as starting the calibration software and the heating-up period to the calibration temperature $T_{NTC\ warm}$. The actual detection of the spectra is effected in a matter of seconds. During the compensation method c) "cold spectra" are co-detected only prior to the start of the heating-up phase and are accordingly processed by the software, what can be effected within a few seconds and does not require additional activities of the user.

This method can be applied for the following modes:

a. Adjusting a desired color temperature with best possible color reproduction and mixed-light capability, i.e. color-rendering optimized.

During calibration, the spectra of the primary colors are detected in the cold ($T_{NTC\ cold}$) as well as in the warm ($T_{NTC\ warm}$) state and optimum luminous flux portions of the used LED colors are calculated for some CCT interpolation points and are stored in the spotlight or the control device:

$Y_{rel\text{-}warm}$ (CCT) optimal luminous flux portions dependent on the CCT for $T_{NTC\ warm}$ $Y_{rel\text{-}cold}$ (CCT) optimal luminous flux portions dependent on the CCT for $T_{NTC\ cold}$ These optimum luminous flux portions lead both in the cold and in the warm state to color-rendering optimized light mixtures which match exactly the chromaticity coordinates of the desired color temperature.

For NTC temperatures unequal $T_{NTC\ warm}$ or $T_{NTC\ cold}$ the optimum mixture can be obtained by interpolation:

$$Y_{rel}(CCT,T_{NTC})=Y_{rel\_cold}(CCT)+(T_{NTC}-T_{NTC\ cold})*(Y_{rel\_warm}(CCT)-Y_{rel\_cold}(CCT))/(T_{NTC\ warm}-T_{NTC\ cold})$$

If a color temperature is to be adjusted which lies between two CCT interpolation points then the mixtures of both CCT interpolation points are calculated for the actual NTC temperature as precedingly described and are subsequently interpolated between the two CCT interpolation points such that the desired target color temperature is achieved.

b. Setting of any chromaticity coordinates or effect colors with best possible luminous efficacy or brightness, i.e. brightness-optimized.

For the calculation of any brightness-optimized chromaticity coordinates which can be both "white" colors having any color temperature and any effect colors which lie within the depictable LED gamut, only the tristiumulus values X, Y, Z of the used primary colors are required according to the laws of additive color mixture. The tristimulus values X, Y, Z can be calculated from the chromaticity coordinates x, y and the brightness-proportional value Y with the aid of the generally known formula of colorimetry so that it is sufficient to know the values x, y and Y dependent on the NTC temperature.

During application of the brightness-temperature characteristic lines one can assume that the tristimulus value Y remains constant. Thus, it is sufficient to only store the values x, y dependent on the NTC temperature.

For this purpose, chromaticity coordinates of the LED primary colors are calculated from their "cold spectra" and their "warm spectra" during the calibration and are stored together with the brightness value Y in the memory of this spotlight or of the control device:

The chromaticity values of the primary colors needed for the calculation of the mixtures for adjusting any colors with maximum brightness can be calculated by linear interpolation dependent on the actual NTC temperature:

$$x(T_{NTC})=x_{cold}+(T_{NTC}-T_{NTC\ cold})*(x_{warm}-x_{cold})$$

$$y(T_{NTC})=y_{cold}+(T_{NTC}-T_{NTC\ cold})*(y_{warm}-Y_{cold})$$

Figure 35:
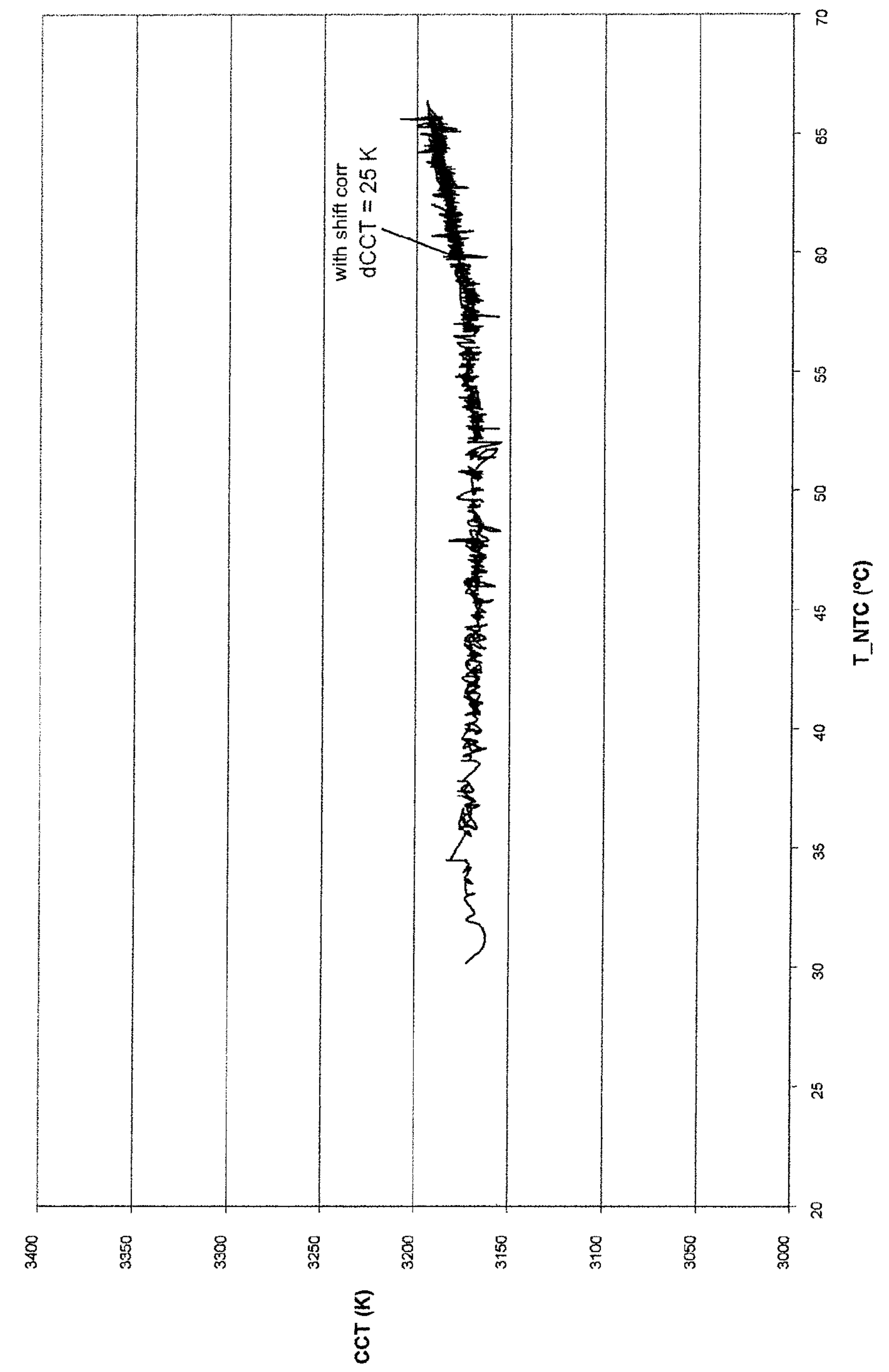
FIG. 35 shows a graphic of the measured color temperature of a five-channel LED module dependent on the NTC temperature for the setting CCT=3200 K with implemented correction of the spectral shift.
Figure 36:
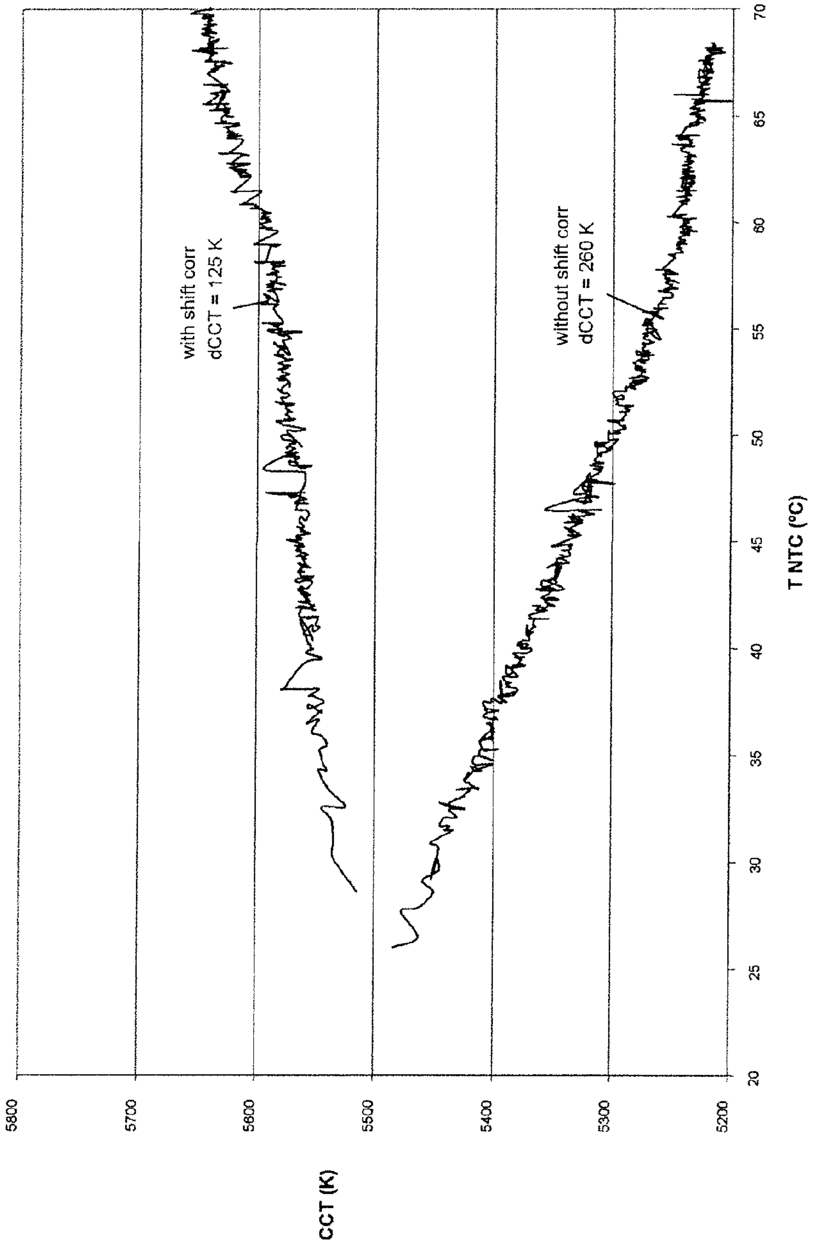
FIG. 36 shows a graphic of the measured color temperature of an LED module dependent on the NTC temperature for the setting CCT=5600 K with implemented correction of the spectral shift.

$Y(T_{NTC})=Y_{warm}$ according *to* the applied temperature-brightness characteristic lines FIG. 35 shows a graphic of the measured color temperature of the 5-channel LED module dependent on the NTC temperature for the setting CCT=3200 K with implemented correction of the spectral shift according to method c) and FIG. 36 shows a graphic of the measured color temperature of an LED module dependent on the NTC temperature for the setting CCT=5600 K with implemented correction of the spectral shift according to method c) in comparison to the behavior without correction of the spectral shift with only acting of the temperature compensation.

As precedingly explicated, for each LED primary color the characteristic lines $Y_{rel}=f(T_{NTC}, PWM_i)$ are implemented:

$$Y(T_{NTC})=A+B*(T_{NTC}-Tn+dT)+C*(T_{NTC}-Tn+dT)^2+D*(T_{NTC}-Tn+dT)^3 \quad \text{(formula 9)}$$

$$\text{with } dT=E*PWM \quad \text{(formula 10)}$$

wherein $Y(_{T\_NTC})$ brightness dependent on the NTC temperature

A, B, C, D polynomial coefficients of the characteristic lines $T_{NTC}$ actual NTC temperature Tn working temperature If the curves are normalized to $Y(_{T\_NTC})=1$ @ $T_{NTC}=Tn$, then the polynomial coefficient A=1.

dT correction value dependent on the actual LED power

E "power parameter"

PWM LED PWM control signals

The micro controller calculates for each color the temperature correction factor $kT=1/Y(_{T\_NTC})$ during the spotlight operation dependent on the actual NTC temperature. The PWM signals calculated for each adjustment of a desired color are multiplied with the correction factor kT calculated for each color. Thereby, the brightness of the color is kept constant over the operation temperature.

Thereby, the following effects are accounted for:

Temperature dependency of the brightness per color with power-dependent temperature correction of the characteristic lines ("power parameter E" in connection with the internal PWM)

The curves are described by a third-grade polynomial, coefficients of the temperature characteristic line: A, B, C, D as well as power parameter E.

Since the LED power of same-color LEDs can vary at the same dimming factor (PWM) at the same current due to forward voltage tolerances, because the temperature difference between the value measured at the NTC and the junction of the LED depends on the forward voltage, a correction is performed for which the power-dependent temperature correction is individually calculated for each LED module dependent on the individual LED forward voltages UF.

It follows from the generally known formula for the thermal resistance Rth=dT/dP that the temperature difference between NTC and junction is directly proportional to the transmitted power. The LED power in turn is directly proportional to the forward voltage: P=UF*I.

From this it follows that the temperature difference between the NTC and the junction dT is directly proportional to the forward voltage of the LEDs: dT UF.

The power parameter E empirically determined for a typical LED module is thus directly proportional to the forward voltage UF of the LEDs. If the forward voltage of the individual LEDs deviates from that LED for which the characteristic lines have been determined, then formula 9 can be extended as follows:

$$dT=E*U_F/U_{measured}*PWM \quad \text{(formula 9a)}$$

Thereby,

UF is the forward voltage of the LED color of the individual LED module $U_{measured}$ is the forward voltage of the LED color of the LED module at which the typical brightness-temperature characteristic lines have been recorded.

The individual forward voltage UF additionally depends to a low extent on the temperature. It can either approximately be regarded as constant and can be determined once, e.g., during the calibration and be stored or it is in a more precise method measured by the micro controller during the spotlight operation or the value determined during the calibration is corrected dependent on the actual NTC temperature. In the data sheets of the LED manufactures the according data dUF/dT can be found.

Figure 37:
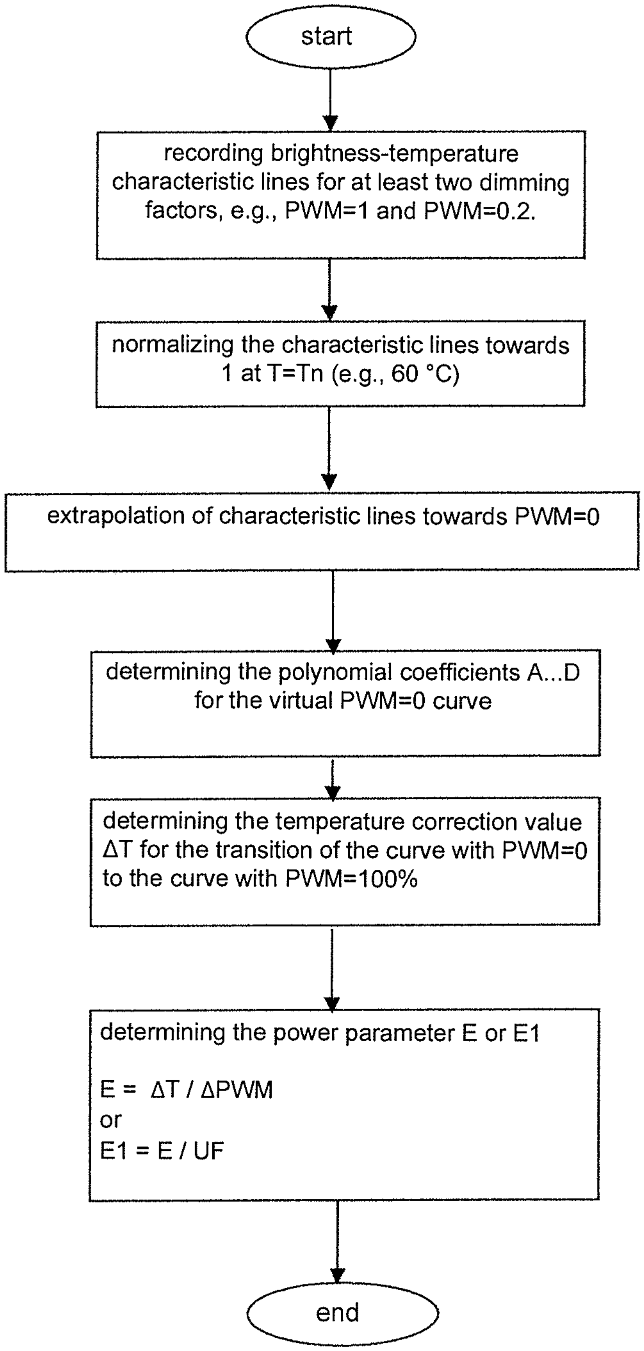
FIG. 37 shows a flow-chart for determining the temperature characteristic lines dependent on the dimming factor (PWM) and the forward voltage.

For determining the temperature characteristic lines dependent on the dimming factor (PWM) and the forward voltages the following method steps are thus provided which are schematically depicted in the flow-chart according to FIG. 37, wherein all graphics to be evaluated have to be normalized to Y=1 at working temperature $T_{NTC}$=Tn.

1. Performing the measurements (with spectrometer)

$$Y_{PWM100}=f(T_{NTC})\text{brightness}=f(\text{temperature}) \text{ for } PWM=100\%$$

$$Y_{PWM20}=f(T_{NTC})\text{brightness}=f(\text{temperature}) \text{ for } PWM=20\%$$

$U_{measured}$ forward voltage *at* 25° C.

2. Normalization of the measured characteristic lines to Y=1 at $T_{NTC}=T_{n\ (e.g.\ 75°\ C.)}$
3. Mathematical determination of the temporally polynomial coefficient $B_{temp}$, $C_{temp}$, $D_{temp}$ for measured curve PWM=100 from 4 interpolation points for a third-degree polynomial having the form $$Y_{PWM100}=A+B*(T_{NTC}-Tn)+C*(T_{NTC}-Tn)^2+D*(T_{NTC}-Tn)^3$$

The coefficient A is thereby 1 due to the preceding normalization to Y=1 at $T_{NTC}=T_n$ 4. Experimental determination of $dT_{PWM20}$ for the fitted curve PWM=20

$$Y(T\_NTC)=1+B_{temp}*(T_{NTC}-Tn+dT)+C_{temp}*(T_{NTC}-Tn+dT)^2+D_{temp}*(T_{NTC-Tn+dT})^3$$

(parameter dT is thereby varied until this formula results in an optimum approximation to the measured curve PWM=20.)

5. Extrapolation of $dT_{PWM20}$ to $dT_{PWM0}$:$dT_{PWM0}$=5/4*$dT_{PWM20}$
6. Determination of polynomial coefficients $B_1$, $C_1$, $D_1$ for the precedingly extrapolated curve with PWM=0
4 interpolation points from following curve:

$$Y(T\_NTC)=1+B_{temp}*(T_{NTC}-Tn+dT_{PWM0})+C_{temp}*(T_{NTC}-Tn+dT_{PWM0})^2+D_{temp}*(T_{NTC}-Tn+dT_{PWM0})^3$$

result in a new equation for PWM=0

$$Y(T\_NTC)=1+B_1*(T_{NTC}-Tn)+C_1*(T_{NTC}-Tn)^2+D_1*(T_{NTC}-Tn)^3$$

7. Experimental determination of $dT_{PWM100}$ for the measured curve PWM=100 (with polynomial coefficients $B_1$, $C_1$, $D_1$)

$$Y(T\_NTC)=1+B_1*(T_{NTC}-Tn+dT_{PWM100})+C_1*(T_{NTC}-Tn+dT_{PWM100})^2+D_1*(T_{NTC}-Tn+dT_{PWM100})^r$$

(parameter dT to be varied until optimal approximation to the measured curve PWM=100)

8. Determination of the temporally power parameter $E_{temp}$

Approach:

$$dT_{PWM100}=E_{temp}*PWM\rightarrow E_{temp}=dT_{PWM100}/PWM$$

9. Determination of the general power parameter $E_1$
Approach:

$$dT(U_F) = E_{temp} * U_F / U_{measured} * PWM$$
$$= E_{temp} / U_{measured} * U_F * PWM$$
$$= E_1 * U_F * PWM$$

From this it follows: $E_1=E_{temp}/U_{measured}$

If the individual forward voltage is not to be considered, then $E_1$=Etemp

10. The general temperature characteristic lines dependent on the PWM as well as on the forward voltage now read:

$$Y(T\_NTC)=1+B_1*(T_{NTC}-Tn+dT)+C_1*(T_{NTC}-Tn+dT)^2+D_1*(T_{NTC}-Tn+dT)^3$$

with $dT=E_1*PWM*U_F$

If one looks at the brightness-temperature characteristic lines for the colors yellow . . . orange . . . red then one realizes that the curves for yellow (ca. 590 nm) run most steeply, for orange to red (ca. 620 nm) increasingly more flat. The brightness modification between Y(20° C.)/Y(74° C.) measured at an LED module with yellow (dominant wavelength 592 nm) and red (dominant wavelength 620 nm) has the factor 1.80 for the red or 3.19 for the yellow LEDs. Only 28 nm difference in the dominant wavelength lie in between. From this it is obvious that already typical tolerances of the dominant wavelength of few nanometers have a strong effect on to the actual brightness temperature characteristic lines.

Due to this fact, a correction or adaptation of the stored temperature coefficients dependent on the dominant wavelength, in particular for AlInGaP chips (amber, red) is performed according to the invention, wherein the characteristic lines are individually adapted for each LED module onto the individual dominant wavelengths.

The correction of the brightness-temperature characteristic lines for this effect can be effected according to the following principle:

Several brightness-temperature characteristic lines per color are recorded in the laboratory at LED modules of different dominant wavelengths From this, the polynomial parameters A . . . E are determined for each color dependent on the dominant wavelength.

In the context of the LED module calibration, the spectra of the LED colors as well as the according NTC temperature are detected for each LED module. This can be effected in the context of the module calibration and module selection and does generally not represent any additional effort. The dominant wavelengths per color are calculated from this spectrum. The polynomial parameters A . . . E determined in advance at single modules are corrected according to the deviation of the individual dominant wavelength of the module to be calibrated from the dominant wavelength of the module from which the characteristic lines have been determined.

The conversion of the polynomial parameters to an LED having certain dominant wavelengths can be effected by a linear interpolation of the polynomial parameters of two known curves of two LEDs having different dominant wavelengths to the new dominant wavelength. The most precise results are obtained if the dominant wavelengths of the original curves as well as the dominant wavelength onto which it should be converted lie together as close as possible. Thereby, it must not be interpolated between given curves of different LED technologies like AlInGaP and InGaN.

If one, e.g., requires the curve for a third-degree polynomial together with polynomial parameters A . . . D for a yellow LED having the dominant wavelength I_dom_yellow1, then one requires additionally the curve together with the polynomial parameters A . . . D for a similar LED having a different dominant wavelength I_dom_yellow2 (with a somewhat higher uncertainty also orange or red). The polynomial parameters A . . . D for a yellow LED having a dominant wavelength I_dom_yellow3 are then obtained by a linear interpolation of the polynomial parameters for the curves with I_dom_yellow1 or I_dom_yellow2 dependent on the wavelength difference.

Figure 38:
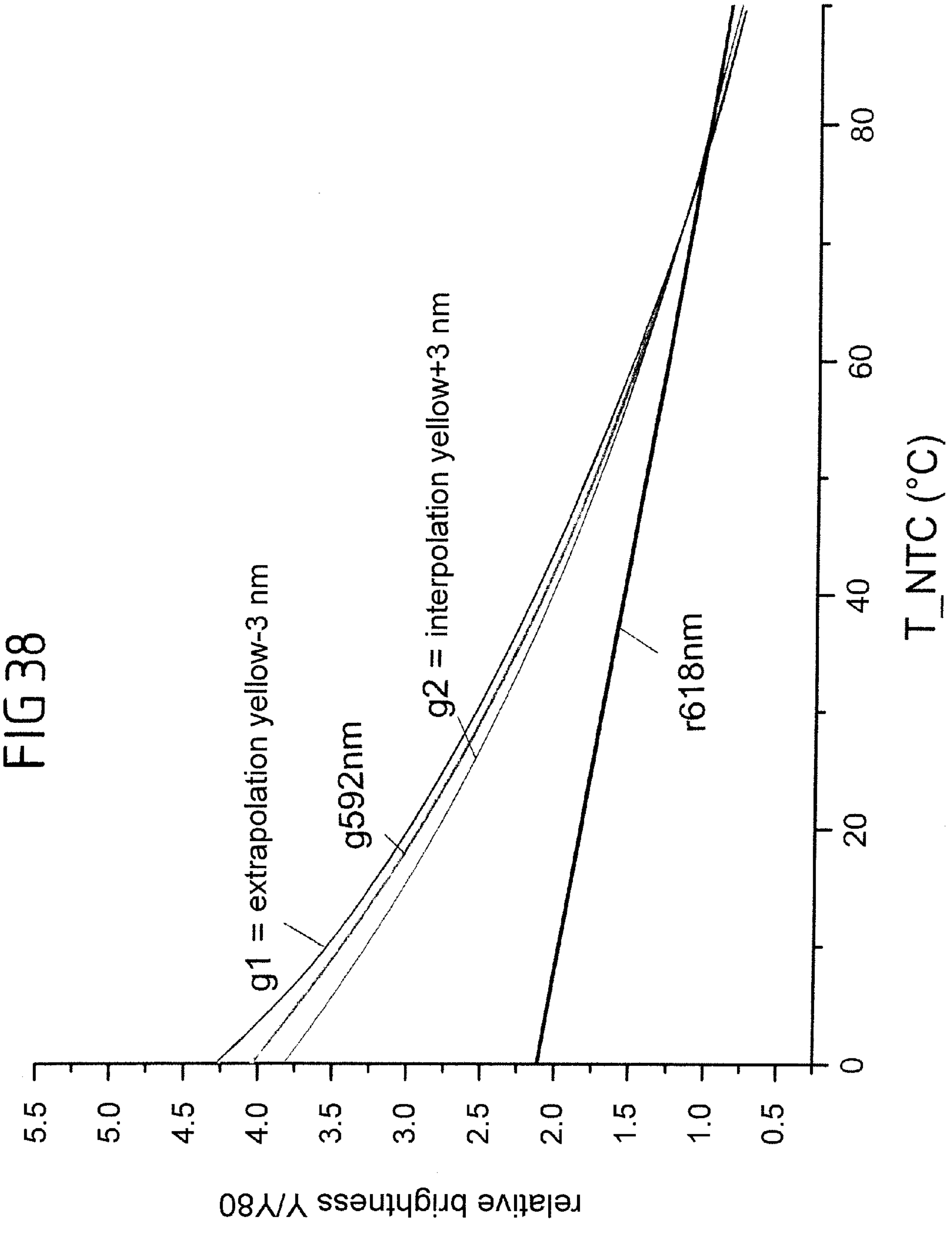
FIG. 38 shows brightness-temperature characteristic lines for yellow and red LEDs as well as a linear interpolation and extrapolation for the yellow LED for +/−3 nm wavelength deviation.

The general procedure is shown in FIG. 38 by means of the original curves for a yellow and a red LED as well as the curves derived from it for two theoretic yellow LEDs, the dominant wavelengths of which deviate by +/−3 nm from the original yellow curve.

An advantage of this method is that, during spotlight operation, the brightness of each LED module can be kept constant according to its individual valid temperature-brightness characteristic line without the necessity that these have to be individually and metrologically determined in time consuming measurements of the brightness over the temperature. Instead of that, it is sufficient for determining the individual temperature-brightness characteristic line to know this curve for a "typical" LED module and to further detect the spectra of the individual LED modules in the cold state, what is possible with an extremely low time effort and would typically be effected in the context of the calibration anyway.

Naturally, this method can be applied for all LED colors. However, the strongest effect will occur for the AlInGaP colors yellow . . . orange . . . red.

Stabilization of Luminous Efficacy

Since the luminous efficacy of the mixtures and therewith the brightness vary due to the temperature-dependent tracking of the color-reproduction optimized mixtures and additionally the individually stored optimum luminous flux portions of the color-reproduction optimized mixtures can let occur mixtures having different luminous efficacies and therewith different brightnesses at different spotlights, two methods for the color stabilization and brightness stabilization are applied to extend the brightness stabilization and to adapt several spotlights to a color-reproduction optimized white mode via the luminous efficacy:

normalization of the luminous efficacy dependent on the board temperature set match of luminous efficacy between different spotlights Firstly, on the one hand the brightness-temperature characteristic lines dependent on the pulse-width modulation have been applied for the color stabilization and brightness stabilization and the luminous flux portions of a color mixture for different NTC temperatures calculated for the warm operation state have been kept constant.

On the other hand, a "power normalization" has been introduced to keep the maximum LED power for each color mixture constant when the warm operation state has been reached. Therewith, a premature reaching or exceeding of a switch-off temperature is avoided. An individual "internal" power dimming factor is calculated and applied for each adjusted color mixture with the aid of the power normalization (e.g., 5 W LED power per module). Therewith, each color mixture can be adjusted with optimum brightness or optimum internal dimming factor without reaching or exceeding the shut-off temperature at normal ambient conditions. Thereby, the power normalization is effected selectively for the warm operation state because here a higher LED current or a higher LED power has to be applied due to the negative brightness-temperature characteristic of the LEDs to keep the brightness of the spotlight constant over the temperature. At temperatures below the switch-off temperature the spotlight is automatically operated at a lower power. To keep the brightness constant without thereby ever having to adjust a higher power than Pmax, this maximum power must be reached only at the switch-off temperature.

Each selected chromaticity coordinate could be set in each case with the highest possible brightness being also constant over the operation temperature by both preceding methods. The measured brightness variations per selected chromaticity coordinates varied by less than 1% between cold and warm.

It is disadvantageous that the adjusted chromaticity coordinates changed over the operation temperature due to the spectral shift of the used LED primary colors. The extent of the chromaticity coordinate variation depended on the chromaticity coordinate as well as on the respective color mixture and amounted to the dimension of 300 K between cold and warm, wherein the color temperature decreased with increasing temperatures since the effect of the temperature-dependent spectral shift is pronounced in particularly for the AlInGaP LEDs in the yellow to red color range. The variation of the dominant wavelength amounts to ca. 0.1 nm/K for yellow, orange and red AlInGaP LEDs. A remedy was effected via the precedingly described compensation of the temperature-dependent spectral shift by essentially duplicating the calibration data for the warm to the cold state and a temperature-dependent linear interpolation. This algorithm could seriously ameliorate the constancy of the chromaticity coordinates over the operation temperature.

However, despite power normalization and application of the brightness-temperature characteristic lines partly massive luminous flux variations of an adjusted color of up to much more than 10% between the cold and warm operation state occurred by the compensation of the spectral shift. Extent as well as direction of the brightness variation depend on the chosen chromaticity coordinate or the color mixture and could thus not be determined or compensated without further ado.

The reason for these brightness variations at constant chromaticity coordinates is that the luminous efficacy of the respective mixtures varies with the operation temperature due to the temperature-dependent tracking of the luminous flux portions or the modification of the importance of the single LED primary colors. This effect is completely independent on the brightness-temperature behavior of the LEDs. The normalization of these mixtures varying with the temperature to a constant LED total power used hitherto led inevitably to non-constant brightnesses due to the varying luminous efficacies of the LED mixtures.

This problem is solved by an extended brightness stabilization via the luminous efficacy as follows:

For all optimum luminous flux portions of the CCT interpolation points stored in the memory the according luminous efficacies for the warm operation state $\eta_{NTC\_warm}$(CCT, $T_{NTC\_warm}$) are additionally calculated and stored in the memory. During the operation, the actual luminous efficacy $\eta_{NTC}$(CCT, $T_{NTC}$) is calculated from the mixtures tracked for deviating operating temperatures. The luminous efficacy correction factor $k\eta=\eta_{NTC\_warm}/\eta_{NTC}$ is calculated from the ratio of those two values and the set PWM portions of the LED mixture are multiplied with this factor. By this method, both the chromaticity coordinates and the brightness remain constant over the operation temperature.

Set Match of Luminous Efficacy

Due to the module-internal temperature compensation and the calibration data Y, x, y (per color) stored in the spotlight, each spotlight makes only sure that the adjusted color (CCT or x, y) is correct. In a set consisting of several spotlights all spotlights have then the same color—but possibly different brightnesses.

Even in case of good selection of the LED chips both the chromaticity coordinates and the luminous efficacies of the used LED primary colors can vary from spotlight to spotlight since the optimum luminous flux portions for the cold and the warm operation state are determined and stored for each spotlight for different CCT interpolation points to adjust color-reproduction optimized color temperatures. These optimum luminous flux portions and according luminous efficacies can vary due to LED tolerances from spotlight to spotlight. Thus, different spotlights require individual LED mixtures to safely adjust the desired color.

If now a set consisting of several spotlights would be adjusted together onto a certain color temperature and the color mixture of each spotlight would be related to the same maximum total power $P_{max,warm}$, then the luminous efficacies of the single spotlights could deviate by more than 30% from each other for the same color temperature. Analogously, the brightness of the spotlights would vary correspondingly—at the same color temperature adjustment and LED power. It would be impossible to adjust a set of spotlights to the same color at the same brightness.

To make sure that all spotlights connected to a controller have the same brightness, a brightness matching function, e.g., by the controller, is necessary by which the respective brighter spotlights are adjusted, i.e. reduced, for each color to the lowest brightness within the set.

This problem is solved by a "luminous efficacy set match" as follows:

The luminous efficacy in the warm state is additionally calculated and stored for the color mixtures of all CCT interpolation points for the color-reproduction optimized white mode. For all spotlights, which are connected together to a set, the smallest luminous efficacy per CCT interpolation point is determined of all spotlights belonging to the set and is stored as set luminous efficacies of the CCT interpolation points in all spotlights. From this, the set luminous efficacy correction factor is determined dependent on the CCT and the actual NTC temperature during the operation:

$$k\eta Set(CCT,T_{NTC})=\eta Set(CCT,T_{NTCwarm})/\eta(CCT,T_{NTC})$$

and the determined PWM portions are multiplied therewith, i.e., all spotlights are adjusted per CCT interpolation point to the brightness of the lowest luminous efficacy within the set.

Therewith, all spotlights of a set illuminate in the color-reproduction optimized white mode with the same brightness which does not vary anymore over the temperature. Likewise, the chromaticity coordinates remain constant over the whole operation temperature due to the precedingly described compensation of the spectral shift.

This method establishes two options:

a) Generation of any CCTs with maximum possible brightness. The brightness of an adjusted CCT is constant both within all spotlights of a set and over the temperature. However, the brightness might vary according to the corresponding set luminous efficacy due to a variation of the CCT.

b) Generation of any CCTs with constant brightness so that the brightness of all selectable CCTs is constant both within all spotlights of a set and over the temperature. Upon variation of the CCT the brightness remains constant.

Therefore, only the minimum value of the set luminous efficacies $\eta$Set(CCT, $T_{NTC\ warm}$) is determined over all CCTs, $\eta Set_{min}(T_{NTC\ warm})$ and the actual set luminous efficacy correction factor $k\eta$Set(CCT, $T_{NTC}$)=$\eta Set_{min}/\eta$(CCT, $T_{NTC}$) is applied. In this manner, all spotlights within a set can generate any color temperatures with identical brightness.

For performing this method the following data is necessary:

$Y_{rel\ cold}$=f(CCT) optimized luminous flux portions for CCT interpolation points, cold operation state $Y_{rel\ warm}$=f(CCT) optimized luminous flux portions for CCT interpolation points, warm operation state $P100_i$ powers per LED primary color @ PWM=1

$Y100_i$ brightness per LED primary color for warm operation state @ PWM=1

$T_{NTCwarm}$ NTC temperature for warm operation state $T_{NTCcold}$ NTC temperature for cold operation state $\eta$Set=f(CCT) set luminous efficacy for warm operation state The following formula serves for the calculation of the luminous efficacy $\eta$ of a color mixture:

Given are:

$Y_{rel,i}=f(CCT,T_{NTC})$: luminous flux portions for desired CCT for actual NTC temperature $PWMi=Y_{reli}/Y100_i$ PWM signals for adjusting the luminous flux portions Total brightness=$\Sigma PWMi*Y100$, total brightness of the actual mixture before correction Total power=$\Sigma PWMi*P100_i$ total power of the actual mixture before correction $\eta$=total brightness/total power luminous efficacy of the actual mixture (formula 11)

The set match can, e.g., be effected within the calibration. All spotlights of a manufacturing series can also be considered as set: Then additionally all sets of a manufacturing series would represent the desired CCTs having the same brightness.

The set match can be carried out by the controller in case of a composition of individual sets. Therefore, it reads in the according spotlight calibration data, determines the minimum set luminous efficacies and stores these as set calibration data in the calibration data.

The set match is done as follows:

The controller reads in from all connected spotlights:

$Y_{rel\ warm}$=f(CCT) optimized luminous flux portions for CCT interpolation points, warm operation state $P100_i$ powers per LED primary color @ PWM=1

$Y100_i$ brightness per LED primary color for warm operation state @ PWM=1

The controller calculates the luminous efficacies of the CCT interpolation points for $T_{NTC\ warm}$:$\eta_{warm,k}$=f(CCT) for all connected spotlights and for all CCT interpolation points according to formula 1

The controller determines the minimum luminous efficacy of the spotlight set to $\eta$Set=f(COT) from all spotlights per CCT interpolation point from the values $\eta_{warm,k}$=f (CCT)

The controller writes into the EEPROM of the spotlights the set luminous efficacies $\eta$Set=f(CCT) (therewith, the set match is effected.)

If a color temperature is adjusted at the spotlight, then the colorimetric functions calculate the actual luminous efficacy $\eta$(CCT, $T_{NTC}$) for each actual color mixture dependent on the NTC temperature and determined from it the actual set luminous efficacy correction factor $$k\eta Set(CCT,T_{NTC})=\eta Set_{min}/\eta(CCT,T_{NTC}).$$

For the PWM controlling, the determined PWM signals are multiplied with the set luminous efficacy correction factor kηSet(CCT, $T_{NTC}$).

With the indices i for the color and k for the spotlights

To ameliorate the correct color as well as the color fidelity during dimming, non-perfectly linear dimming characteristic lines are recorded per color channel by determining approximation functions for the dimming characteristic lines per color, storing dimming coefficients a and x per color in the spotlight and correcting the PWM control signals according to the characteristic line.

The invention claimed is:

1. A method for the temperature-dependent adjustment of color properties or photometric properties of an LED illuminating device having a plurality of LEDs in LED color groups emitting light of different colors or wavelengths, wherein luminous flux portions thereof determine the color of light, color temperature and/or chromaticity coordinates of a light mixture emitted by the LED illuminating device and are adjusted by controlling the LEDs comprising colored and white LEDs having the same color in each case by pulse-width modulated control signals, comprising:

measuring a temperature within the LED illuminating device, of a board containing the LEDs or a junction temperature of at least one LED;

adjusting a light mixture having a specified color of light, color temperature and/or chromaticity coordinates by adjusting pulse-width modulated control signals corresponding to the luminous flux portions of the LEDs of the light mixture;

determining a dependency of the pulse-width modulated control signals on temperature from a brightness of the LEDs varying over a relevant temperature range by, determining a factor ($f_{PWM}$) corresponding to the reciprocal of a relative brightness modification of the LED color groups with respect to the basic setting, and determining a value of the pulse-width modulated control signals (PWM(T)) of each LED corresponding to the measured temperature by multiplying the basic-setting relating value of the pulse-width modulating control signals ($PWM_A$) of each LED with the factor ($f_{PWM}$) being dependent on the measured temperature (T) according to the equation $$PWM(T)=PWM_A*f_{PWM};$$

modifying the pulse-width modulated control signals PWM (T) corresponding to the luminous flux portions of the LEDs of the light mixture adjusted to a specified color of light, color temperature and/or chromaticity coordinates, the modulation being dependent on the measured temperature; and adjusting the pulse-width modulated signals (PWM (T)) of each LED at the LED illuminating device by, measuring the actual brightness of the LED illuminating device, determining the difference between the measured brightness actual value and a brightness set value, and adapting the light intensity emitted from the LED illuminating device to the brightness set value by correspondingly increasing or decreasing electric power fed to the LEDs.

2. A method for the temperature-dependent adjustment of color properties or photometric properties of an LED illuminating device having a plurality of LEDs in LED color groups emitting light of different colors or wavelengths, wherein luminous flux portions thereof determine the color of light, color temperature and/or chromaticity coordinates of a light mixture emitted by the LED illuminating device and are adjusted by controlling the LEDs comprising colored and white LEDs having the same color in each case by pulse-width modulated control signals, comprising:

measuring a temperature (T) within a housing of the LED illuminating device or within the area of at least one LED of the LED color groups, determining temperature-dependent factors $f_Y=f_{PWM}$ for each LED color group from characteristic lines stored for each LED color group in calibration data, $$f_Y=f_{PWM}=Y_0(T_0)/Y_0(T),$$

with $Y_0=f(T)$;

calculating new pulse-width modulated control signals PWM(T) to control the LEDs from the multiplication of PWM control signals PWM(A) specified for a basic temperature ($T_0$) to control the LEDs with the determined temperature-dependent factors $f_Y=f_{PWM}$ for each LED color group, $$PWM(T)=PWM(A)*f_{PWM};$$ and controlling the LEDs by the new pulse-width modulated control signals PWM(T) for each LED color group, wherein, the pulse-width modulated control signals PWM(A) specified for a basic temperature being determined for the pulse-width modulated control signals for each LED color group for light mixing ratios with specified color temperatures (CCT) or chromaticity coordinates (x,y) as well as a brightness ($Y_0$) dependently on the temperature (T) of a specified temperature range as calibration data and are stored for each LED color group as function or table $Y_0=f(T)$ and PWM(A)=f(CCT) or PWM(A)=f(x, y).

3. A method for the temperature-dependent adjustment of color properties or photometric properties of an LED illuminating device having a plurality of LEDs emitting light of different colors or wavelengths, wherein luminous flux portions thereof determine the color of light, color temperature and/or chromaticity coordinates of a light mixture emitted by the LED illuminating device and are adjusted by controlling the LEDs comprising colored and white LEDs having the same color in each case by pulse-width modulated control signals, comprising:

measuring a temperature-dependent spectra of the LEDs;

calculating temperature-dependently optimized PWM control signals PWM(T) for the pulse-width modulated control signals of each LED for light mixing ratios with specified settings for color temperature or chromaticity coordinates;

storing the temperature-dependently optimized PWM control signals PWM(T) for the pulse-width modulated control signals of each LED for light mixing ratios with specified settings for color temperature or chromaticity coordinates;

measuring a temperature (T) within a housing of the LED illuminating device and/or within the area of at least one LED; and determining actual temperature-dependent PWM control signals PWM(T) for each LED from the stored temperature-dependent optimized PWM control signals for the pulse-width modulated control signals of each LED for light mixing ratios with specified settings for color temperature or chromaticity coordinates, and controlling the LEDs by the temperature-dependent PWM control signals PWM(T).

4. A method for the temperature-dependent adjustment of the color properties or the photometric properties of an LED illuminating device having LEDs emitting light of different colors or wavelengths, wherein luminous flux portions thereof determine the color of light, color temperature and/or chromaticity coordinates of a light mixture emitted by the LED illuminating device and are adjusted by controlling the LEDs comprising of colored and white LEDs and being grouped together to LED color groups having the same color in each case by pulse-width modulated control signals, by controlling the color of the LED illuminating device by a temperature characteristic line (Y=f(Tb)) of the LED illuminating device representing a brightness (Y) depending on a board temperature (Tb) of the LEDs being arranged on a board and/or the junction temperature of at least one LED for each LED color or LED color group at a specified current in the steady state and determining the temperature characteristic lines of the LED illuminating device by:

determining a function of the brightness (Y) depending on the board temperature (Tb) for each LED color at a specified current in the steady state (Y=f(Tb));

normalizing the characteristic lines onto (Y(Tb1)=1), wherein (Tb1) is an arbitrarily chosen temperature value close to the later working point;

determining the parameters (a, b, c, d) for a linear function having the form $$Y(Tb)=a+b*Tb,$$

a second-degree polynomial having the form $$Y(Tb)=a+b*Tb+c*Tb^2,$$

or a third-degree polynomial having the form $$(Tb)=a+b*Tb+c*Tb^2+d*Tb^3; \text{ and}$$

storing the parameters (a, b, c, d) in illuminating modules of the LED illuminating device, in the LED illuminating device or in an external controller.

5. The method of claim 4, wherein an LED illuminating device is comprised of a plurality of LED modules the temperature characteristic lines of which for a temperature-dependent adjustment of color properties or photometric properties of the LED illuminating device, having LEDs emitting light of different colors or wavelengths or LED color groups emitting light of the same color or wavelength within a color group, wherein luminous flux portions thereof determine the color of light, color temperature and/or chromaticity coordinates of the light mixture emitted by the LED illuminating device, is determined by:

determining temperature characteristic lines randomly;

converting characteristic line parameters onto individual dominant wavelengths by means of interpolation or extrapolation;

transferring the determined characteristic lines onto all LED modules; and storing the determined characteristic lines in the memory of said LED modules.

* * * * *